US007246065B2

(12) United States Patent
Tanaka et al.

(10) Patent No.: US 7,246,065 B2
(45) Date of Patent: Jul. 17, 2007

(54) BAND-DIVISION ENCODER UTILIZING A PLURALITY OF ENCODING UNITS

(75) Inventors: Naoya Tanaka, Neyagawa (JP); Mineo Tsushima, Katano (JP); Takeshi Norimatsu, Kobe (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 861 days.

(21) Appl. No.: 10/353,019

(22) Filed: Jan. 29, 2003

(65) Prior Publication Data

US 2003/0142746 A1    Jul. 31, 2003

(30) Foreign Application Priority Data

Jan. 30, 2002  (JP)  ............................. 2002-022356
Apr. 23, 2002  (JP)  ............................. 2002-120428

(51) Int. Cl.
*G10L 19/00*  (2006.01)
*G10L 21/00*  (2006.01)

(52) U.S. Cl. ........................ 704/500; 704/501; 704/503

(58) Field of Classification Search ................ 704/239, 704/501, 500
See application file for complete search history.

(56) References Cited

U.S. PATENT DOCUMENTS 4,384,354 A * 5/1983 Crawford et al. ........... 375/227

(Continued)

FOREIGN PATENT DOCUMENTS

EP          1 233 408         8/2002

(Continued)

OTHER PUBLICATIONS

McCree et al., entitled *"An Embedded Adaptive Multi-Rate Wideband Speech Coder"*, 2001 IEEE International Conference on Acoustics, Speech, and Signal Processing Proceedings, (ICASSP). Salt Lake City, UT, May 7-11, 2001, IEEE International Conference on Acoustics, Speech, and Signal Proceedings (ICASSP), New York, NY; IEEE, US, vol. 2, of 6, May 7, 2001, p. 761-764.

(Continued)

*Primary Examiner*—David Hudspeth
*Assistant Examiner*—Justin W Rider
(74) *Attorney, Agent, or Firm*—Wenderoth, Lind & Ponack, L.L.P.

(57) ABSTRACT

An encoding device (200) is comprised of a band dividing unit (201) that divides an input signal (207) into a low frequency signal (208) representing a signal in the lower frequency band and a high frequency signal (209) representing a signal in the higher frequency band, a lower frequency band encoding unit (202) that encodes the low frequency signal (208) and generates a low frequency code (213), a similarity judging unit (203) that judges similarity between the high frequency signal (209) and the low frequency signal (208) and generates switching information (210), "n" higher frequency band encoding units 205 that encode the high frequency signal (209) through respective encoding methods and generate a high frequency code (212), a switching unit (204) that selects one of the higher frequency band encoding units (205) and has the selected higher frequency band encoding unit (205) perform encoding, and a code multiplexing unit (206) that multiplexes the low frequency code (213), the high frequency code (212) and the switching information (210), and generates an output code (214).

14 Claims, 26 Drawing Sheets

U.S. PATENT DOCUMENTS

| | | | |
|---|---|---|---|
| 5,490,170 A * | 2/1996 | Akagiri et al. | 375/240 |
| 5,835,030 A * | 11/1998 | Tsutsui et al. | 341/51 |
| 5,890,125 A * | 3/1999 | Davis et al. | 704/501 |
| 6,223,162 B1 * | 4/2001 | Chen et al. | 704/503 |
| 2003/0061055 A1 * | 3/2003 | Taori et al. | 704/500 |

FOREIGN PATENT DOCUMENTS

| | | |
|---|---|---|
| WO | 98/57436 | 12/1998 |
| WO | 00/45378 | 8/2000 |
| WO | 01/26095 | 4/2001 |

OTHER PUBLICATIONS

Taori, R. et al., entitled "*Hi-Bin: An Alternative Approach to Wideband Speech Coding*", Acoustics, Speech, and Signal Processing Proceedings (CAT. No. 00CH37100), vol. 2, Jun. 5-9, 2000, pp. 1157-1160.

Jin, A., et al., entitled "*Scalable Audio Coder Based on Quantizer Units of MDCT Coefficients*", Acoustics, Speech, and Signal Processing, 1999. Proceedings., 1999 IEEE International Conference on Phoenix, AZ, USA Mar. 15-19, 1999, Piscataway, NJ, USA, IEEE, US, Mar. 15, 1999, pp. 897-900.

* cited by examiner

BAND-DIVISION ENCODER UTILIZING A PLURALITY OF ENCODING UNITS

TECHNICAL FIELD

The present invention relates to an encoding device for encoding an inputted audio signal, storing and transmitting an encoded code, and to a decoding device for decoding the code acquired in such encoding device and for reproducing an audio signal, as well as to an encoding method and a decoding method in such encoding device and decoding device.

BACKGROUND ART

As a technology to encode a general audio signal to be represented by a small amount of bits for acquiring a high-quality reproduction signal, there is a well-known method utilizing band division encoding. Such method is realized by dividing an inputted audio signal into a signal having a plurality of frequency bands through band division filter, or by transforming an inputted audio signal into a signal in the frequency domain through a time-frequency transform such as Fourier transform and dividing the resulting signal into a plurality of bands in the frequency domain, which is followed by the allocation of appropriate encoding bits to each band. The reason why band division encoding provides a high-quality reproduction signal is that processing on the basis of human auditory characteristics is performed in such method at the encoding stage. Generally, the human sense of hearing is less sensitive to a high-frequency sound at around 10 kHz and to a sound at a low level. Furthermore, there is a well-known phenomenon called frequency masking, due to which it is difficult for a person, when there is a high level sound in a certain frequency band, to perceive a lower level sound in the proximity of such frequency band. Concerning such sounds that are hard to be perceived because of the human auditory characteristics, it results in little contribution to the improvement in the quality of a reproduction signal even if encoding is performed by allocating a large number of bits and therefore there is no point of performing such encoding. This means, however, that it is possible to improve the quality of a reproduction signal by allocating encoding bits which are allocated to the parts a person cannot perceive well without taking into account the human auditory characteristics, to the parts to which the human hearing is sensitive, and then by performing a detailed encoding for such parts.

As a representative example of encoding utilizing the above-mentioned band division, exists ISO standard MPEG-4 AAC (ISO/IEC 14496-3). The following explains the operation of the MPEG-4 AAC (to be referred to as "AAC" hereinafter) with reference to figures.

FIG. 1 is a block diagram showing the configuration of an encoding device 100 in accordance with the conventional AAC system. The encoding device 100 is an encoding device for evaluating an input signal 109 on the basis of the human auditory characteristics so as to encode such input signal 109 by allocating the amount of bits according to the result of such evaluation. Such encoding device 100 is comprised of an auditory characteristics evaluating unit 101, a transform block length selecting unit 102, an MDCT transforming unit 103, a band dividing unit 104, a spectral signal processing unit 105, a bit allocating unit 106, a quantizing unit 107, and a code multiplexing unit 108. The input signal 109 is divided in units of 1024 samples which is the basic frame length per frame and then is inputted to the auditory characteristics evaluating unit 101 and the MDCT transforming unit 103. The auditory characteristics evaluating unit 101 evaluates the input signal 109 according to the human auditory characteristics and outputs an auditory characteristics evaluated value 110. The transform block length selecting unit 102 selects a transform block length suited to encode the input signal 109 according to the auditory characteristics evaluated value 110 and outputs the selected transform block length to the MDCT transforming unit 103. Then the MDCT transforming unit 103 transforms the input signal 109 into MDCT coefficients 111 with such selected transform block length. In the case of the AAC, a transform block length is 128 samples or 1024 samples. The shorter transform block length is provided if the input signal 109 is a transient signal, while the longer transform block length is provided if the input signal 109 is a stationary signal.

MDCT (Modified Discrete Cosine Transform) employed here is a kind of cosine transform, and the determined MDCT coefficients 111 serve as coefficients representing the frequency spectrum of the input signal 109. The determined MDCT coefficients 111 are divided into a plurality of frequency bands (sub-bands) by the band dividing unit 104. Then, for MDCT coefficients 112 divided into each frequency band, the spectral signal processing unit 105 makes such predictions as contribute to encoding of an increased efficiency and performs noise shaping on the basis of the auditory characteristics evaluated value 110. Moreover, if the input signal 109 is such signal as a stereo signal made up a plurality of channels, the spectral signal processing unit 105 performs processing called joint stereo which enhances the efficiency of encoding by utilizing an inter-channel correlation of signals. Furthermore, there is a case where processing called PNS (Perceptual Noise Substitution) is carried out, a detailed explanation of which is given later.

Meanwhile, information concerning what kind of processing is performed in the spectral signal processing unit 105 is outputted as an auxiliary information code 114. The bit allocating unit 106 determines bit allocation 115 required for quantization and outputs such bit allocation 115 to the quantizing unit 107. The quantizing unit 107 quantizes MDCT coefficients 113 for which processing is performed in the spectral signal processing unit 105 with the number of bits indicated by the bit allocation 115. Quantization is performed for a combination of normalized gain information of each sub-band called the scale factor and values of MDCT coefficients normalized by the scale factor. The code multiplexing unit 108 multiplexes the auxiliary information code 114 outputted from the spectral signal processing unit 105 with a spectral code 116 outputted from the quantizing unit 107 and then puts the resulting code into a specified format to output it as an output code 117. Note that in the case of the AAC, since the number of bits to be allocated for the basic frame can be arbitrarily determined on a per-frame basis, encoding is basically performed at a variable bit rate. However, by providing a buffer called bit reservoir before the final output processing so as to have such buffer absorb bit rate variations of each frame, it is possible for a signal to be transmitted at a fixed bit rate.

Next, an explanation is provided for PNS processing. In PNS, it is judged whether or not the above-mentioned each sub-band has noise characteristics in terms of the auditory sense. When judged to have noise characteristics, MDCT coefficients in such band are substituted with a noise signal to be generated randomly. Since there is no need for quantizing values of MDCT coefficient in a band substituted with a noise signal and therefore only the gain information corresponding to the scale factor needs to be quantized, it is possible to make a significant reduction in the number of encoding bits required for quantization.

Through such encoding processing, the AAC enables a high-quality encoding of a stereo signal in a wide band at 20 Hz 16 kHz or over at around 96 kbps, for instance.

However, when the bit rate is further lowered to around 48 kbps, for example, there occurs a problem that the bandwidth of a stereo signal for which high-quality encoding is possible becomes narrower, resulting in a muffled sound from an audibility standpoint.

Furthermore, too frequent use of PNS for the sake of reducing the number of encoding bits of MDCT coefficients at the stage of lowering the bit rate leads to an increase of parts to be substituted with a noise signal, and therefore the resulting sound is with much noise and distortion even to human ears.

In view of the above-mentioned problems, the present invention aims at providing an encoding device, a decoding device, an encoding method, and a decoding method which allow high-quality decoding of an audio signal in a wide bandwidth on the part of the decoding device which receives a code, when transmitting the code of such audio signal encoded in the encoding device at a low bit rate.

DISCLOSURE OF INVENTION

In order to achieve the above object, the encoding device according to the present invention is an encoding device comprising: a first band dividing unit operable to divide an input signal into a low frequency signal representing a signal in a lower frequency band and a high frequency signal representing a signal in a higher frequency band; a lower frequency band encoding unit operable to encode the divided low frequency signal and generate a low frequency code; a similarity judging unit operable to judge similarity between the high frequency signal and the low frequency signal; a plurality of higher frequency band encoding units operable to encode the high frequency signal through respective encoding methods and generate a high frequency code; an encoding selecting unit operable to select one of a plurality of the higher frequency band encoding units, have the selected higher frequency band encoding unit perform encoding, and generate selection information specifying an encoding method employed by the selected higher frequency band encoding unit; and a code multiplexing unit operable to multiplex the low frequency code from the lower frequency band encoding unit, the high frequency code from the selected higher frequency band encoding unit and the selection information from the encoding selecting unit, and generate an output code. Furthermore, the decoding device that decodes the output code encoded by such encoding device is a decoding device comprising: a lower frequency band decoding unit operable to decode a low frequency signal representing a signal in a lower frequency band out of an input code; a plurality of higher frequency band decoding units operable to decode a high frequency signal representing a signal in a higher frequency band out of the input code through respective decoding methods; a decoding selecting unit operable to select one of a plurality of the higher frequency band decoding units according to selection information included in the input code, and have the selected higher frequency band decoding unit perform decoding; and a signal combining unit operable to combine the low frequency signal decoded by the lower frequency band decoding unit with the high frequency signal decoded by the selected higher frequency band decoding unit, and generate an output decoded signal.

With the above configuration, since it is possible to divide the input signal into a signal in the lower frequency band and a signal in the higher frequency band and to encode such signal in the higher frequency band appropriately so as to represent it with a small amount of bits based on similarity between such signal in the higher frequency band and the signal in the lower frequency band, a high-quality reproduction signal can be acquired from a code represented by a smaller amount of bits.

Moreover, according to another encoding device and decoding device of the present invention, it is possible to divide the input signal into a signal in the lower frequency band and a signal in the higher frequency band and to encode the signal in the higher frequency band appropriately so as to represent it with a small amount of bits, based on similarity between such signal in the higher frequency band and the signal in the lower frequency band. Furthermore, since it is also possible to obtain a more suitable value as the degree of similarity by using the signal acquired as a result of decoding the code encoded by the lower frequency band encoding unit as a signal in the lower frequency band when determining similarity, a high-quality reproduction signal can be obtained from a code represented by a smaller amount of bits.

Furthermore, according to another encoding device and decoding device of the present invention, it is possible to divide the input signal into a signal in the lower frequency band and a signal in the higher frequency band and to encode the signal in the higher frequency band appropriately so as to represent it with a small amount of bits, based on similarity between such signal in the higher frequency band and the signal in the lower frequency band. Moreover, since it is also possible to improve efficiency in the encoding of the lower frequency band encoding unit by performing down-sampling for the signal in the lower frequency band, a high-quality reproduction signal can be obtained from a code represented by a smaller amount of bits.

What is more, according to another encoding device and decoding device of the present invention, since it is possible to divide the spectral coefficients in the higher frequency band and to apply an optimum encoding method for each divided coefficients, a high-quality reproduction signal can be obtained from a code represented by a smaller amount of bits.

Moreover, according to another encoding device and decoding device of the present invention, it is possible to divide the input signal into a signal in the lower frequency band and a signal in the higher frequency band and to encode the signal in the higher frequency band appropriately so as to represent it with a small amount of bits, based on similarity between such signal in the higher frequency band and the signal in the lower frequency band, a high-quality reproduction signal can be acquired from a code represented by a smaller amount of bits. Furthermore, since it is possible to collectively calculate spectral coefficients to be encoded in the lower frequency band encoding unit and the higher frequency band encoding unit, the amount of processing required for time-frequency transform can be reduced. What is more, since it is also possible to collectively transform spectral coefficients decoded by the lower frequency band decoding unit and the higher frequency band decoding unit into a time signal, the amount of processing required for frequency-time transform can be reduced.

Furthermore, according to another encoding device and decoding device of the present invention, after dividing the input signal into a signal in the higher frequency band and a signal in the lower frequency band, a conventional encoding method is employed for the signal in the lower frequency band, while the following methods are employed for the signal in the higher frequency band for encoding: the similarity judging unit that judges similarity between the signal in the higher frequency band and the signal in the lower frequency band; and the higher frequency band encoding unit that performs encoding by the use of either the similarity with the signal in the lower frequency band or a random noise signal on the basis of a result of such judgment made by the similarity judging unit. Accordingly, it is possible to perform encoding and decoding for a signal in the higher frequency band which cannot be encoded thorough a conventional method so as to represent it with a smaller amount of bits, which consequently results in the improvement in the auditory quality of an encoded audio signal.

As is obvious from the above description, according to the encoding device and the decoding device of the present invention, by dividing the input signal into a signal in the higher frequency band and a signal in the lower frequency band and by encoding the signal in the higher frequency band by the use of similarity between such signal in the higher frequency band and the signal in the lower frequency band, it is possible to encode the signal in the higher frequency band in a more efficient manner and to obtain a high-quality decoded signal from a code represented by a smaller amount of bit.

Moreover, the use of spectral coefficients in the same format for the encoding of both the lower and higher frequency bands makes it possible for a high-quality decoded signal to be obtained through a smaller amount of processing.

Further Information about Technical Background to this Application

The following applications are incorporated herein by reference: Japanese patent application Ser. No. 2002-022356 filed Jan. 30, 2002; and Japanese patent application Ser. No. 2002-120428 filed Apr. 23, 2002.

BRIEF DESCRIPTION OF DRAWINGS

These and other objects, advantages and features of the invention will become apparent from the following description thereof taken in conjunction with the accompanying drawings that illustrate a specific embodiment of the invention. In the Drawings.

BEST MODE FOR CARRYING OUT THE INVENTION

The following paragraphs provide detailed explanations of embodiments of the present invention with reference to the figures.

The First Embodiment

Figure 1:
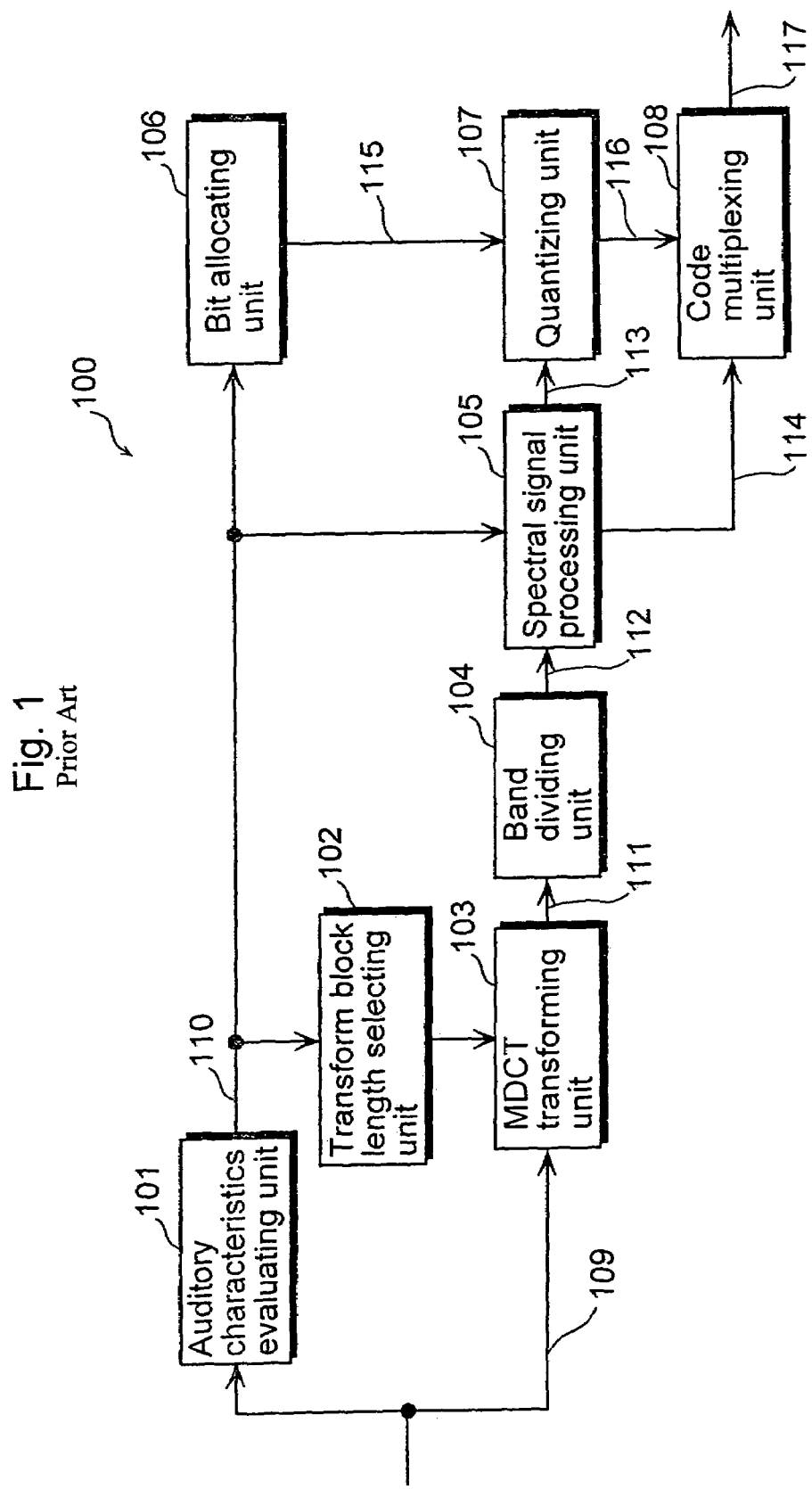
FIG. 1 is a block diagram showing a configuration of an encoding device in accordance with the conventional AAC system.
Figure 2:
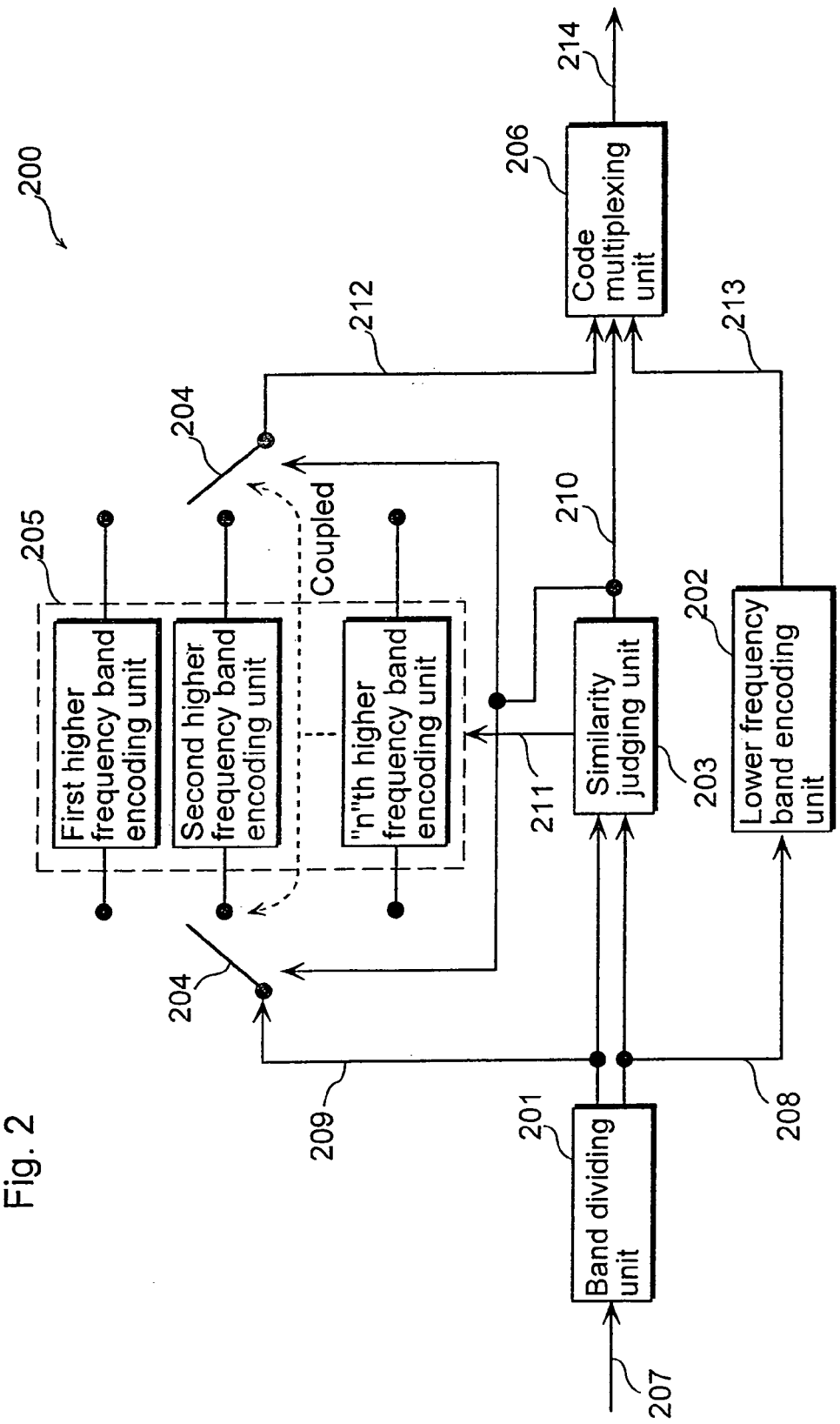
FIG. 2 is a block diagram showing a configuration of an encoding device according to the first embodiment.

FIG. 2 is a block diagram showing the configuration of an encoding device 200 according to the first embodiment of the present invention. The encoding device 200 is an encoding device that checks similarity between a signal in the higher frequency band and a signal in the lower frequency band of an input signal so as to encode such signal in the higher frequency band to be represented by a smaller number of bits. Such encoding device 200 includes a band dividing unit 201, a lower frequency band encoding unit 202, a similarity judging unit 203, a switching unit 204, a higher frequency band encoding unit 205, and a code multiplexing unit 206. In such encoding device 200, the band dividing unit 201 performs band division for an input signal 207 so as to divide such input signal 207 into a low frequency signal 208 including only a signal in the lower frequency band and a high frequency signal 209 including only a signal in the higher frequency band. The boundary between the upper limit frequency included in the low frequency signal 208 and the lower limit frequency included in the high frequency signal 209 can be arbitrarily determined, and there may be an overlap in such upper and lower limit frequencies. The lower frequency band encoding unit 202 encodes the low frequency signal 208 to output a low frequency code 213. Note that any one of known encoding units can be employed as the lower frequency band encoding unit 202 here. Next, the similarity judging unit 203 makes a judgment on similarity between the low frequency signal 208 and the high frequency signal 209 to output switching information 210 and similarity information 211. The prediction error, for example, can be used to judge similarity, but more specific method is explained in detail later.

The higher frequency band encoding unit 205 encodes the high frequency signal 209 in an optimized manner according to values indicated by the switching information 210 and the similarity information 211. To be more specific, the higher frequency band encoding unit 205 is comprised of "n" higher frequency band encoding units made up of the first ~ the "n"th ("n" is a natural number) higher frequency band encoding units, one of which is selected according to the switching information 210. Each of the first ~ the "n"th higher frequency band encoding unit is configured to optimally encode the high frequency signal 209, characteristics of which varies on a per-signal basis and which is classified according to similarity between the low frequency signal 208 and the high frequency signal 209. The switching unit 204 selects a predetermined optimal higher frequency band encoding unit from among the first ~ the "n"th higher frequency band encoding units and the selected higher frequency band encoding unit encodes the high frequency signal 209 referring to the similarity information 211 and outputs a high frequency code 212. When similarity is low, the similarity judging unit 203 judges, for example, that the input signal 207 is a random signal with noise characteristics and outputs such switching information 210 as selects a higher frequency band encoding unit capable of encoding the high frequency signal 209 by the use of noise, from among the first ~ the "n"th higher frequency band encoding units. When similarity is high, on the other hand, the similarity judging unit 203 outputs such switching information 210 as indicates that a higher frequency band encoding unit capable of encoding a differential signal determined as a result of deducting the low frequency signal 208 judged to have a high degree of similarity from the high frequency signal 209 is selected. Meanwhile, the similarity judging unit 203 is assumed to be configured to output to the higher frequency band encoding unit 205 a part in the low frequency signal 208 having a high degree of similarity with the high frequency signal 209 or a differential between the high frequency signal 209 and the low frequency signal 208 having a high degree of similarity as a part of the similarity information 211, when similarity between the low frequency signal 208 and the high frequency signal 209 is high, and when similarity between the low frequency signal 208 and the high frequency signal 209 is low, the similarity judging unit 203 outputs "0" as the similarity information 211.

When encoding is performed in the higher frequency band encoding unit 205 by the use of noise, since the selected higher frequency band encoding unit regards a high frequency signal to be encoded as a noise signal generated randomly and encodes only gain information indicating the strength of such high frequency signal, the number of bits required for encoding is largely reduced as compared to when values of a high frequency signal is directly encoded. Furthermore, in an encoding method utilizing a differential signal when similarity is high, reduction can be made in the number of bits required for encoding the high frequency signal 209 by quantizing the differential between such high frequency signal 209 and the low frequency signal 208 having a high degree of similarity. Note that when similarity is extremely high or when encoding a signal in an extremely high frequency band which is not very important from the standpoint of the auditory characteristics, the high frequency signal 209 to be encoded may be substituted with the low frequency signal 208 with a high degree of similarity without encoding the differential. By so doing, since encoding is required only for information used to specify such low frequency signal 208 serving as a substitution, the number of bits required to encode the high frequency signal 209 is further reduced. Meanwhile, the low frequency code 213, the high frequency code 212 and the switching information 210 which are outputs generated as a result of encoding processing performed by the lower frequency band encoding unit 202, by the higher frequency band encoding unit 205 and by the similarity judging unit 203 respectively, are multiplexed in the code multiplexing unit 206 to be outputted as an output code 214.

Next, an explanation is provided for a method utilizing the prediction error as an example of a similarity judging method. Since the low frequency signal 208 and the high frequency signal 209 are generated as a result of band division performed for the input signal, each signal includes different frequency components. Therefore, it is difficult to make a judgment on similarity between such two signals as long as they are seen as time signals. However, seen as frequency signals, it becomes easier to judge similarity between such two signals by making a comparison between the distributions of each signal's frequency components. Such principle is illustrated in FIGS. 3A and 3B, which present a 1 kHz sine wave and a 2 kHz sine wave with the same amplitude as a time signal and as a frequency signal (e.g. FFT power spectral coefficients), as an example of signals having different frequency components.

Figure 3A:
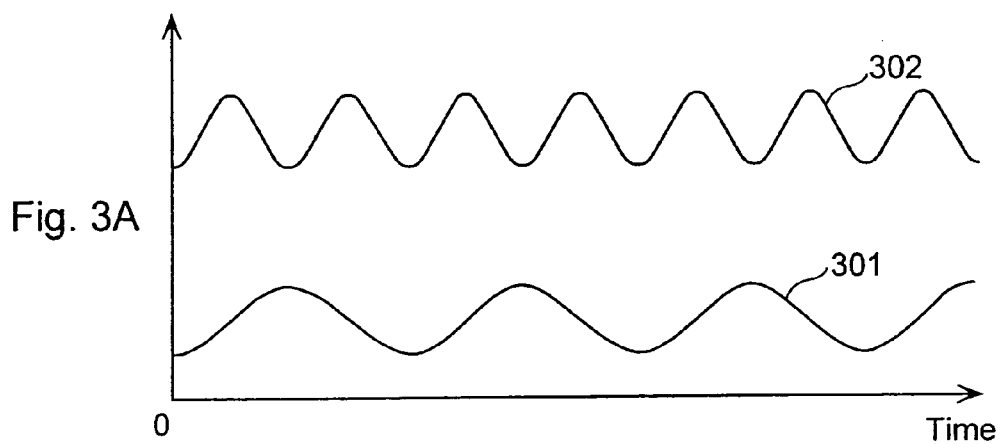
FIG. 3A is a diagram illustrating two sine waves with different frequencies as time signals.
Figure 3B:
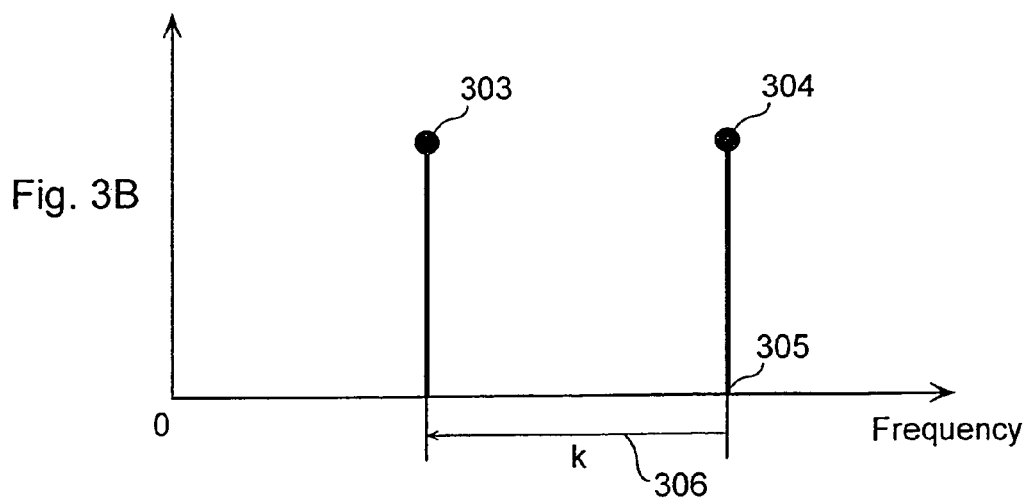
FIG. 3B is a diagram illustrating two sine waves with different frequencies as frequency signals.

FIGS. 3A and 3B are diagrams illustrating the difference between when two signals are seen as time signals and when seen as frequency signals. FIG. 3A is a diagram representing two sine waves with different frequencies as time signals. FIG. 3B is a diagram representing two sine waves with different frequencies as frequency signals. In FIG. 3A, there is no similarity which can be easily judged between a 1 kHz sine wave 301 and a 2 kHz sine wave 302 represented as time signals. In contrast, in FIG. 3B, since a 1 kHz sine wave 303 and a 2 kHz sine wave 304 represented as frequency signals are illustrated as a single line spectrum, it is easy to judge that there is an extremely high degree of similarity between them. In other words, the only difference between such two sine waves is their positional information indicated as "frequency." For example, in FIG. 3B, with the position of the 2 kHz sine wave 304 set as a reference point 305, when comparing a signal extracted from the reference point 305 with a signal extracted from the position distant only by distance "k" from the reference point 305 to the 1 kHz sine wave 303(=shift number 306), these two signals match.

Based on this principle, the low frequency signal 208 and the high frequency signal 209 are transformed into spectral coefficients indicating frequency components of the input signal 207 by the similarity judging unit 203 through time-frequency transform so that similarity between such low frequency signal 208 and high frequency signal 209 are judged. As a time-frequency transform, any one of known transforms may be employed including Fourier transform, cosine transform and filter bank. As illustrated in the example of in FIG. 3B, similarity between the low frequency signal 208 and the high frequency signal 209 can be judged by shifting to overlay one signal to the other in the frequency domain, and the prediction error is provided as a scale which indicates the mismatching part when such two signals are overlaid each other. Since the present invention uses the low frequency signal 208 to encode the high frequency signal 209, a preferable configuration is one with which similarity between such two signals is judged by making the high frequency signal 209 fixed as a target, to which the low frequency signal 208 is shifted. In such configuration, by representing the low frequency signal 208 and the high frequency signal 209 transformed into spectral coefficients as x(i) and as y(j) respectively, the prediction error is represented as follows:

$$E(k) = \sum_{j=0}^{j<m} (y(j) - ax(k, j))^2 \quad (K\_MIN \leq k < K\_MAX) \quad \text{[Expression 1]}$$

In this expression, x(k, j) is a signal extracted from the position to which a shift is made by "k" samples with x(j) as the reference point 305, while "a" is gain, and "m" is the number of spectral coefficients included in the low frequency signal x(k, j) and the high frequency signal y(j). The number of spectral coefficients "m", which specifies the range of the high frequency signal y(j) to be encoded, may be arbitrarily decided. Meanwhile, the position of the reference point 305 and the maximum (k_MAX) and the minimum (K_MIN) shift numbers "k" may also be decided arbitrarily. By changing "k" within the decided range of shift numbers, measuring the prediction error E(k) and selecting the minimum number, the low frequency signal x(k, j) with the highest degree of similarity, the shift number "k", and the gain "a" can be determined for the high frequency signal y(j) to be encoded. Since x(k, j) becomes unique with the determination of the shift number "k", the prediction error E(k), the shift number "k" and the gain "a" can be used as the similarity information 211. The switching of the first ~ the "n"th higher frequency band encoding units is made using the prediction error E(k) as a measurement scale. When the prediction error E(k) is smaller than the predefined threshold, such switching information 210 is outputted as selects a higher frequency band encoding unit used when the degree of similarity is high, and when the prediction error E(k) is bigger than the predefined threshold, such switching information 210 is outputted as selects a higher frequency band encoding unit used when the degree of similarity is low.

Note that although the prediction error of spectral coefficients is employed as a method of similarity judgment in the similarity judging unit 203 in the above explanation, the prediction error of time signals can be also used for a signal for which band division is performed by means of filter bank, for example. Furthermore, although the above explanation describes a higher frequency band encoding unit which performs encoding by the use of noise and a higher frequency band encoding unit which uses similarity between the low frequency signal 208 and the high frequency signal 209, it is also possible to use a higher frequency band encoding unit which performs encoding by using both similarity and noise when similarity is in a moderate degree, for example. Note that when an input signal is a signal made up of a plurality of channels such as a stereo signal, it can be configured in a manner in which encoding is performed by the use of joint stereo encoding in addition to a method to encode the high frequency signal 209 specifically for each channel.

As explained above, by dividing the input signal 207 into the high frequency signal 209 and the low frequency signal 208 to encode the high frequency signal 209 by the use of similarity between such high frequency signal 209 and low frequency signal 208, it becomes possible to acquire a high-quality reproduction signal from a code represented by a smaller number of bits.

Figure 4:
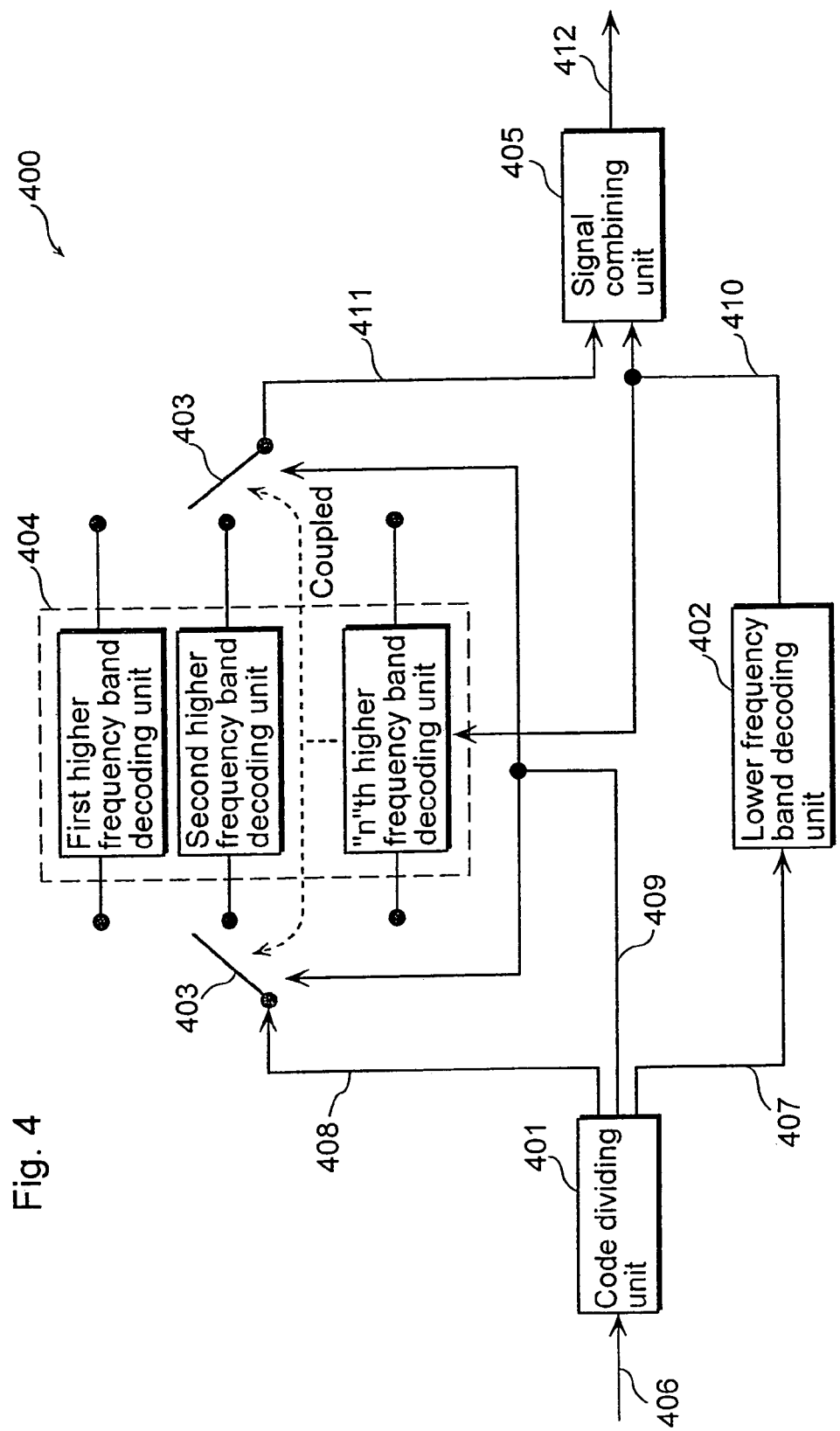
FIG. 4 is a block diagram showing a configuration of a decoding device according to the first embodiment.

FIG. 4 is a block diagram showing the configuration of a decoding device 400 according to the first embodiment. The decoding device 400, which is a decoding device for decoding the output code 214 encoded in the encoding device 200 illustrated in FIG. 2 and for reproducing an audio signal, includes a code dividing unit 401, a lower frequency band decoding unit 402, a switching unit 403, a higher frequency band decoding unit 404 and a signal combining unit 405.

If FIG. 4, an input code 406 is equivalent to the output code 214 in the encoding device 200 in FIG. 2. The code dividing unit 401 divides the input code 406 into a low frequency code 407, a high frequency code 408 and switching information 409. The lower frequency band decoding unit 402 decodes the low frequency code 407 and output a low frequency signal 410. Any one of known decoding units may be used as the lower frequency band decoding unit 402 as long as such decoding unit has the decoding functionality. The higher frequency band decoding unit 404 is comprised of "n" higher frequency band decoding units made up of the first ~ the "n"th ("n" is a natural number) higher frequency band decoding units, each configured to decode a high frequency code in accordance with a predefined method. The switching unit 403 selects a higher frequency band decoding unit specified by switching information 409 and the selected higher frequency band decoding unit decodes the high frequency code 408 referring to the low frequency signal 410 to output a high frequency signal 411. The signal combining unit 405 combines the low frequency signal 410 and the high frequency signal 411 to generate an output signal 412.

If the above-explained higher frequency band encoding unit 205 of the encoding device 200 is configured with a higher frequency band encoding unit to perform encoding by the use of noise and a higher frequency band encoding unit to encode the differential signal determined as a result of deducting a low frequency signal from a high frequency signal by the use of such low frequency signal judged to have a high degree of similarity, the decoding device 400 also needs to be equipped with the higher frequency band decoding unit 404 corresponding to such higher frequency band encoding unit 205 of the encoding device 200. The following is an explanation for an example configuration of the higher frequency band decoding unit 404 and the operation thereof. For explanation purposes, FIG. 4 describes a decoding unit to decode a code encoded by the use of noise as the first higher frequency band decoding unit and a decoding unit to decode a code encoded as the differential signal between a low frequency signal and a high frequency signal as the second higher frequency band decoding unit. If switching information 409 indicates that the high frequency code 408 is to be inputted to the first higher frequency band decoding unit, a high frequency signal to be decoded is represented as a random noise signal. Therefore, the high frequency code 408 includes only gain information which indicates the signal strength. Accordingly, the first higher frequency band decoding unit decodes the gain information included in the high frequency code 408, generates a random noise signal inside, and generates the high frequency signal 411 by multiplying gain described in the gain information by such generated noise signal.

In contrast, when switching information 409 indicates that the high frequency code 408 is to be inputted to the second higher frequency band decoding unit, the high frequency code 408 includes, for example, similarity information such as the shift number, the gain and the differential signal used to specify in the low frequency signal 208 the part having a high degree of similarity with the high frequency signal 209 in a decoded form. Meanwhile, a high frequency signal is represented by the sum of a low frequency signal extracted from the low frequency signal 410 acquired in the lower frequency band decoding unit 402 and the differential signal acquired in the second higher frequency band decoding unit. Therefore, the second higher frequency band decoding unit decodes the high frequency code 408 first, extracts the low frequency signal 208 similar to the high frequency signal 209 from the low frequency signal 410 according to the similarity information included in such high frequency code 408, and after multiplying with it the decoded gain, outputs the high frequency signal 411 by adding the decoded differential signal. The resulting low frequency signal 410 and high frequency signal 411 are then combined in the signal combining unit 405 to be outputted as an output signal 412.

As explained above, since the use of a high frequency code encoded in a more efficient manner is realized by decoding a high frequency signal by the use of similarity between such high frequency signal and a low frequency signal out of an inputted code which is encoded by having been divided into the high frequency signal and the low frequency signal, it is possible to obtain a high-quality reproduction signal from a code represented by a smaller number of bits.

The Second Embodiment

The configuration of an encoding device according to the second embodiment of the present invention is explained with reference to FIG. 5, which is a block diagram showing the configuration of an encoding device 500 according to the second embodiment.

Figure 5:
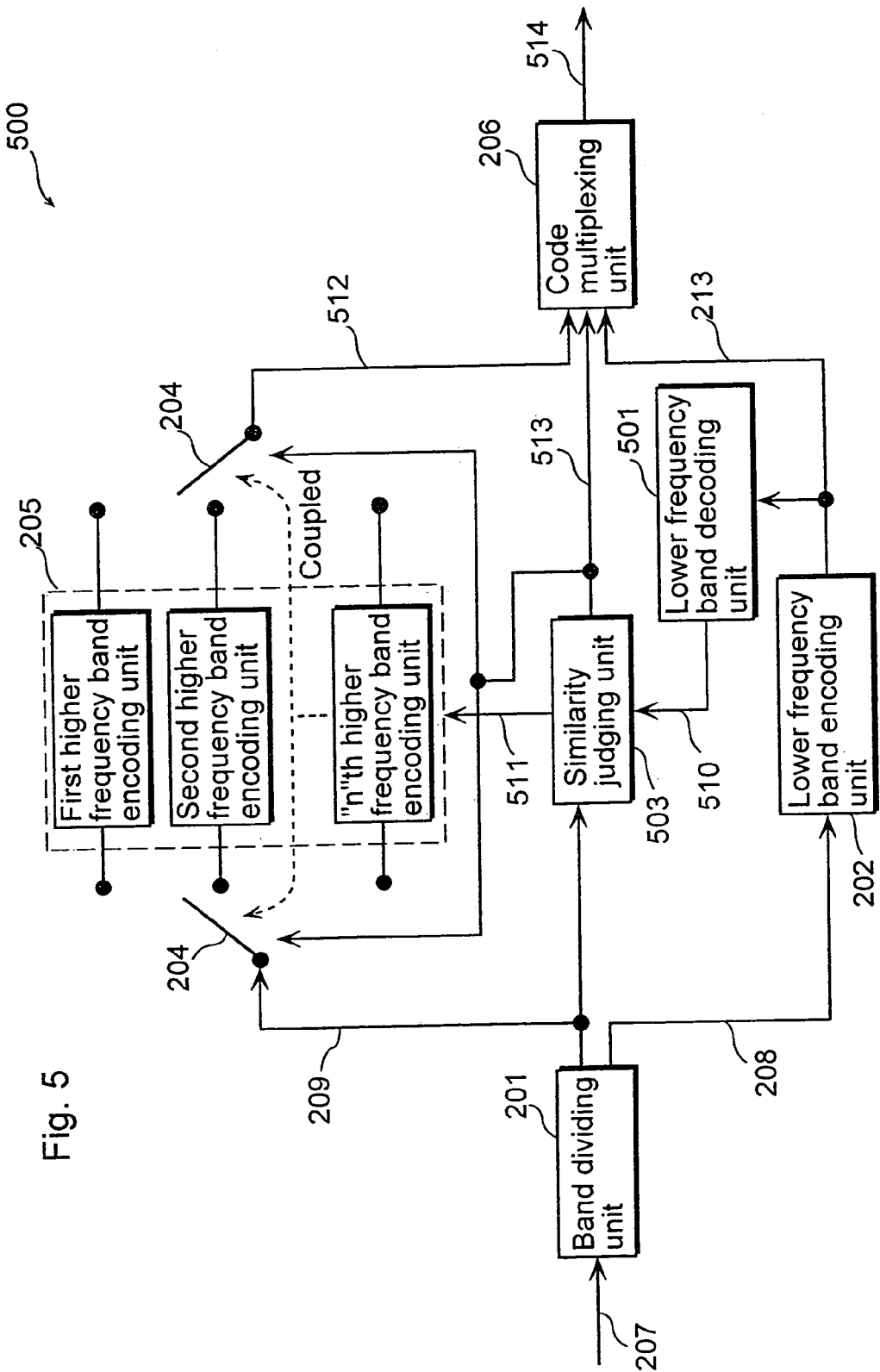
FIG. 5 is a block diagram showing a configuration of an encoding device according to the second embodiment.

The encoding device 500 illustrated in FIG. 5, which newly includes a lower frequency band decoding unit 501 in addition to the configuration of the encoding device 200 illustrated in FIG. 2 according to the first embodiment, is configured to decode the low frequency code 213 encoded in the lower frequency band encoding unit 202 to generate a low frequency decoded signal 510, and to input such low frequency decoded signal 510 to a similarity judging unit 503 instead of the low frequency signal 208. Such encoding device 500 is comprised of the band dividing unit 201, the lower frequency band encoding unit 202, the lower frequency band decoding unit 501, the similarity judging unit 503, the switching unit 204, the higher frequency band encoding unit 205, and the code multiplexing unit 206. Note that since an explanation is already provided for the same components as those included in the encoding device 200 illustrated in FIG. 2, in FIG. 5 and the subsequent diagrams, an explanation for such components is omitted by providing them with the same numbers as used in FIG. 2. In the encoding device 500 with the above-mentioned configuration, since the similarity judging unit 203 makes a judgment on similarity with the high frequency signal 209 by the use of the low frequency decoded signal 510 decoded by the lower frequency band decoding unit 501 after encoded by the lower frequency band encoding unit 202 once, the effect of achieving a high frequency signal closer to the original sound is produced as compared to the case where a decoding device decodes the output code 214 from the encoding device 200 for which similarity with the high frequency signal 209 is judged by the use of the low frequency signal 208 of the original sound.

To be more specific, as presented in an example of the decoding device 400 illustrated in FIG. 4, the decoding device decodes the high frequency signal by the use of the low frequency signal acquired by decoding the once-encoded low frequency code rather than the low frequency signal of the original sound. This indicates that in order to encode a high frequency signal more correctly, encoding of such high frequency signal needs to be performed on the basis of similarity between a low frequency signal which is decoded after encoded once and such high frequency signal to be encoded. Therefore, in the encoding device 500, similarity information 511 calculated by the similarity judging unit 503 indicates similarity between the high frequency signal 209 and the low frequency decoded signal 510. Accordingly, since the higher frequency band encoding unit 205 encodes the high frequency signal 209 in accordance with such similarity information 511 and switching information 513, it is possible to output a high frequency code 512 with which a high frequency signal can be encoded more correctly in a decoding device. As a result, in the encoding device 500, an output code 514 is outputted in which the switching information 513, the high frequency code 512 and the low frequency code 213 acquired in the above-mentioned manner are multiplexed, which consequently results in the improvement in the quality of a decoded signal in a decoding device.

Note that since the only difference between the encoding device 200 of the first embodiment and the encoding device 500 of the second embodiment is the low frequency signal used to calculate similarity, meaning that the configurations of the higher frequency band encoding unit and the lower frequency band encoding unit as well as the high frequency signal and the low frequency signal to be encoded are all the same, the configuration of a decoding device used in a pair with the encoding device 500 of the second embodiment may be the same as the configuration of the decoding device 400 of the first embodiment illustrated in FIG. 4.

The Third Embodiment

The configuration of an encoding device according to the third embodiment of the present invention is explained with reference to FIG. 6, which is a block diagram showing the configuration of an encoding device 600 according to the third embodiment.

Figure 6:
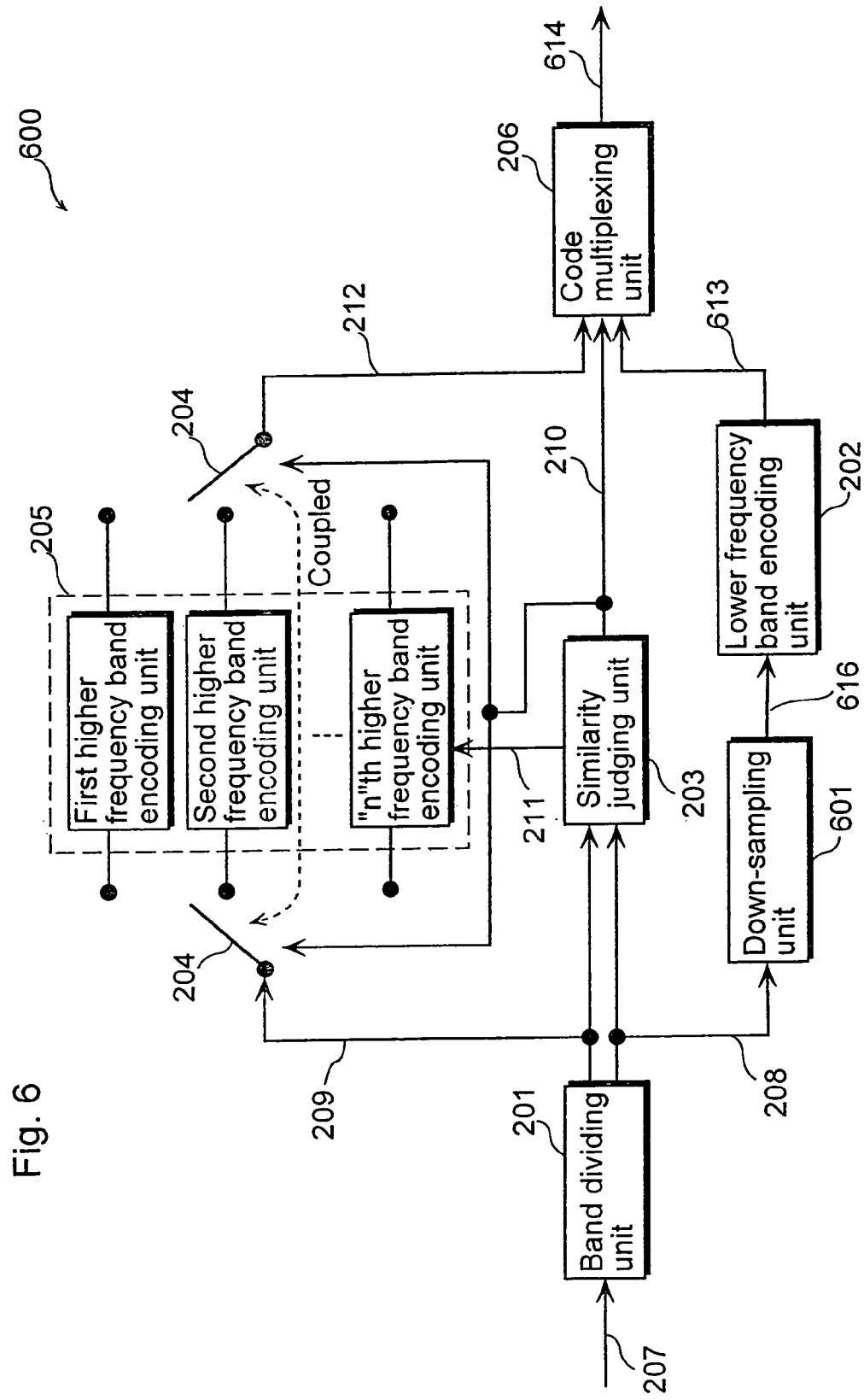
FIG. 6 is a block diagram showing a configuration of an encoding device according to the third embodiment.

The encoding device 600 illustrated in FIG. 6, which has a down-sampling unit 601 in addition to the configuration of the encoding device 200 of the first embodiment shown in FIG. 2, is configured to have a low frequency signal 616 down-sampled by the down-sampling unit 601 be inputted to the lower frequency band encoding unit 202 instead of the low frequency signal 208 of the original sound for which band division is performed so as to output a low frequency code 613 generated as a result of such encoding. Generally, the low frequency signal 208 and the high frequency signal 209 band-divided by the band dividing unit 201 are signals with the same sampling frequency as the input signal 207. For example, assuming that the sampling frequency of the input signal 207 is 48 kHz and the boundary frequency divided by the band dividing unit 201 is 8 kHz, for example, since the input signal 207 includes a signal at 0~24 kHz according to the sampling theorem, the bandwidth of a signal included in the low frequency signal 208 and the high frequency signal 209 is 0~8 kHz and 8~24 kHz respectively. However, the sampling frequency of the low frequency signal 208 and the high frequency signal 209 remains unchanged at 48 kHz. While it is possible to encode such low frequency signal 208 as it is in the lower frequency band encoding unit 202, the fact is that a known encoding unit to be used as the lower frequency band encoding unit 202 is generally configured to operate most efficiently when the signal bandwidth included the input signal 207 is at the maximum frequency (=sampling frequency/2) which is determined according to the sampling frequency of an input signal. Therefore, by having the lower frequency band encoding unit 202, which is configured on the premise of including a signal up to at 24 kHz with a sampling frequency of 48 kHz, input the low frequency signal 208 that includes only up to 8 kHz, or one third of the assumed frequency, so as to perform encoding, there arises a problem that efficiency of the lower frequency band encoding unit is reduced.

In order to solve such problem, down-sampling is required for the sampling frequency of the low frequency signal 208 to be inputted to the lower frequency band encoding unit 202 in accordance with the frequency bandwidth of a signal included in the low frequency signal 208 so that the efficiency of the lower frequency band encoding unit 202 can be increased. More specifically, when the low frequency signal 208 to be inputted to the down-sampling unit 601 is a time signal, the down-sampling unit 601 thins out sampled data so that a desired sampling frequency can be acquired, and when the low frequency signal 208 to be inputted is frequency-transformed spectral data, the data length of the low frequency signal 208 is notified to the lower frequency band encoding unit 202. In this example, since the frequency bandwidth of a signal included in the low frequency signal 208 is 0~8 kHz, a sampling frequency required to represent the low frequency signal 208 is 16 KHz. By having the lower frequency band encoding unit 202 input the low frequency signal 616 down-sampled to 16 kHz, it becomes possible for the lower frequency band encoding unit 202 to encode the inputted low frequency signal 208 in the most efficient manner, and therefore the effect of acquiring an output code 614 represented by a small number of bits can be achieved while improving the quality of the decoded signal at the same time.

Figure 7:
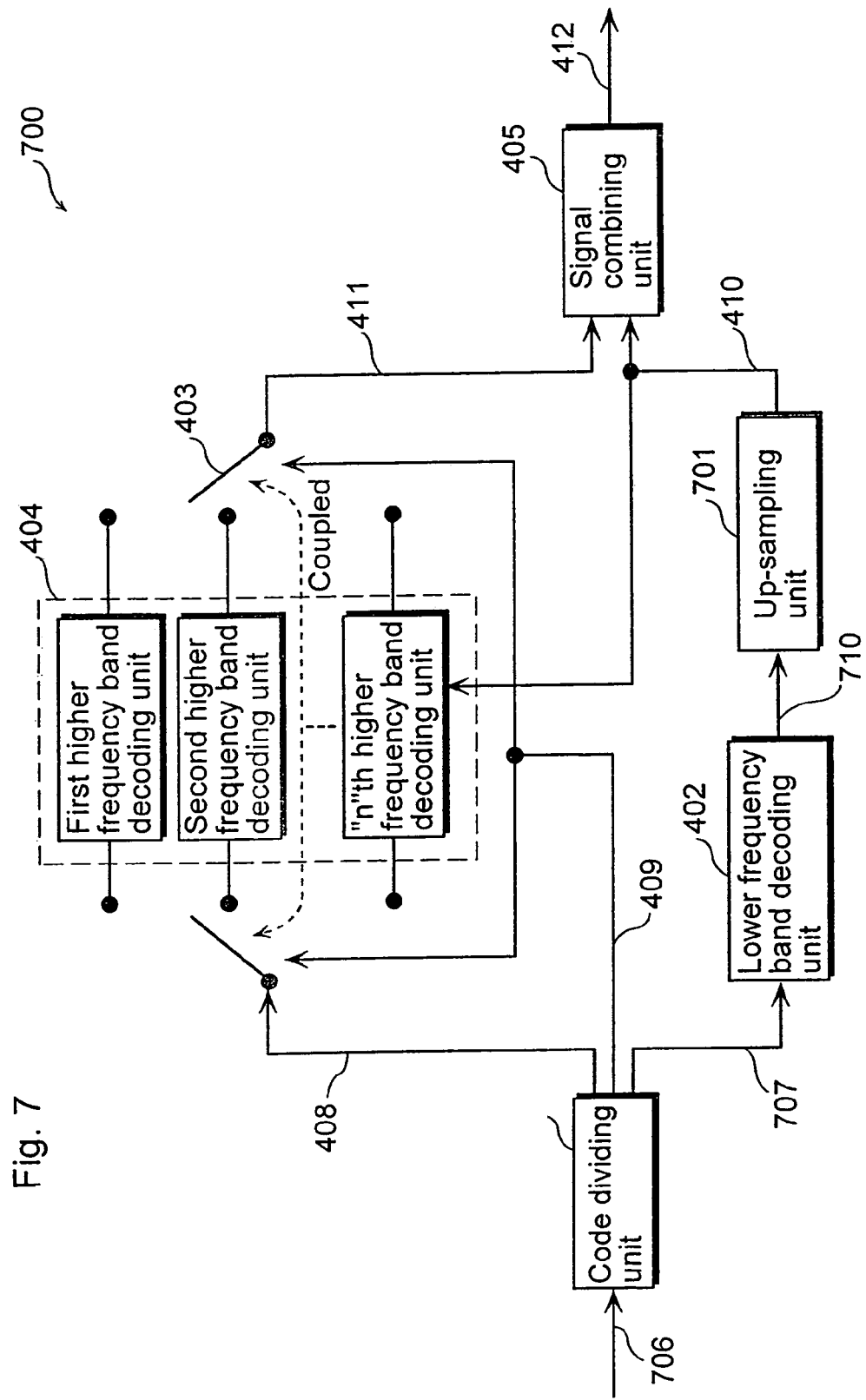
FIG. 7 is a block diagram showing a configuration of a decoding device that decodes an output code encoded by the encoding device illustrated in FIG. 6.

Next, an explanation is provided for a decoding device 700 according to the third embodiment with reference to FIG. 7, which is a block diagram showing the configuration of the decoding device 700 to decode the output code 614 encoded by the encoding device 600 illustrated in FIG. 6. Such decoding device 700 shown in FIG. 7, which newly includes an up-sampling unit 701 in addition to the configuration of the decoding device 400 illustrated in FIG. 4 according to the first embodiment, is configured to have the up-sampling unit 701 up-sample a low frequency signal 710 decoded by the lower frequency band decoding unit 402, and to have such up-sampled low frequency signal 410 be inputted to the higher frequency band decoding unit 404 and the signal combining unit 405. Such decoding device 700 is comprised of the code dividing unit 401, the lower frequency band decoding unit 402, the up-sampling unit 701, the switching unit 403, the higher frequency band decoding unit 404, and the signal combining unit 405. Note that since an explanation is already provided for the same components as those included in the decoding device 400 illustrated in FIG. 4, an explanation for such components is omitted by providing them with the same numbers as used in FIG. 4.

In FIG. 7, an input code 706 is equivalent to the output code 614 in the encoding device 600 in FIG. 6. In the decoding device 700, since a low frequency code 707 outputted from the code dividing unit 401 is the encoded low frequency signal 616 which is down-sampled on the part of the encoding device 600, the sampling frequency of a low frequency signal 710 decoded in the lower frequency band decoding unit 402 equals to the sampling frequency of the low frequency signal 616 (e.g. 16 kHz) used on the part of the encoding device 600. On the other hand, the high frequency code 408 is the encoded high frequency signal 209 which is not down-sampled and therefore the sampling frequency of the high frequency signal 408 to be decoded equals to the sampling frequency of the input signal 207 (e.g. 48 kHz) inputted to the encoding device 600. Therefore, in order to decode the high frequency signal by the use of the decoded low frequency signal 710, the decoding device 700 is configured to have the low frequency signal 710 be inputted to the higher frequency band decoding unit 404 after such low frequency signal 710 is up-sampled to be the same sampling frequency of the high frequency signal to be decoded (=the sampling frequency of an output signal e.g. 48 kHz). Similarly, the signal combining unit 405 performs processing for combining signals by the use of the decoded high frequency signal 411 and the up-sampled low frequency signal 410 to generate the output signal 412.

As explained above, by up-sampling the decoded low frequency signal 710 out of the input code 706 which is encoded by having been divided into the high frequency code 408 and the down-sampled low frequency code 707 so as to decode the high frequency signal 411 using similarity between such high frequency signal 411 and the up-sampled low frequency signal 410, it becomes possible to acquire a high-quality reproduction signal from a code represented by a smaller number of bits by the use of a low frequency code encoded in a more efficient manner.

The Fourth Embodiment

The configuration of an encoding device 800 according to the fourth embodiment of the present invention is explained with reference to FIG. 8, which is a block diagram showing the configuration of parts that generate a high frequency code 817 and switching information 816 in the encoding device 800 according to the fourth embodiment. Parts of a similarity judging unit 818 and a higher frequency band encoding unit 819 enclosed in dashed lines in FIG. 8, which correspond to the similarity judging unit 203 and the similarity judging unit 503 to judge similarity between the low frequency signal 208 and the high frequency signal 209 as well as to the higher frequency band encoding unit 205 to encode the high frequency signal 209 according to a result of judgment made by such similarity judging units in the encoding device 200 and the encoding device 500 according to the first to the third embodiments of the present invention, represent more preferable forms of a similarity judging unit and a higher frequency band encoding unit. Such encoding device 800 includes a time-frequency transforming unit 801, a band dividing unit 802, a noise characteristics judging unit 803, a prediction error calculating unit 804, a switch determining unit 805, a switching unit 806, a first higher frequency band encoding unit 807, and a second higher frequency band encoding unit 808 as units to encode the high frequency signal 209.

Figure 8:
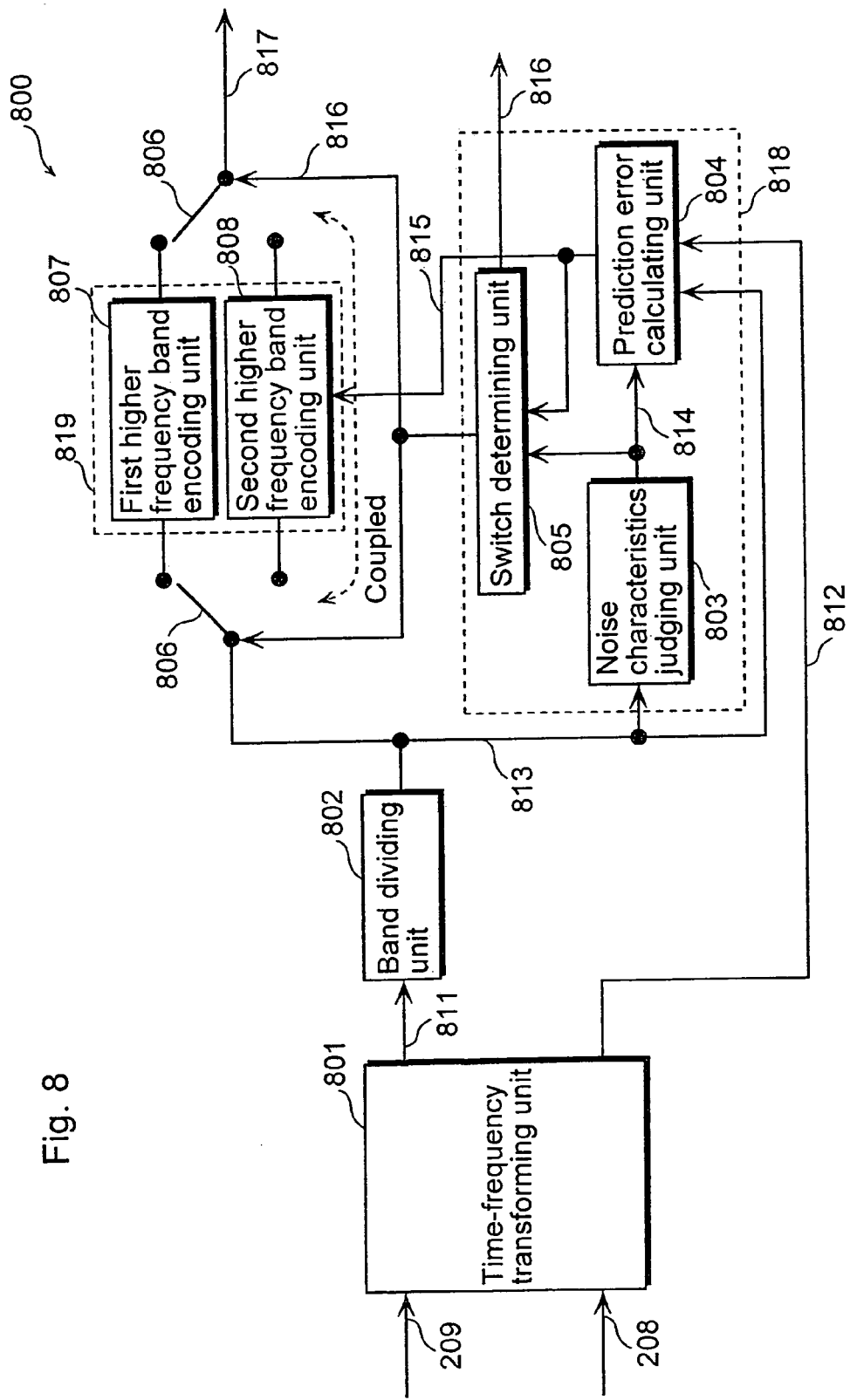
FIG. 8 is a block diagram showing a configuration of parts that generate a high frequency code and switching information in an encoding device according to the fourth embodiment.

In FIG. 8, the high frequency signal 209 and the low frequency signal 208, which are generated as a result of the division of the input signal into the higher frequency band and the lower frequency band performed in advance by the band dividing unit 201 not illustrated in the diagram, for example, are inputted to the time-frequency transforming unit 801. As the low frequency signal 208, either a low frequency signal which is divided directly from an input signal or a low frequency decoded signal which is decoded after encoded once by the lower frequency band encoding unit not illustrated in the diagram can be used. The time-frequency transforming unit 801 transforms the inputted high frequency signal 209 and low frequency signal 208 into spectral coefficients to output such signals as high frequency coefficients 811 and low frequency coefficients 812 respectively. Any one of known transforms such as Fourier transform, cosine transform, and filter bank may be adopted as a time-frequency transform used in the time-frequency transforming unit 801, but an example is provided here for the case where MDCT used in the AAC is employed.

The band dividing unit 802 divides the high frequency coefficients 811, which are MDCT coefficients determined as a result of transforming the high frequency signal 209, further into a plurality of bands (to be referred to as high frequency encoding sub-band(s) hereinafter), and the band-divided high frequency coefficients 813 are outputted to the noise characteristics judging unit 803, the prediction error calculating unit 804 and the switching unit 806. Note that processing for each high frequency encoding sub-band divided by the band dividing unit 802 is all the same and therefore that an explanation is provided only for processing for a certain high frequency encoding sub-band here. Encoding for the high frequency coefficients can be completed by just repeating the below-described processing for each high frequency encoding sub-band.

The noise characteristics judging unit 803 makes a judgment on noise characteristics of the high frequency coefficients 813 to output a noise characteristics judgment value 814. The reason of judging noise characteristics here is that, if the high frequency coefficients 813 to be encoded is a signal having noise characteristics, since it can be assumed in advance that similarity between such high frequency coefficients 813 and the low frequency coefficients 812 is low and therefore that the prediction error is big, the subsequent processing related to prediction error calculation can be omitted. Values of MDCT coefficients indicating that a signal has noise characteristics show an almost uniform distribution pattern. Therefore, when checking a plurality of MDCT coefficients included in a certain band, while many values are centered close to a certain value (e.g. the mean value) if a signal is a (stationary) noise, there are relatively many values centered even in parts greatly distant from the mean value if a signal does not have noise characteristics. In order to judge noise characteristics of the band-divided high frequency coefficients 813 by utilizing such characteristics of a noise, the noise characteristics judging unit 803 evaluates the size distribution of MDCT coefficients in each high frequency encoding sub-band, for example, to judge that a signal is of non-noise characteristics if the distribution width is larger than a predetermined threshold and that a signal has noise characteristics if the distribution width is smaller than a predetermined threshold. As a scale to evaluate the distribution of MDCT coefficients, any statistical evaluation value may be used which includes the difference between the minimum value and the maximum value, the difference between the mean value and the maximum value, dispersion and the standard deviation of MDCT coefficients in a high frequency encoding sub-band.

As a result of the judgment, the noise characteristics judging unit 803 outputs the noise characteristics judgment value 814 indicating noise characteristics/non-noise characteristics of the high frequency coefficients 813 to the prediction error calculating unit 804 and the switch determining unit 805. The noise characteristics judgment value 814 is expressed as "0", for example, when the high frequency coefficients 813 have noise characteristics, and as "1", for example, when the high frequency coefficients 813 do not have noise characteristics. Note that other values can be used as the noise characteristics judgment value 814. When notified through the noise characteristics judgment value 814 that the high frequency coefficients 813 are a signal of non-noise characteristics as a result of the judgment made by the noise judging unit 703, the prediction error calculating unit 804 calculates and evaluates the prediction error so as to judge similarity between the high frequency coefficients 813 and the low frequency coefficients 812. The prediction error can be calculated by following the method disclosed in the first embodiment. Therefore, the prediction error $E(k)$ can be calculated by using Expression 1 by replacing $x(i)$ with the low frequency coefficients 812, $y(j)$ with the high frequency coefficients 813 included in a high frequency encoding sub-band, and "m" with the number of MDCT coefficients included in the high frequency encoding sub-band. In Expression 1, by changing the shift number "k" within the predetermined values of the minimum value K_MIN and the maximum value K_MAX, low frequency coefficients $x(k,j)$, the shift number "k", and gain "a" which minimize the prediction error $E(k)$ can be determined as similarity information 815.

The switch determining unit 805 determines a higher frequency band encoding unit to be used for encoding the band-divided high frequency coefficients 813 according to the noise characteristics judgment value 814 and the similarity information 815, and outputs switching information 816 to switch between the first higher frequency band encoding unit 807 and the second higher frequency band encoding unit 808 at the switching unit 806. The first higher frequency band encoding unit 807 is an encoding unit configured to best encode high frequency coefficients 813 with a low degree of similarity and the second higher frequency band encoding unit 808 to best encode high frequency coefficients 813 with a high degree of similarity. The switching unit 806 selects the first higher frequency band encoding unit 807 when ① the noise characteristics judgment value 814 indicates that a signal has noise characteristics and ② the noise characteristics judgment value 814 indicates that a signal does not have noise characteristics and similarity is low, and selects the second higher frequency band encoding unit 808 when the noise characteristics judgment value 814 indicates that a signal has noise characteristics and similarity is high.

Figure 9A:
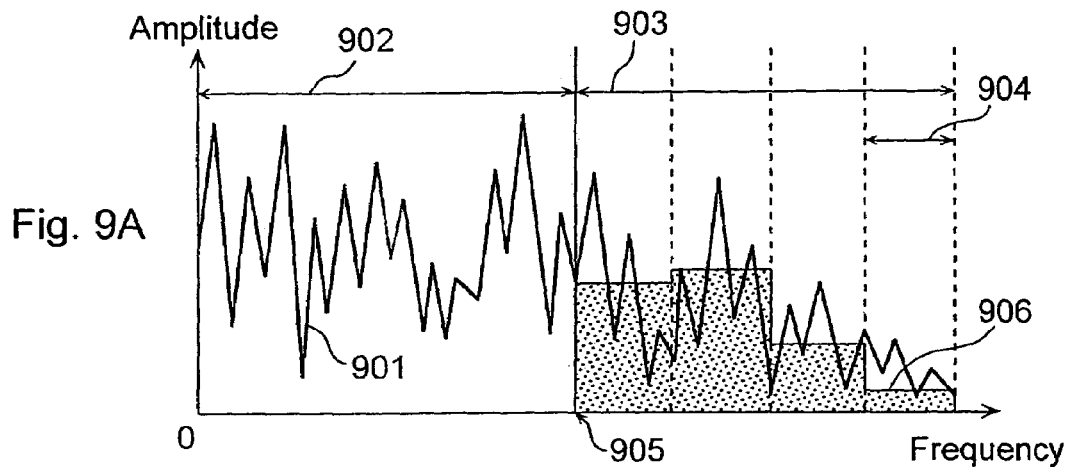
FIG. 9A is a diagram illustrating an encoding method of the first higher frequency band encoding unit.
Figure 9B:
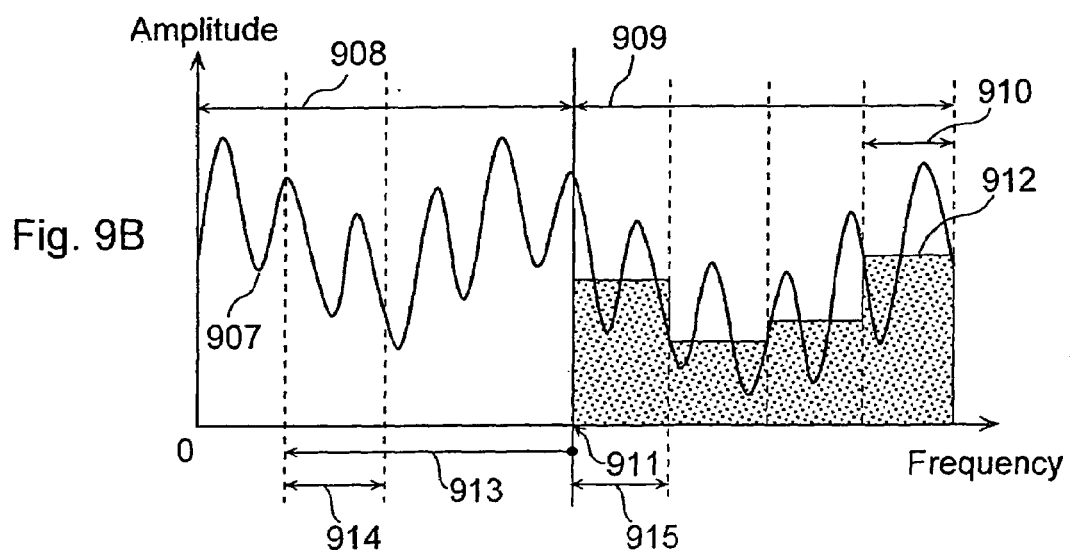
FIG. 9B is a diagram illustrating an encoding method of the second higher frequency band encoding unit.

Next, an explanation is provided for the operation of a higher frequency band encoding unit 819 with reference to the figures. FIG. 9A is a diagram showing the encoding method of the first higher frequency band encoding unit 807 and FIG. 9B illustrates the encoding method of the second higher frequency band encoding unit 808. Of a low frequency encoding band 902 and a high frequency encoding band 903 divided at an encoding boundary frequency 905, the high frequency coefficients 813 to be inputted to the first higher frequency band encoding unit 807 are MDCT coefficients (spectral coefficients) 901 included in the range of the high frequency encoding band 903. Such high frequency encoding band 903 is further divided into more than one high frequency encoding sub-band 904. Since the spectral coefficients 901 to be inputted to the first higher frequency band encoding unit 807 are coefficients, noise characteristics or similarity of which with MDCT coefficients in the range of the low frequency encoding band 902 is low, the first higher frequency band encoding unit 807 performs encoding by regarding coefficients in the high frequency encoding sub-band 904 as a random noise, without using the similarity information 815. In other words, such coefficients in the high frequency encoding sub-band 904 are expressed as a random sequence represented by an average amplitude 906, and only such average amplitude 906 (amplitude information) is encoded. Note that the average energy, the average power and other may be used other than the average amplitude as a representative value of such random sequence.

Similarly, of a low frequency encoding band 908 and a high frequency encoding band 909 divided at an encoding boundary frequency 911, the high frequency coefficients 813 to be inputted to the second higher frequency band encoding unit 808 are MDCT coefficients (spectral coefficients) 907 included in the range of the high frequency encoding band 909. Such high frequency encoding band 909 is further divided into more than one high frequency encoding sub-band 910. The spectral coefficients 907 to be inputted to the second higher frequency band encoding unit 808 are coefficients, similarity of which with spectral coefficients in the range of the low frequency encoding band 908 is high, the second higher frequency band encoding unit 808 performs encoding by the use of the similarity information 815. Assuming that one of the high frequency encoding sub-bands 810 is a high frequency section A 915, the above-explained prediction error calculating unit 804 selects a low frequency section B 914 which has the same number of spectral coefficients as the high frequency section A 915 and which therefore has the highest degree of similarity, out of coefficients in the low frequency encoding band 908, and then the similarity information 815 is outputted.

Of the similarity information 815, shift number 913 "k" is a distance from the encoding boundary frequency 911 to the lower limit frequency of the low frequency section B 914, with the encoding boundary frequency 911 set as the reference point. Gain "a" is the amplitude ratio between spectral coefficients 907 in the high frequency section A 915 and spectral coefficients 907 in the low frequency section B 914. In the second higher frequency band encoding unit 808, the shift number 913 "k", the gain "a", and per-sample differential signals of the spectral coefficients between the high frequency section A 915 and the low frequency section B 914 are encoded as the acquired similarity information 815. Note that encoding of differential signals between the high frequency section A 915 and the low frequency section B 914 may be omitted, in which case only the shift number 913 "k" and the gain "a" are encoded. Alternatively, it is possible to use noise components to represent differential signals between the high frequency section A 915 and the low frequency section B 914, in which case gain information of noise components is encoded in addition to the shift number "k" and the gain "a". With regard to a method to represent the gain "a" to be encoded, in addition to a method with which the gain "a" is represented as ① the amplitude ratio between spectral coefficients 907 in the high frequency section A 915 and spectral coefficients 907 in the low frequency section B 914, the gain "a" can be also represented as ② an average amplitude 912 of each high frequency encoding sub-band 910, or ③ an average energy in each high frequency encoding sub-band 910 and ④ an average power in each high frequency encoding sub-band 910 or the like, just like the amplitude information in the first higher frequency band encoding unit 807. Codes which are the differential signals encoded on a per high frequency encoding sub-band 910 basis are multiplexed with such information as the shift number "k" and the gain "a" to be outputted as the high frequency code 817.

Note that it is also possible to reduce the number of bits of the high frequency code 817 by compressing codes by the use of a mathematical technique at the multiplexing stage. The following includes exemplary methods: a method for re-encoding differential information between codes; a method for re-encoding a multiple number of codes as vector information; a method for replacing codes with variable length codes such as Huffman codes.

Moreover, in determining spectral coefficients 907 of a high frequency encoding sub-band 910, although band division is performed on the MDCT coefficients 811 after transforming the high frequency signal 209 into MDCT coefficients, it is also possible to divide the high frequency signal 209 into high frequency encoding sub-bands 810 through filter bank or the like and then determines MDCT coefficients in a high frequency encoding sub-band 910 by performing MDCT for a signal in each sub-band.

Furthermore, since the shift number 913 "k" to be encoded is information used to identify the low frequency section B 914, it does not have to be a value to indicate the number of samples in the frequency domain and therefore, by setting in advance more than one low frequency section with the same frequency width as a high frequency encoding sub-bands 912 in the low frequency encoding band 908, it is possible to express the shift number "k" by identification information indicating which low frequency section is selected from among them.

Moreover, although the band dividing unit 802 is placed after the time-frequency transforming unit 801, the present invention is not restricted to such placement and therefore it is also possible that the band dividing unit 802 is placed before the time-frequency transforming unit 801.

As explained above, by dividing MDCT coefficients in the higher frequency band into a plurality of high frequency encoding sub-bands, judging noise characteristics of MDCT coefficients in the higher frequency band as well as similarity between MDCT coefficients in the higher frequency band and MDCT coefficients in the lower frequency band on a per-high frequency encoding sub-band basis, and performing encoding through a higher frequency band encoding unit indicated as optimal by such judgment, it is possible to acquire a high-quality reproduction signal from a code represented by a smaller number of bits.

Figure 10:
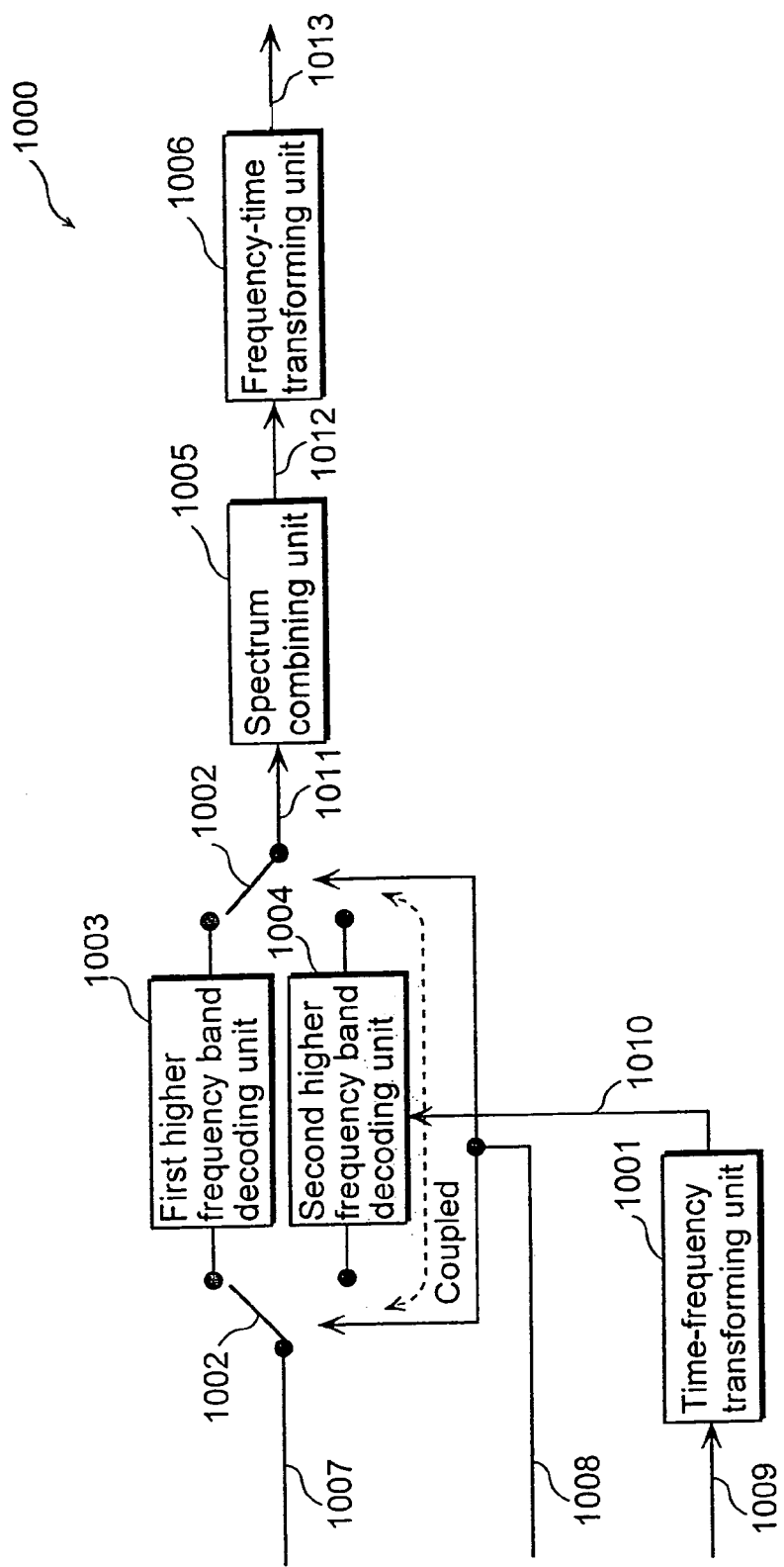
FIG. 10 is a block diagram showing a configuration of parts (higher frequency band decoding device) that decode the high frequency code in a decoding device used in a pair with the encoding device illustrated in FIG. 8.

Next, an explanation is provided for the configuration of a decoding device according to the fourth embodiment of the present invention with reference to FIG. 10, which is a block diagram showing the configuration of the part (a higher frequency band decoding device 1000) which decodes the high frequency code 817 in a decoding device used in a pair with the encoding device 800 illustrated in FIG. 8. Such higher frequency band decoding part (the higher frequency band decoding device 1000) illustrated in FIG. 10 represents a more preferable form as the part to decode a high frequency code in the decoding device 400 and the decoding device 700 according to the first to the third embodiments of the present invention. The higher frequency band decoding device 1000 is comprised of a time-frequency transforming unit 1001, a first higher frequency band decoding unit 1003, a second higher frequency band decoding unit 1004, a spectrum combining unit 1005, and a frequency-time transforming unit 1006. The following provides an explanation for the case where MDCT coefficients are employed as spectral coefficients in the higher frequency band decoding device 1000 as in the case of the above-mentioned encoding device 800. In FIG. 10, information to be inputted to the higher frequency band decoding device 1000 is a high frequency code 1007, switching information 1008, and a low frequency decoded signal 1009. The high frequency code 1007 is the high frequency code 817, for example, outputted from the first higher frequency band encoding unit 807 or the second higher frequency band encoding unit 808 of the encoding device 800 shown in FIG. 8. The switching information 1008 is the switching information 816, for example, outputted from the switch determining unit 805 of the encoding device 800. Furthermore, the low frequency decoded signal 1009 is the low frequency signal 410, for example, outputted from the lower frequency band decoding unit 402 of the decoding device 400 illustrated in FIG. 4.

The time-frequency transforming unit 1001 performs MDCT for the inputted low frequency decoded signal 1009 and outputs low frequency coefficients 1010 represented as MDCT coefficients. The first higher frequency band decoding unit 1003 is a decoding unit to decode high frequency code 1007 encoded by the use of noise, while the second higher frequency band decoding unit 1004 is a decoding unit to decode high frequency code 1007 encoded by the use of similarity between the low frequency coefficients 812 and the high frequency coefficients 813. Since the high frequency coefficients 813 are encoded having been divided into predetermined high frequency encoding sub-bands in advance in the encoding device 800, decoding processing which supports such encoding is performed on the basis of codes corresponding to each high frequency encoding sub-band. In other words, codes included in the high frequency code 1007 are divided into codes of each high frequency encoding sub-band so as to perform decoding for such divided codes on a per-high frequency encoding sub-band basis. If codes corresponding to each high frequency encoding sub-band are compressed by means of a mathematical method on the part of the encoding device 800, decoding by the use of a mathematical method is also performed.

When the switching information 1008 indicates that the high frequency code 1007 is to be inputted to the first higher frequency band decoding unit 1003, high frequency coefficients 1011 acquired as a result of decoding are expressed as a random noise. Therefore, only gain information indicating the signal strength is included in the high frequency code 1007. Accordingly, the first higher frequency band decoding unit 1003 generates a random noise signal inside and generates the band-divided high frequency coefficients 1011 by multiplying gain indicated by the decoded gain information with such generated noise signal.

In contrast, when the switching information 1008 indicates that the high frequency code 1007 is to be inputted to the second higher frequency band decoding unit 1004, the high frequency coefficients 1011 to be acquired as a result of decoding are expressed as the sum of low frequency coefficients within a specified low frequency section extracted from the low frequency coefficients 1010 according to a shift number and a differential extracted from the high frequency code 1007. Therefore, the high frequency code 1007 includes shift number "k" to indicate the position from which the low frequency coefficients are extracted, gain "a" which indicates, for example, an average amplitude of the high frequency coefficients, and information indicating the differential between the high frequency coefficients within a high frequency encoding sub-band and the low frequency coefficients within the low frequency section with the highest degree of similarity. The high frequency coefficients are encoded as MDCT coefficients, which are a kind of spectral coefficients, and therefore the low frequency decoded signal 1009 inputted in order to decode the high frequency coefficients also needs to be expressed as MDCT coefficients. Since the low frequency decoded signal 1009 is generally provided as a time signal, it is transformed into MDCT coefficients by the time-frequency transforming unit 1001 to be inputted to the second higher frequency band decoding unit 1004 as the low frequency coefficients 1010. If the low frequency decoded signal 1009 is provided as MDCT coefficients, such low frequency decoded signal 1009 can be regarded as the low frequency coefficients 1010 and therefore the time-frequency transforming unit 1001 can be omitted.

The second higher frequency band decoding unit 1004 extracts a predetermined number of MDCT coefficients from the position to which a shift is made only by the shift number "k" from a predetermined reference point in the low frequency coefficients 1010. Then the second higher frequency band decoding unit 1004 generates MDCT coefficients representing high frequency coefficients 1011 by multiplying the extracted low frequency MDCT coefficients with the gain "a" and adding to it spectral coefficients indicating the differential. Note that if spectral coefficients indicating the differential are omitted, the result of multiplying the extracted MDCT coefficients with the gain "a" serves as MDCT coefficients representing the high frequency coefficients 1011. The high frequency coefficients 1011 which are decode by the first higher frequency band decoding unit 1003 or the second higher frequency band decoding unit 1004 and which are band-divided into the frequency bandwidth of high frequency encoding sub-bands, are combined together by the spectrum combining unit 1005 to be outputted as high frequency coefficients 1012 samples which are placed in increasing frequency order in the high frequency encoding band. Then, the frequency-time transforming unit 1006 transforms the high frequency coefficients 1012 into a time signal and generates a high frequency signal 1013.

Note that if the shift number "k" is not information indicating the number of samples in the frequency domain but identification information indicating a predetermined specific low frequency section, MDCT coefficients in such predetermined specific low frequency section may be extracted according to the identification information.

As explained above, out of an input signal which is encoded having been divided into a high frequency signal and a low frequency signal, by decoding the high frequency signal by the use of similarity between such high frequency signal and low frequency signal, the use of a high frequency code encoded in a more efficient manner is realized, making it possible to acquire a high-quality reproduction signal from a code represented by a smaller number of bits.

The Fifth Embodiment

Figure 11:
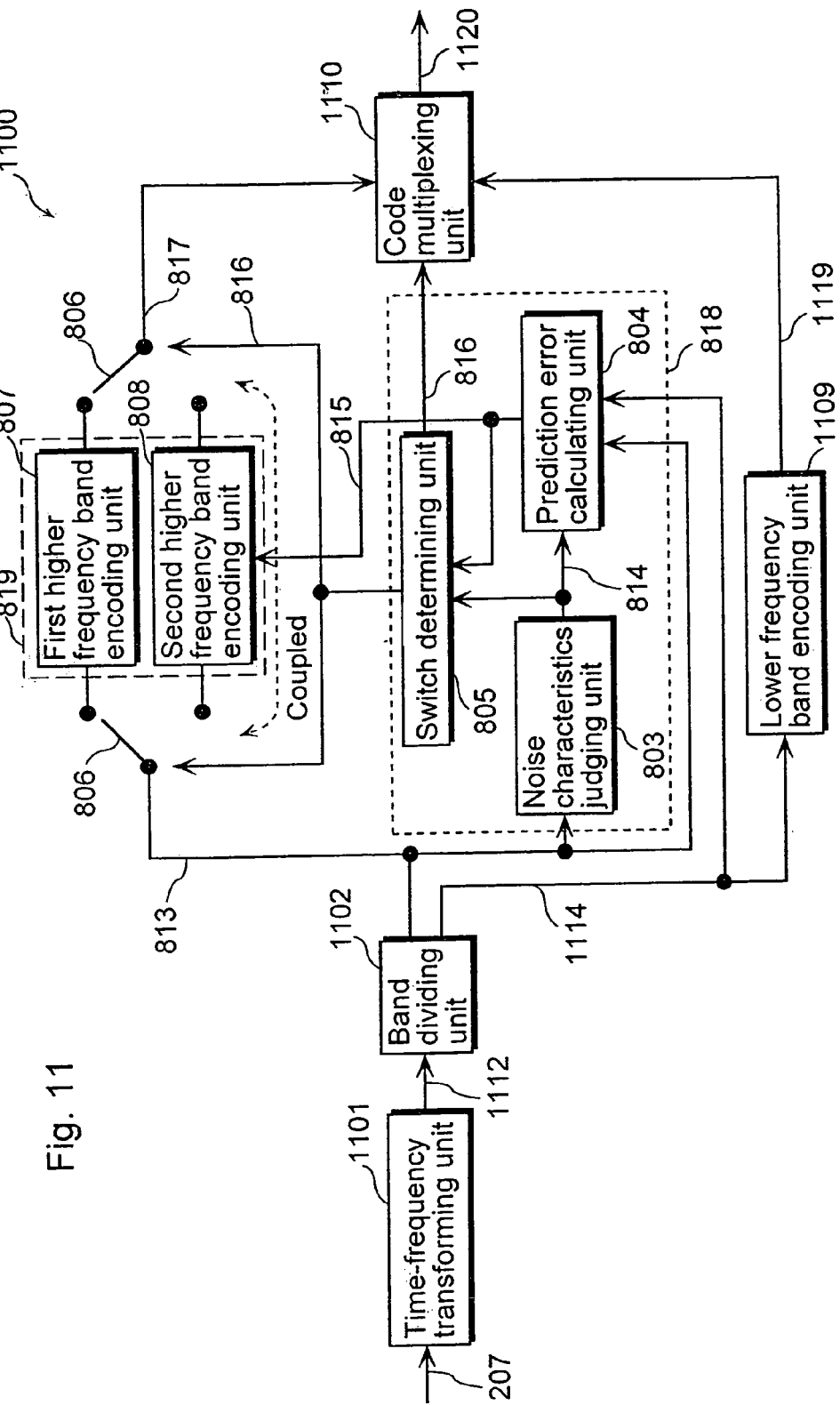
FIG. 11 is a block diagram showing a configuration of an encoding device according to the fifth embodiment.

The configuration of an encoding device according to the fifth embodiment of the present invention is explained with reference to FIG. 11, which is a block diagram showing the configuration of an encoding device 1100 according to the fifth embodiment. The encoding device 1100 shown in FIG. 11, which includes the similarity judging unit 818 and the higher frequency band encoding unit 819 of the encoding device 800 illustrated in FIG. 8, performs encoding for the lower frequency band by the use of low frequency spectral coefficients for which time-frequency transform is performed in advance. While any one of known spectral coefficients may be used including Fourier transform coefficients and cosine transform coefficients as spectral coefficients encoded by the lower frequency band encoding unit, here, the lower frequency band encoding unit performs encoding pursuant to the AAC system and MDCT coefficients are employed as spectral coefficients. In FIG. 11, the encoding unit 1100 is comprised of a time-frequency transforming unit 1101, a band dividing unit 1102, the similarity judging unit 818 (the noise characteristics judging unit 803, the prediction error calculating unit 804 and the switch determining unit 805), the higher frequency band encoding unit 819 (the first higher frequency band encoding unit 807 and the second higher frequency band encoding unit 808), a lower frequency band encoding unit 1109, and a code multiplexing unit 1110. The time-frequency transforming unit 1101 collectively performs MDCT for the input signal 207 which includes the low frequency signal and the high frequency signal to output MDCT coefficients 1112. Since the lower frequency band encoding unit 1109, the first higher frequency band encoding unit 807 and the second higher frequency band encoding unit 808 are all encoding units that encode MDCT coefficients, with the time-frequency transforming unit 1101 collectively transforming the input signal 207 into the MDCT coefficients 1112, required MDCT coefficients can be determined by one transform. This results in the reduction in the amount of processing concerning calculations of MDCT coefficients as compared to the case where MDCT is performed in a lower frequency band encoding unit and a higher frequency band encoding unit separately.

The band dividing unit 1102 divides the MDCT coefficients 1112 into low frequency coefficients 1114 and the high frequency coefficients 813. Regarding this, since such band dividing processing is performed on MDCT coefficients, processing such as band division filter in the band dividing unit 1102 can be omitted, allowing a reduced amount of processing to be performed in the band dividing unit 1102. Meanwhile, it is possible for the high frequency coefficients 813 to be band-divided into high frequency encoding sub-bands at this stage. As explained above, the band-divided high frequency coefficients 813, processing for which is performed by the similarity judging unit 818 and the higher frequency band encoding unit 819 illustrated in FIG. 8, are outputted as the switching information 816 and the high frequency code 817. Furthermore, the lower frequency band encoding unit 1109 encodes low frequency coefficients 1114 in accordance with the AAC system to output it as a low frequency code 1119. The code multiplexing unit 1110 multiplexes the switching information 816 outputted from the switch determining unit 805, the high frequency code 817 outputted from the higher frequency band encoding unit 819, and the low frequency code 1119 outputted from the lower frequency band encoding unit 1109 to generate an output code 1120.

As described above, with the encoding device 1100 with the above configuration, it is possible to encode high frequency coefficients and low frequency coefficients through a smaller amount of processing.

Figure 12:
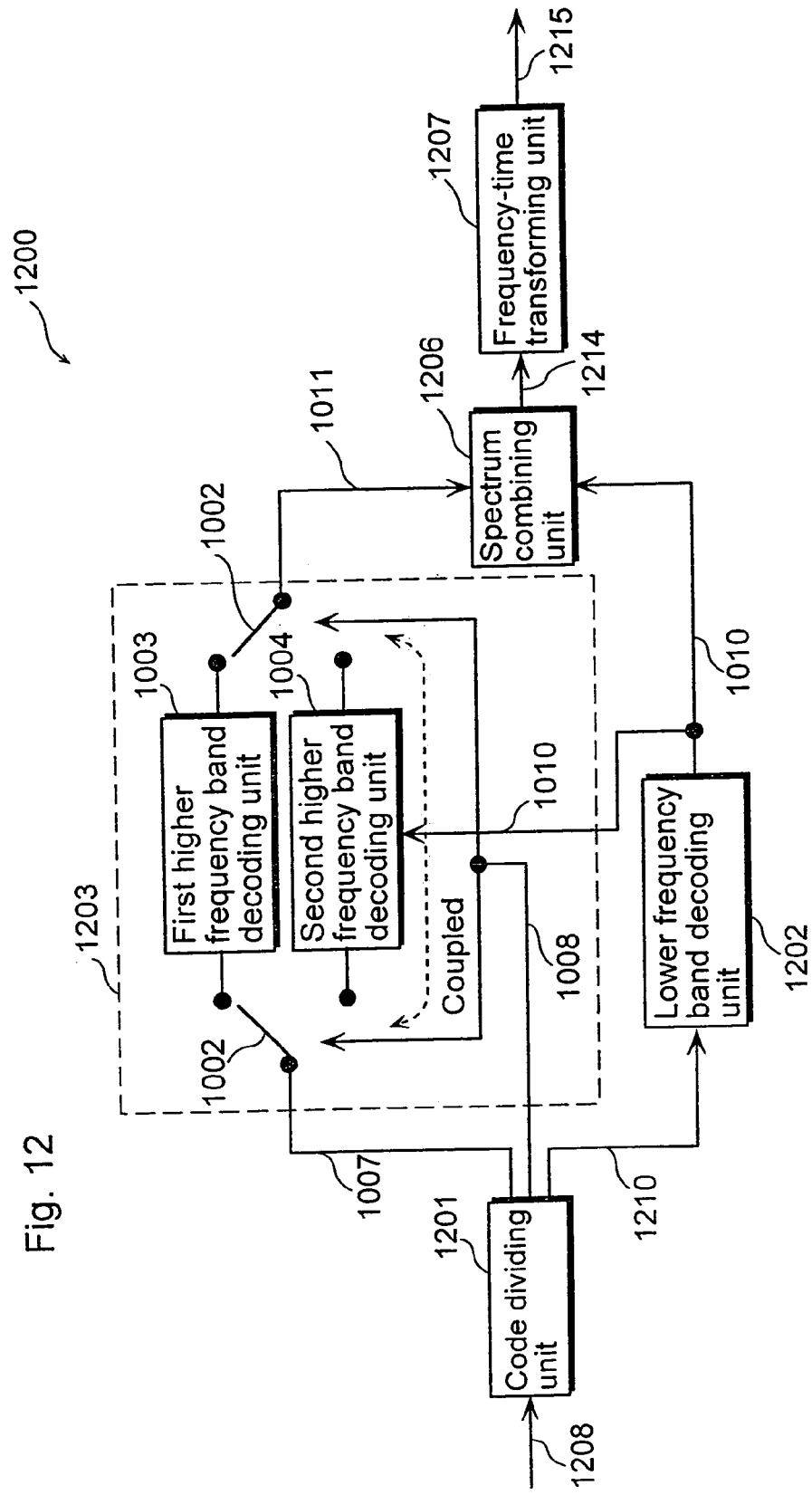
FIG. 12 is a block diagram showing a configuration of a decoding device that decodes an input code which is the output code of the encoding device illustrated in FIG. 11.

Next, an explanation is provided for the configuration of a decoding device according to the fifth embodiment of the present invention with reference to FIG. 12, which is a block diagram showing the configuration of a decoding device 1200 for decoding an input code 1208 which is the output code 1120 of the encoding device 1100 illustrated in FIG. 11. The decoding device 1200 illustrated in FIG. 12 has the higher frequency band decoding unit 1000 illustrated in FIG. 10 and the lower frequency band decoding unit decodes low frequency spectral coefficients acquired as MDCT coefficients. While any one of known spectral coefficients may be used including Fourier transform coefficients and cosine transform coefficients as spectral coefficients decoded by the lower frequency band decoding unit, here, the lower frequency band decoding unit performs decoding in accordance with the AAC system and MDCT coefficients are employed as spectral coefficients. This decoding device 1200 is comprised of the higher frequency band decoding device 1000 (the first higher frequency band decoding unit 1003 and the second higher frequency band decoding unit 1004), a code dividing unit 1201, a lower frequency band decoding unit 1202, a spectrum combining unit 1206 and a frequency-time transforming unit 1207.

In the decoding device 1200, parts corresponding to the higher frequency band decoding device 1000 illustrated in FIG. 10 are the switching unit 1002, the first higher frequency band decoding unit 1003, the second higher frequency band decoding unit 1004, the lower frequency band decoding unit 1202, the spectrum combining unit 1206 and the frequency-time transforming unit 1207, but the lower frequency band decoding unit 1202 is different from time-frequency transforming unit 1001 illustrated in FIG. 10 in that such lower frequency band decoding unit 1202 decodes the low frequency code 1210 which is encoded low frequency MDCT coefficients. The spectrum combining unit 1206 is different from the spectrum combining unit 1005 illustrated in FIG. 10 in that it combines the low frequency coefficients 1010 not only with the high frequency coefficients 1011 but also with the spectrum-combined high frequency coefficients 1011. Moreover, the frequency-time transforming unit 1207 of the decoding device 1200 is different from the frequency-time transforming unit 1006 illustrated in FIG. 10 which performs MDCT for the low frequency decoded signal 1009 on the time domain in that the frequency-time transforming unit 1207 performs inverse MDCT for the MDCT coefficients 1214 which are combined with the low frequency coefficients 1010 in addition to the high frequency coefficients 1012.

In the decoding device 1200 illustrated in FIG. 12, the code dividing unit 1201 extracts the switching information 1008, the high frequency code 1007, and a low frequency code 1210 from the input code 1208. Subsequently, the lower frequency band decoding unit 1202 decodes the extracted low frequency code 1210 in accordance with the AAC system to output the low frequency coefficients 1010. Both switching information 1008 and the high frequency code 1007 extracted from the input code 1208 are inputted to the higher frequency band decoding device 1000 illustrated in FIG. 10. In the higher frequency band decoding device 1000, the first higher frequency band decoding unit 1003 or the second higher frequency band decoding unit 1004 selected according to the switching information 1008 decodes the high frequency code 1007 to output the high frequency coefficients 1011. Since such high frequency coefficients 1011 are decoded here by the use of similarity with the low frequency coefficients, the low frequency decoded signal outputted from the lower frequency band decoding unit needs to be transformed into the same MDCT coefficients as the high frequency coefficients 1011. In contrast, since both the high frequency coefficients and the low frequency coefficients are transformed into MDCT coefficients by the encoding device 1100 according to the present configuration, the low frequency coefficients 1010 are outputted as MDCT coefficients, which therefore requires no transform processing for the low frequency coefficients 1010, resulting in a reduced amount of processing.

The spectrum combining unit 1206 combines the low frequency coefficients 1010 outputted from the lower frequency band decoding unit 1202 with the high frequency coefficients 1011 outputted from the higher frequency band decoding device 1000 in the frequency domain. The frequency-time transforming unit 1207 collectively transforms MDCT coefficients 1214 generated as a result of such combining processing performed by the spectrum combining unit 1206 into a time signal, which is then generated as an output signal 1215.

As described above, with the encoding device that performs encoding using the high frequency coefficients and the low frequency coefficients which are collectively performed time-frequency transform as well as the decoding device collectively performing frequency-time transform for such resulting codes, it is possible for the decoding device to decode the high frequency spectral coefficients and the low frequency spectral coefficients through a smaller amount of processing so as to acquire an output signal.

Note that it is possible also in the encoding device 1100 and the decoding device 1200 with the above configuration that the encoding device includes a down-sampling unit and the decoding unit includes an up-sampling unit and that encoding for the lower frequency band is performed at a lower sampling frequency than the sampling frequency of an input signal, as presented in the third embodiment. More importantly, as a down-sampling method, the present configuration allows the low frequency coefficients 1114 divided by the band dividing unit 1102 of the encoding device 1100 to be regarded as coefficients acquired as a result of transforming a signal at a sampling frequency after down-sampling is performed, so as to perform processing. For example purposes, an explanation is provided for the case where an input signal at the sampling frequency of 48 kHz is down-sampled to half the frequency of 24 kHz.

Assuming that MDCT coefficients 2048 samples are acquired as a result of transforming 2048 samples of the input signal, such MDCT coefficients 2048 samples represent a signal at 0~24 kHz. When 1024 samples on the lower frequency side are extracted out of MDCT coefficients 2048 samples as low frequency coefficients, such low frequency coefficients represent a signal at 0~12 kHz. If inverse-MDCT is performed for such low frequency coefficients 1024 samples, a time signal having 1024 samples is acquired, as a result of which the number of samples of the time signal is reduced to half. This means that such time signal is down-sampled to half the value of the sampling frequency. Meanwhile, since inverse-MDCT processing is not necessary if the lower frequency band encoding unit uses MDCT coefficients, it is possible to simplify down-sampling-related processing. Also in the case of up-sampling, processing is performed by regarding decoded low frequency coefficients as coefficients acquired as a result of transforming a signal at a sampling frequency after up-sampling is performed.

The Sixth Embodiment

Figure 13:
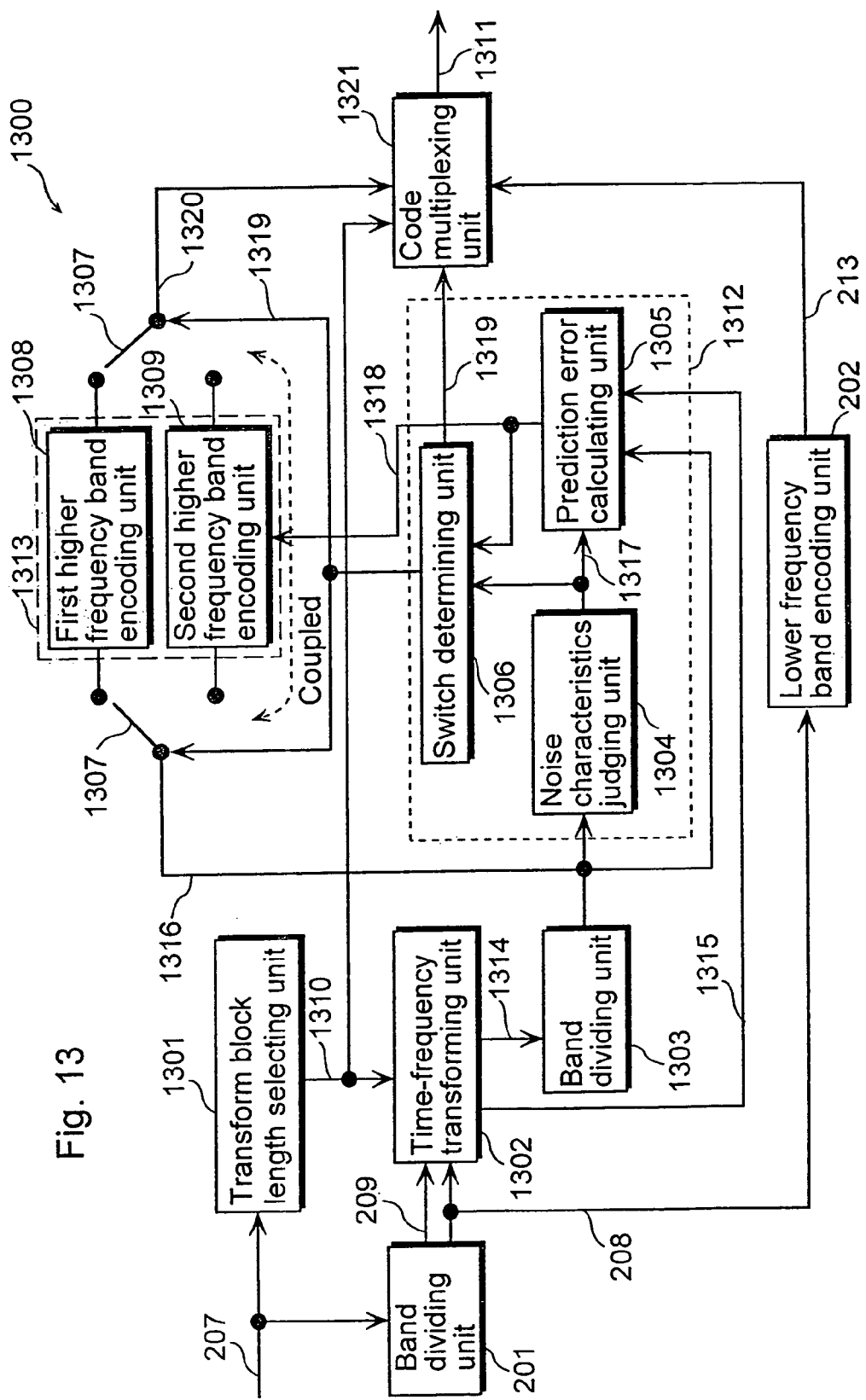
FIG. 13 is a block diagram showing a configuration of an encoding device according to the sixth embodiment.

FIG. 13 is a block diagram showing the configuration of an encoding device 1300 according to the sixth embodiment. The encoding device 1300 is an encoding device for performing time-frequency transform by switching a transform block length of an input signal according to whether such input signal varies steeply in amplitude in an infinitesimal period of time. Such encoding device 1300 is comprised of the band dividing unit 201, the lower frequency band encoding unit 202, a transform block length selecting unit 1301, a time-frequency transforming unit 1302, a band dividing unit 1303, a similarity judging unit 1312 (a noise characteristics judging unit 1304, a prediction error calculating unit 1305 and a switch determining unit 1306), a switching unit 1307, a higher frequency band encoding unit 1313 (a first higher frequency band encoding unit 1308 and a second higher frequency band encoding unit 1309), and a code multiplexing unit 1321.

Note that only the difference between the higher frequency band encoding unit 1313 and the similarity judging unit 1312 illustrated in FIG. 13, and the higher frequency band encoding unit 819 and the similarity judging unit 818 of the encoding device 800 illustrated in FIG. 8 is that the former perform processing in units of frequency coefficients having the number of samples which differs depending on a selection of the transform block length selecting unit 1301 and therefore that their configurations and the contents of processing are all the same. Moreover, a high frequency code 1320 is different from the high frequency code 817 only in that the high frequency code 1320 is encoded with a block length which differs depending on a selection of the transform block length selecting unit 1301. Similarly, a noise characteristics judgment value 1317, similarity information 1318, and switching information 1319 differ respectively from the noise characteristics judgment value 814, the similarity information 815, and the switching information 816 illustrated in FIG. 8 only in that a transform block length of the high frequency coefficients 1316 to be processed varies according to a selection of the transform block length selecting unit 1301. Note that since the configuration and the operation of the higher frequency band encoding unit 819 and the similarity judging unit 818 shown in FIG. 8 are already explained, explanations for the higher frequency band encoding unit 1313 and the similarity judging unit 1312 are omitted unless they are related to newly added processing.

In FIG. 13, the transform block length selecting unit 1301 determines a transform block length to be used in the time-frequency transforming unit 1302, according to characteristics of the input signal 207. The transform block length selecting unit 1301 measures, for example, the amount of variation at an average signal level of the input signal 207 within an infinitesimal time Δt. If the measured amount of variations exceeds a specified value, a shorter transform block length is selected, while a longer transform block length is selected if the measured amount of variations is at or below a specified value. A transform block length to be determined may be either an arbitrary length or a length to be selected from among predetermined multiple alternatives. In the following, switching is made between two transform block lengths, of which 1024 samples is used for the longer transform block length and 128 samples for the shorter transform block length. Such longer transform block length and shorter transform block length are respectively referred to as basic transform block and transform sub-block. According to this configuration, one basic transform block can be divided into eight transform sub-blocks. The transform block length selecting unit 1301 generates block length information 1310 indicating a selected transform block length.

According to the block length information 1310 generated by the transform block length selecting unit 1301, the time-frequency transforming unit 1302 transforms the low frequency signal 208 and the high frequency signal 209 band-divided by the band dividing unit 201 and outputs such two signals as low frequency coefficients 1315 and high frequency coefficients 1314. Any one of known transforms such as Fourier transform, cosine transform and filter bank may be employed as a time-frequency transform used in the time-frequency transforming unit 1302, but MDCT is employed in the following explanation. The band dividing unit 1303 divides the high frequency coefficients 1314 represented as MDCT coefficients further into a plurality of high frequency encoding sub-bands and then outputs them to the noise characteristics judging unit 1304, the prediction error calculating unit 1305, and the switching unit 1307.

Figure 14:
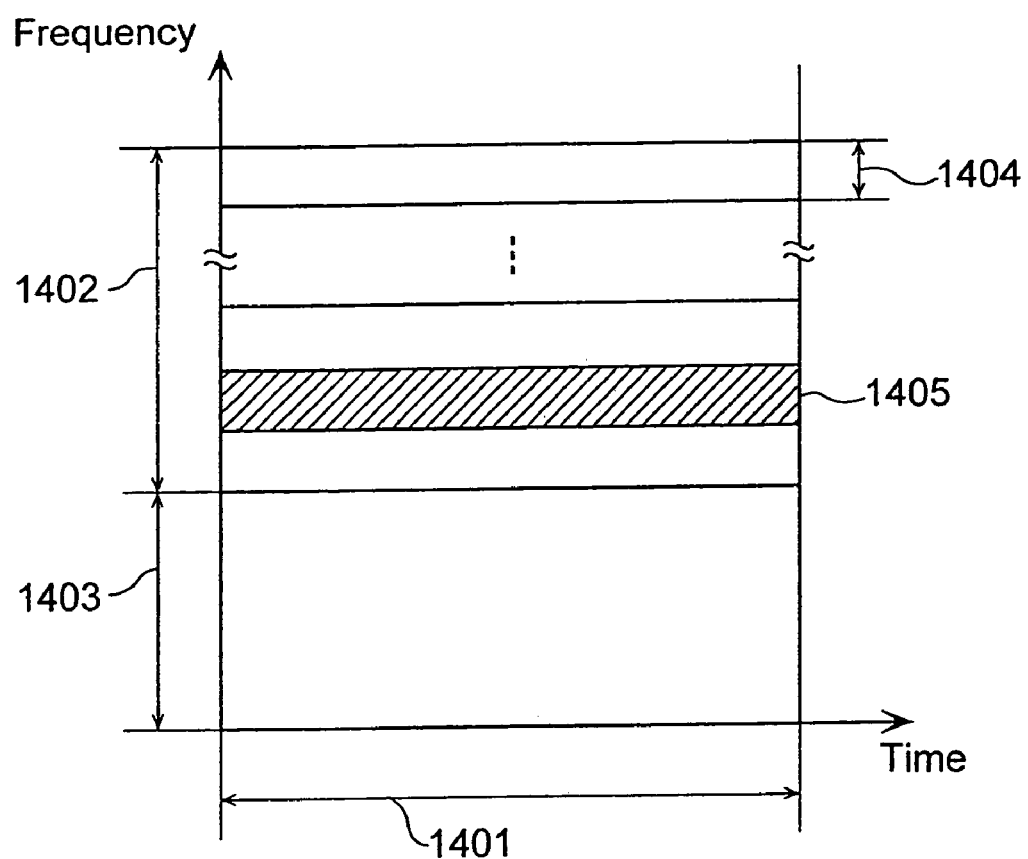
FIG. 14 is a diagram showing high frequency coefficients and low frequency coefficients in the case where a basic transform block is selected in the transform block length selecting unit illustrated in FIG. 13.
Figure 15:
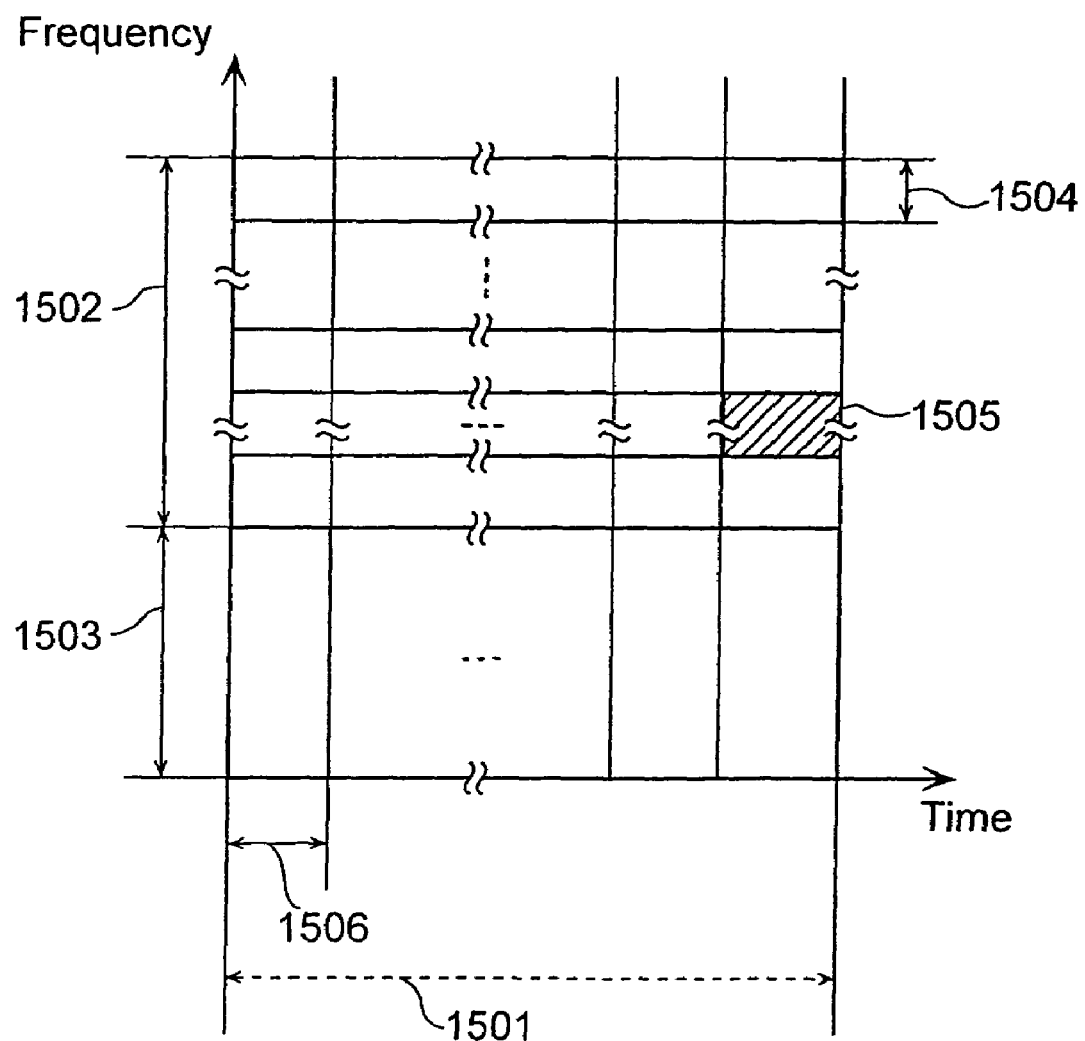
FIG. 15 is a diagram showing high frequency coefficients and low frequency coefficients in the case where a transform sub-block is selected in the transform block length selecting unit illustrated in FIG. 13.

Here, an explanation is provided for the relation between band-divided higher frequency coefficients 1316 and the subsequent encoding processing with reference to figures. FIG. 14 is a diagram illustrating the high frequency coefficients 1316 and the low frequency coefficients 1315 in the case where a basic transform block 1401 is selected by the transform block length selecting unit 1301 illustrated in FIG. 13, while FIG. 15 is a diagram illustrating the high frequency coefficients 1316 and the low frequency coefficients 1315 in the case where a transform sub-block 1506 is selected in the transform block length selecting unit 1301 illustrated in FIG. 13. Both FIGS. 14 and 15 depict the high frequency coefficients 1316 and the low frequency coefficients 1315 in the case where a signal having 1024 samples per frame, for example, is inputted. As illustrated in FIG. 14, when the basic transform block 1401 is selected by the transform block length selecting unit 1301, the time-frequency transforming unit 1302 performs transform only once for the high frequency signal 209 represented by 1024 samples per a frame with the transform block length of 1024 samples. This is also applicable to the low frequency signal 208. Therefore, concerning the direction of the time domain, the high frequency coefficients 1314 in a high frequency encoding band 1402 and the low frequency coefficients 1315 in a low frequency encoding band 1403 are made up of a single set of coefficients to be determined by one transform. To put it another way, such coefficients can be regarded as independent of temporal changes in the sampling time of the above-mentioned one frame. As for the direction of frequency domain, however, the high frequency coefficients 1314 in the high frequency encoding band 1402 are divided further into a plurality of high frequency encoding sub-bands 1404 by the band dividing unit 1303 to be high frequency coefficients 1316 made up of multiple sets of high frequency encoding sub-bands 1404. Of the high frequency coefficients 1314 included in each basic transform block 1401, only coefficients which correspond to the frequency domain of a high frequency encoding band 1402 have values, while the other coefficients are represented as 0. Similarly, of the low frequency coefficients 1315 included in each basic transform block 1401, only coefficients which correspond to the frequency domain of a low frequency encoding band 1403 have values, while the other coefficients are represented as 0. In FIG. 14, only low frequency coefficients and high frequency coefficients having values are shown on the same plane. Note that since the subsequent encoding processing for the high frequency coefficients 1316 is performed on a per high frequency encoding sub-band 1404 basis in the direction of the frequency domain, encoding processing by the use of the basic transform block 1401 is performed for each diagonally shaded domain 1405 within each high frequency encoding sub-band 1404 (to be referred to as "encoding cell" hereinafter).

In contrast, as illustrated in FIG. 15, when the transform sub-block 1506 is selected by the transform block length selecting unit 1301, the time-frequency transforming unit 1302 performs transform with the transform block length of 128 samples for the high frequency signal 209 represented by 1024 samples in one frame 1501 for eight times (1024/128). This is applicable to the low frequency signal 208 in a low frequency encoding band 1503. Therefore, both the high frequency coefficients 1314 and the low frequency coefficients 1315 acquired as a result of transform by the time-frequency transforming unit 1302 are coefficients made up of eight sets of transform sub-blocks 1506 in the direction of the time domain. The high frequency coefficients 1314 included in each transform sub-block 1506 are 128 samples and only coefficients which correspond to the frequency domain of a high frequency encoding band 1502 have values, while the other coefficients are represented as 0. Similarly, the low frequency coefficients 1315 included in each transform sub-block 1506 are 128 samples and only coefficients which correspond to the frequency domain of a low frequency encoding band 1503 have values, while the other coefficients are represented as 0. In FIG. 15, only low frequency coefficients and high frequency coefficients having values are shown on the same plane. The high frequency coefficients 1314 in the high frequency encoding band 1502 are further divided by the band dividing unit 1303 into more than one high frequency encoding sub-band 1504 in the direction of the frequency domain. Accordingly, the subsequent processing is performed in units of an encoding cell 1505, which is diagonally shaded in FIG. 15.

As is obvious from FIGS. 14 and 15, more precise encoding in the direction of the time domain can be performed when the transform sub-block 1506 is used as a transform block length rather than the basic transform block 1401, for the encoding cell is divided more finely in the direction of the time domain. However, the number of encoding cells per unit of time increases if the number of divisions in the direction of the frequency domain is the same, which inevitably results in a larger amount of bits required for encoding. In order to circumvent this problem, when the transform sub-block 1506 illustrated in FIG. 15 is used, the number of divisions in the direction of the frequency domain, that is, the number of high frequency encoding sub-bands 1504, needs to be smaller than that of the high frequency encoding sub-band 1404 at the time of using the basic transform block 1401 illustrated in FIG. 14. As a result, the encoding cell 1405 which is more finely divided in the direction of frequency domain is used when the basic transform block 1401 is employed, and the encoding cell 1505 which is more finely divided into the direction of the time domain is used when the transform sub-block 1506 is employed. As described above, it is possible for the encoding device 1300 to encode the input signal 207 in a more efficient manner by using the encoding cell 1405 and the encoding cell 1505 appropriately depending on the characteristics of such input signal 207.

Processing which each processing unit of the encoding device 1300 performs for each encoding cell is the same regardless of whether the basic transform block 1401 or the transform sub-block 1506 is used. Therefore, encoding of the high frequency coefficients 1316 in one frame is completed by just repeating the encoding processing performed by the similarity judging unit 1312 and the higher frequency band encoding unit 1313 for all encoding cells.

The code multiplexing unit 1321 multiplexes the block length information 1310 generated by the transform block length selecting unit 1301, the switching information 1319 from the switch determining unit 1306, the low frequency code 213 from the lower frequency band encoding unit 202, and a high frequency code 1320 from the higher frequency band encoding unit 1313 and outputs an output code 1311.

Note that, in determining MDCT coefficients in a high frequency encoding sub-band, the high frequency signal 209 is transformed into MDCT coefficients first and then band-division is performed on the MDCT coefficients in the present embodiment, but as an equivalent configuration, it is also possible that MDCT coefficients in a high frequency encoding sub-band are determined by dividing in advance the high frequency signal 209 into high frequency encoding sub-bands through filter bank or the like and then performing MDCT for a signal in each band.

As explained above, by dividing MDCT coefficients in the higher frequency band into a multiple number of encoding cells and by judging noise characteristics as well as similarity with MDCT coefficients in the lower frequency band on a per-encoding cell basis so as to perform encoding by the use of the optimal higher frequency band encoding unit indicated by the result of such judgment, the effect of acquiring a high-quality reproduction signal in accordance with the characteristics of the input signal 207 from a code represented by a smaller number of bits.

Figure 16:
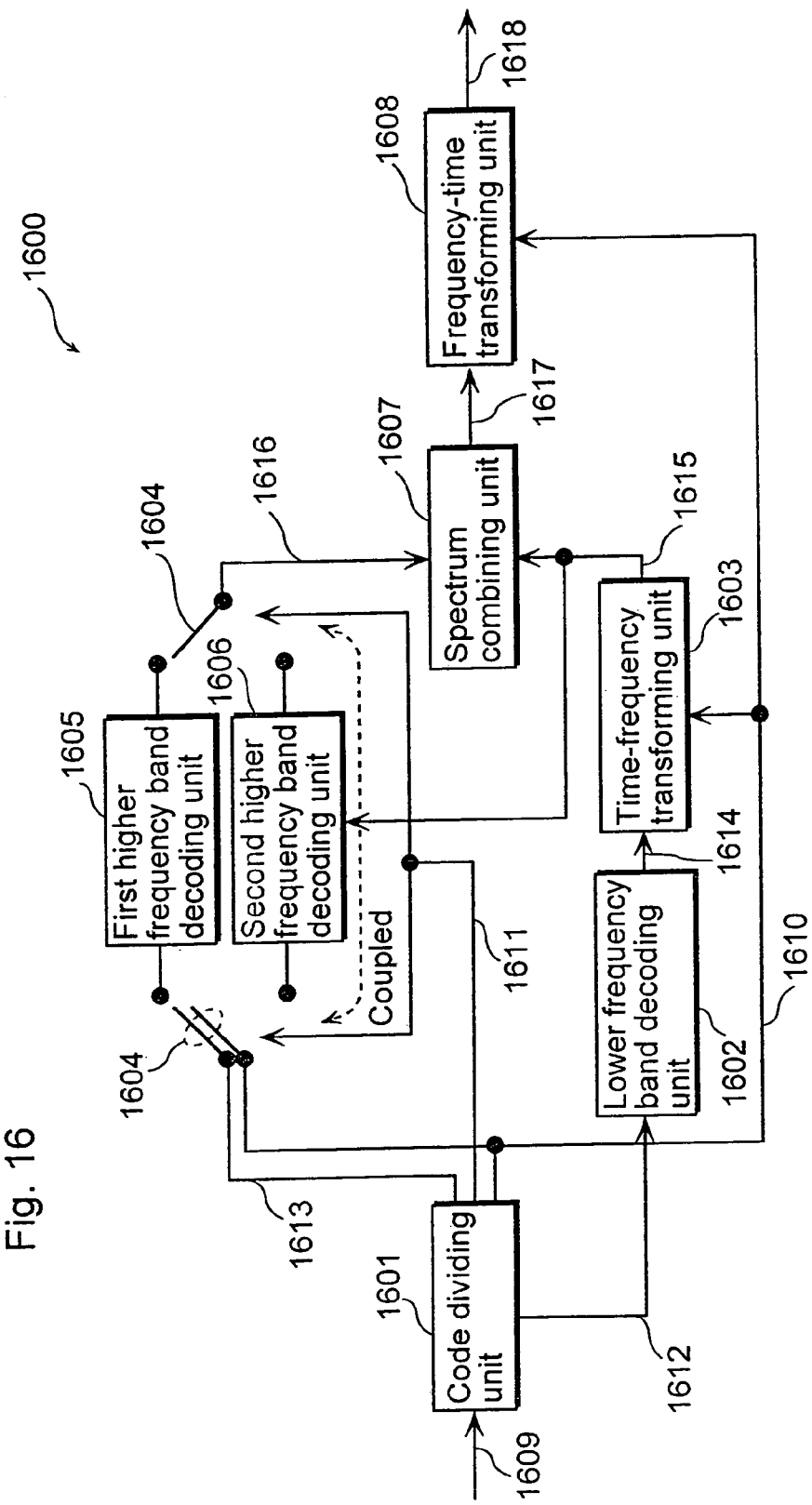
FIG. 16 is a block diagram showing a configuration of a decoding device that decodes the output code outputted by the encoding device illustrated in FIG. 13.

Next an explanation is provided for a decoding device according to the sixth embodiment with reference to FIG. 16, which is a block diagram showing the configuration of a decoding device 1600 for decoding the output code 1311 outputted by the encoding device 1300 illustrated in FIG. 13. The following explanation is indented for the case where MDCT coefficients are used as frequency spectral coefficients as in the case of the above-explained encoding device 1300. In FIG. 16, the decoding device 1600 is a decoding device for decoding a high frequency code encoded with either a basic transform block or a transform sub-block depending on block length information included an input code. Such decoding device 1600 is comprised of a code dividing unit 1601, a lower frequency band decoding unit 1602, a time-frequency transforming unit 1603, a switching unit 1604, a first higher frequency band decoding unit 1605, a second higher frequency band decoding unit 1606, a spectrum combining unit 1607, and a frequency-time transforming unit 1608. The code dividing unit 1601 extracts block length information 1610, switching information 1611, a low frequency code 1612, and a high frequency code 1613 from an input code 1609. The lower frequency band decoding unit 1602 decodes the extracted low frequency code 1612 to output a low frequency signal 1614 which is a time signal. The time-frequency transforming unit 1603 transforms the low frequency signal 1614 with a transform block length indicated by the block length information 1610 and determines low frequency coefficients 1615 which are MDCT coefficients expressing low frequency components.

The switching unit 1604 switches between the first higher frequency band decoding unit 1605 and the second higher frequency band decoding unit 1606 according to the extracted switching information 1611, and inputs the block length information 1610 and the high frequency code 1613 to a selected higher frequency band decoding unit. Here, the first higher frequency band decoding unit 1605 is a decoding unit to decode a code which is encoded by the use of noise, while the second higher frequency band decoding unit 1606 is a decoding unit to decode a code which is encoded by the use of similarity between low frequency coefficients 1615 and high frequency coefficients. Since high frequency coefficients are encoded having been divided into predetermined encoding cells according to a transform block length and a high frequency encoding sub-band, decoding processing is performed for codes corresponding to each encoding cell. In other words, a code included in the high frequency code 1613 is divided into codes of each encoding cell, and decoding processing to be performed for divided codes is carried out repeatedly for all encoding cells. If codes corresponding to each encoding cell are compressed by means of a mathematical method on the part of the encoding device 1300, decoding by the use of a mathematical method is also performed.

When the switching information 1611 indicates that the high frequency code 1613 is to be inputted to the first higher frequency band decoding unit 1605, high frequency coefficients to be decoded are represented as a random noise signal, and only gain information indicating the signal strength is included in the high frequency code 1613. Accordingly, the first higher frequency band decoding unit 1605 generates a random noise signal inside and generates band-divided high frequency coefficients 1616 by multiplying the decoded gain with the generated noise signal.

In contrast, when the switching information 1611 indicates that the high frequency code 1613 is to be inputted to the second higher frequency band decoding unit 1606, the band-divided high frequency coefficients 1616 are expressed by the sum of coefficients extracted out of the low frequency coefficients 1615 and the differential between the high frequency coefficients and the low frequency coefficients encoded in the high frequency code 1613. Therefore, the high frequency code 1613 includes shift number "k" to indicate the position from which the low frequency coefficients are extracted, gain "a", and information indicating the differential between the high frequency coefficients and the low frequency coefficients. The second higher frequency band decoding unit 1606 extracts out of the inputted low frequency coefficients 1615 a predetermined number of MDCT coefficients from the position to which a shift is made only by the shift number "k" from a predetermined reference point. The number of samples of MDCT coefficients to be extracted differs depending on a block length to be selected. The second higher frequency band decoding unit 1606 generates MDCT coefficients representing high frequency coefficients by multiplying the extracted low frequency MDCT coefficients with the gain "a" and by adding to it spectral coefficients indicating the decoded differential information. Note that if information indicating the differential is omitted, the result of multiplying the extracted MDCT coefficients with the gain "a" serves as MDCT coefficients representing the high frequency coefficients. Furthermore, if information indicating the differential is typified by noise components, the result of adding noise components multiplied with the decoded gain to the extracted MDCT coefficients multiplied with the gain "a" serves as MDCT representing the high frequency coefficients.

The spectrum combining unit 1607 combines the high frequency coefficients 1616, which are decoded either by the first higher frequency band decoding unit 1605 or the second higher frequency band decoding unit 1606 and which are divided into high frequency encoding sub-bands, with the low frequency coefficients 1615, and generates them as combined spectral coefficients 1617. Then, the frequency-time transforming unit 1608 transforms the combined spectral coefficients 1617 included in the higher frequency band into a time signal with a transform block length indicated by the block length information 1610 so as to generate it as an output signal 1618.

Note that, in the second higher frequency band decoding unit 1606, if the shift number "k" is not information indicating the number of samples in the frequency domain but identification information indicating a predetermined specific low frequency section, MDCT coefficients in such predetermined specific low frequency section may be extracted according to the identification information.

As explained above, in the sixth embodiment, since encoding is performed in the encoding device 1300 by appropriately switching transform block lengths for the high frequency signal 209 according to the characteristics of the input signal 207 and the input code 1609 encoded in such a manner is decoded in the decoding device 1600 according to the block length information 1610, the decoding device 1600 provides the effect of acquiring a reproduction signal of an improved quality for which trackability for the time variation of the original sound is further enhanced, in addition to the effects available in the first to the fifth embodiments.

The Seventh Embodiment

Figure 17:
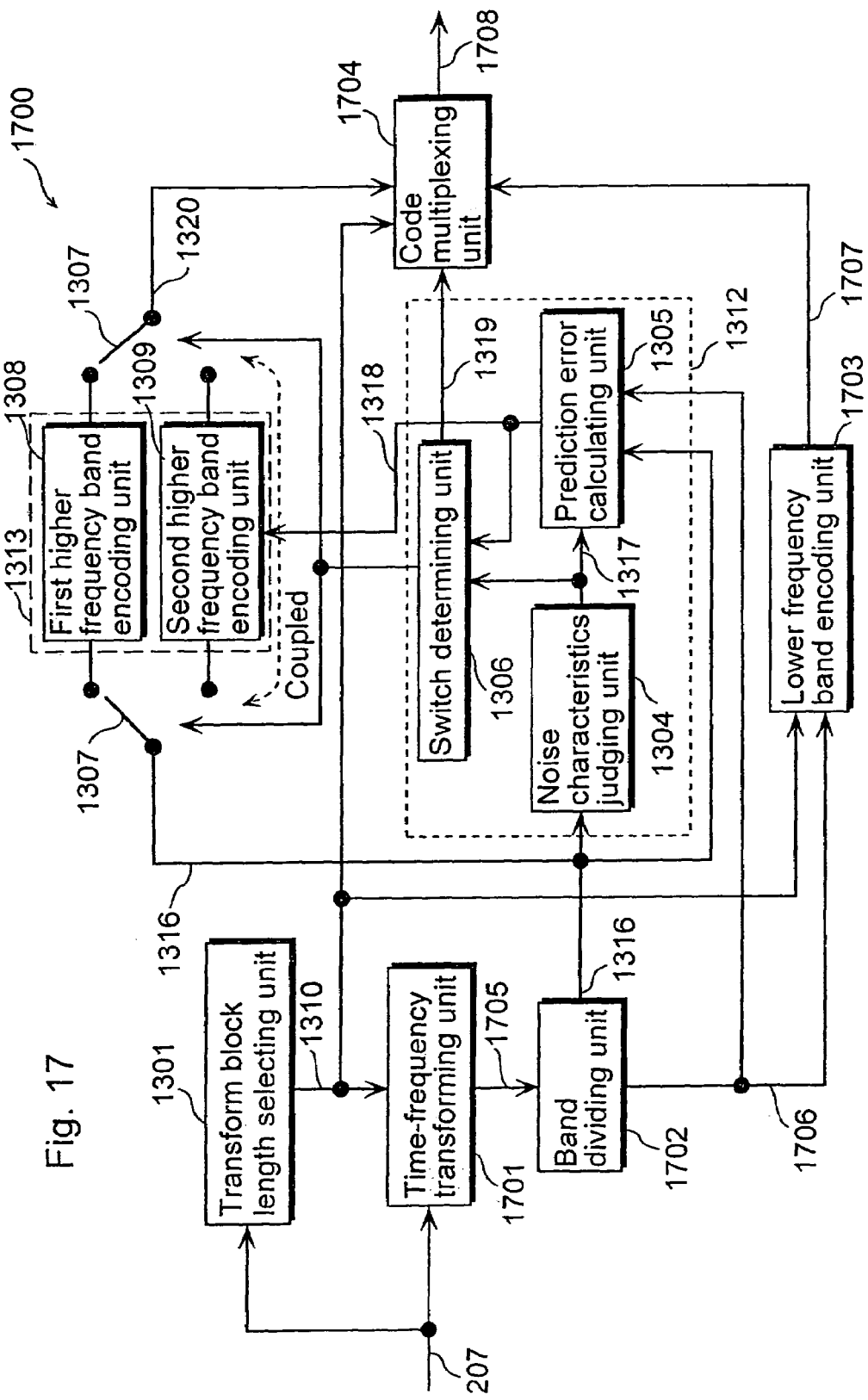
FIG. 17 is a block diagram showing a configuration of an encoding device according to the seventh embodiment.

The configuration of an encoding device according to the seventh embodiment of the present invention is explained with reference to FIG. 17, which is a block diagram showing the configuration of an encoding device 1700 according to the seventh embodiment. The encoding device 1700 depicted in FIG. 17 is different from the encoding device 1300 in FIG. 13 in that a lower frequency band encoding unit performs encoding by the use of transform coefficients which are in the same format as those used in a higher frequency band encoding unit and that encoding processing is performed also in the lower frequency band encoding unit according to a transform block length determined by a transform block length selecting unit. Such encoding device 1700 is comprised of the transform block length selecting unit 1301, the switching unit 1307, a time-frequency transforming unit 1701, a band dividing unit 1702, a lower frequency band encoding unit 1703, the similarity judging unit 1312 (the noise characteristics judging unit 1304, the prediction error calculating unit 1305 and the switch determining unit 1306), the higher frequency band encoding unit 1313 (the first higher frequency band encoding unit 1308 and the second higher frequency band encoding unit 1309), and a code multiplexing unit 1704. Note that since an explanation is already provided for the same components as those included in the encoding device 1300 illustrated in FIG. 13, an explanation for such components is omitted by providing them with the same numbers in FIG. 17 as used in FIG. 13.

In FIG. 17, the transform block length selecting unit 1301 determines a transform block length according to the characteristics of the input signal 207. The time-frequency transforming unit 1701 collectively performs time-frequency transform for the input signal 207 of all frequency bands made up of the lower frequency band and the higher frequency band according to the block length information 1310 generated by the transform block length selecting unit 1301 and outputs all frequency bands coefficients 1705. The time-frequency transforming unit 1701 may use any one of known transforms, but the following explanation describes the case where MDCT is employed. The band dividing unit 1702 divides the all frequency bands coefficients 1705 expressed as MDCT coefficients of either a basic transform block or a transform sub-block into the lower frequency band and the higher frequency band, of which the higher frequency band is further divided into a plurality of high frequency encoding sub-bands. Then band dividing unit 1702 outputs low frequency coefficients 1706 and the high frequency coefficients 1316. The lower frequency band encoding unit 1703 encodes the low frequency coefficients 1706 which are expressed as MDCT coefficients of a variable transform block length to output such low frequency coefficients 1706 as a low frequency code 1707. While any one of known encoding methods supporting a variable transform block length may be used as the lower frequency band encoding unit 1703, the present embodiment employs the MPEG-4 AAC system as an example of such encoding unit. The MPEG-4 AAC system supports two transform block lengths, i.e., 1024 samples and 128 samples, which can be switched appropriately according to need.

As in the case of the encoding device 1300 illustrated in FIG. 13 where different transform block lengths are used in the higher frequency band encoding unit and the lower frequency band encoding unit, time-frequency transform needs to be performed in the encoding processing of each encoding unit. Accordingly, by having the lower frequency band encoding unit select a transform block length from either 1024 samples or 128 samples, the same transform block length can be used in the lower frequency band encoding unit and the higher frequency band encoding unit, meaning that the same time-frequency transform processing is performed in such encoding units. In other words, it becomes possible for the lower frequency band encoding unit and the higher frequency band encoding unit to share the same time-frequency transform processing. The code multiplexing unit 1704 multiplexes the block length information 1310 generated by the transform block length selecting unit 1301, the switching information 1319 from the switch determining unit 1306, the high frequency code 1320 from the higher frequency band encoding unit 1313, and the low frequency code 1707 from the lower frequency band encoding unit 1703 to output an output code 1708.

The following is the operation of the encoding device 1700 with the above configuration to be explained along with the flow of data. The time-frequency transforming unit 1701 transforms the input signal 207 collectively into MDCT coefficients according to the block length information 1310. The resulting all frequency bands coefficients 1705 which include frequency components of all bands are then inputted to the band dividing unit 1702 to be outputted as the low frequency coefficients 1706 and the high frequency coefficients 1316 which are further divided into a plurality of bands.

The low frequency coefficients 1706 are encoded in the lower frequency band encoding unit 1703, and the band-divided high frequency coefficients 1316 are encoded either in first higher frequency band encoding unit 1308 or second higher frequency band encoding unit 1309.

The high frequency code 1320, which is acquired as a result of encoding the high frequency coefficients 1316 through the block length information 1310, the switching information 1319 and the higher frequency band encoding unit 1313, and the low frequency code 1707 are multiplexed in the code multiplexing unit 1704 and then the output code 1708 is generated.

With the above configuration, it is possible in the encoding device 1700 that time-frequency transform processing is shared between the lower frequency band encoding unit and the higher frequency band encoding unit and that band division performed in the band dividing unit 1702 is carried out on coefficients in the frequency domain such as MDCT coefficients, which consequently leads to a reduced amount of calculations required for band-dividing processing.

Figure 18:
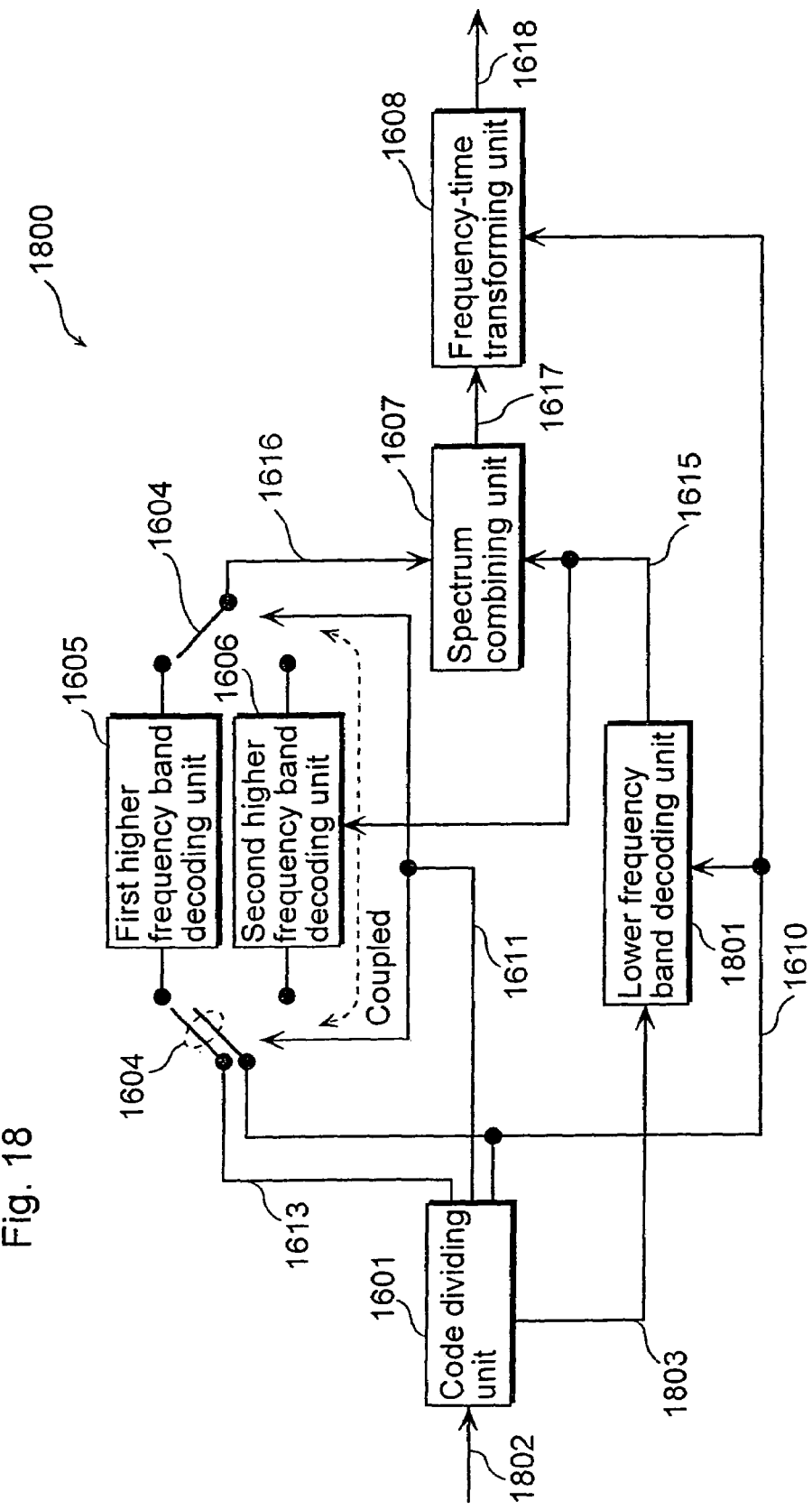
FIG. 18 is a block diagram showing a configuration of a decoding device that decodes the output code encoded by the encoding device illustrated in FIG. 17.

Next, an explanation is provided for a decoding device according to the seventh embodiment of the present invention with reference to FIG. 18, which is a block diagram showing the configuration of a decoding device 1800 for decoding the output code 1708 encoded in the encoding device 1700 illustrated in FIG. 17. The decoding device 1800 illustrated in FIG. 18 is different from the decoding device 1600 of the sixth embodiment in that a lower frequency band decoding unit decodes the lower frequency band by the use of transform coefficients which are in the same format as those used when the higher frequency band is decoded and that decoding processing is performed with a transform block length indicated by block length information received from the transform block length selecting unit. Such decoding device 1800 is comprised of the code dividing unit 1601, the switching unit 1604, the first higher frequency band decoding unit 1605, the second higher frequency band decoding unit 1606, the spectrum combining unit 1607, the frequency-time transforming unit 1608 and a lower frequency band decoding unit 1801. Note that since an explanation is already provided for the same components as those included in the decoding device 1600 illustrated in FIG. 16, an explanation for such components is omitted by providing them with the same numbers in FIG. 18 as used in FIG. 16. An explanation is provided for the case where MDCT coefficients are used as frequency spectral coefficients and the AAC system is employed as a method to decode the lower frequency band in the decoding device 1800, as in the case of the above-explained encoding device 1700. The lower frequency band decoding unit 1801 decodes a low frequency code 1803 separated from an input code 1802 according to the block length information 1610 to output the low frequency coefficients 1615.

The following explains the operation of the decoding device 1800 with the above configuration. In the decoding device 1800 shown in FIG. 18, the input code 1802 is divided into the block length information 1610, the switching information 1611, the low frequency code 1803, and the high frequency code 1613 by the code dividing unit 1601. Of them, the low frequency code 1803 is decoded by the lower frequency band decoding unit 1801 according to a transform block length indicated by the block length information 1610. The decoded low frequency code 1803 is expressed as MDCT coefficients which are encoding parameters pursuant to the AAC system and is outputted as the low frequency coefficients 1615.

Meanwhile, switching is made in the switching unit 1604 according to the switching information 1611 separated from the input code 1802 so that either the first higher frequency band decoding unit 1605 or the second higher frequency band decoding unit 1606 is selected. Then the selected higher frequency band decoding unit decodes the high frequency code 1613 to output it as the high frequency coefficients 1616. The operations of the first higher frequency band decoding unit 1605 and the second higher frequency band decoding unit 1606 are the same as those in the decoding device 1600 of the seventh embodiment illustrated in FIG. 16, and therefore explanations therefor are omitted. Since the decoded low frequency coefficients 1615 and the decoded high frequency coefficients 1616 are MDCT coefficients based on the same transform block length, such two types of coefficients can be combined through simple adding processing. The spectrum combining unit 1607 adds the low frequency coefficients 1615 with the high frequency coefficients 1616 to determine the combined spectral coefficients 1617. The frequency-time transforming unit 1608 performs inverse-MDCT for such combined spectral coefficients 1617 to output the output signal 1618.

According to the present embodiment, since the decoding device 1800 with the above configuration allows frequency-time transform processing required for decoding the lower frequency band and the higher frequency band to be shared, it is possible to omit the time-frequency transforming unit required in the decoding device 1600 for transforming a high frequency signal into low frequency coefficients. Consequently, it is possible to implement the decoding device 1800 which is compact in size. Furthermore, according to the present embodiment, since it is possible to perform combing processing of the spectrum combining unit to be carried out on coefficients in the frequency domain such as MDCT coefficients, the amount of calculations required for such combining processing can be reduced.

The Eighth Embodiment

Figure 19:
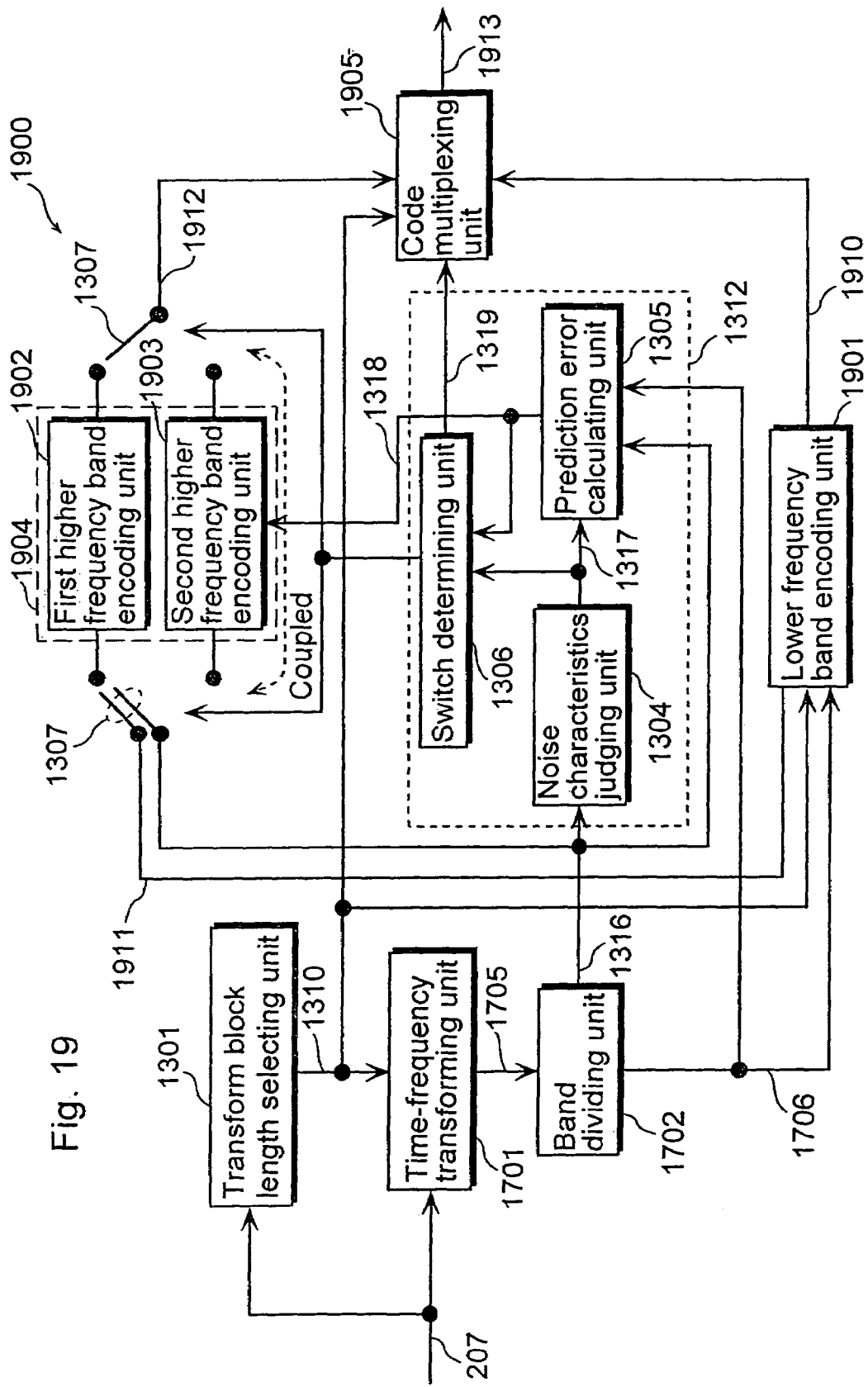
FIG. 19 is a block diagram showing a configuration of an encoding device according to the eighth embodiment.

An explanation is provide for the configuration of an encoding device according to the eighth embodiment of the present invention with reference to FIG. 19, which is a block diagram showing the configuration of an encoding device 1900 according to the eighth embodiment. The encoding device 1900 illustrated in FIG. 19 is different from the encoding device 1700 shown in FIG. 17 in that such system as the MPEG-4 AAC system supporting an encoding method known as block grouping is employed for the encoding of the lower frequency band and that the encoding of the higher frequency band is performed by the use of grouping information provided by a lower frequency band encoding unit. Such encoding device 1900 is comprised of the transform block length selecting unit 1301, the similarity judging unit 1312 (the noise characteristics judging unit 1304, the prediction error calculating unit 1305 and the switch determining unit 1306), the time-frequency transforming unit 1701, the band dividing unit 1702, a lower frequency band encoding unit 1901, a higher frequency band encoding unit 1904 (a first higher frequency band encoding unit 1902 and a second higher frequency band encoding unit 1903), and a code multiplexing unit 1905. Note that since an explanation is already provided for the same components as those included in the encoding device 1300 and the encoding device 1700 illustrated in FIG. 13 or 17, an explanation for such components is omitted by providing them with the same numbers in FIG. 19 as used in FIG. 13 or 17.

Figure 20:
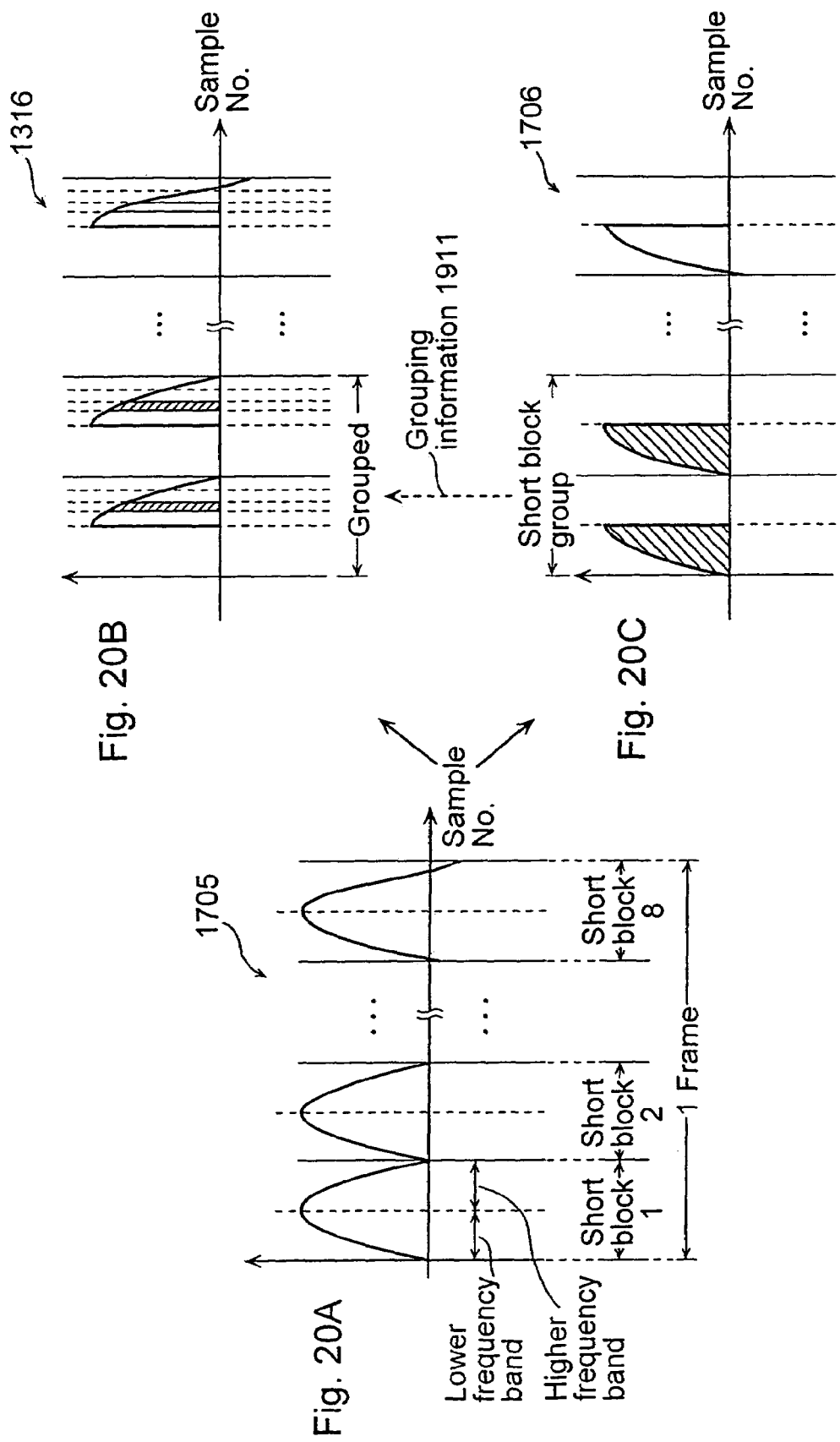
FIG. 20A is a diagram showing an example of all frequency bands coefficients outputted according to the block length information from the time frequency transforming unit of the encoding device illustrated in FIG. 19.
FIG. 20B is a diagram showing an example of the high frequency coefficients inputted to the higher frequency band encoding unit of the encoding device illustrated in FIG. 19.
FIG. 20C is a diagram showing an example of the low frequency coefficients inputted to the lower frequency band encoding unit of the encoding device illustrated in FIG. 19.

Block grouping is a method to reduce the number of encoding parameters included in an output code by sharing encoding parameters in a group made up of transform sub-blocks, spectrums of which are similar to each other's. A more detailed explanation for block grouping employed in the AAC system is provided below referring to FIGS. 20A, 20B and 20C. FIG. 20A is a diagram illustrating an example of the all frequency bands coefficients 1705 outputted from the time-frequency transforming unit 1701 of the decoding device 1900 shown in FIG. 19 according to the block length information 1310. FIG. 20B is a diagram showing an example of the high frequency coefficients 1316 inputted to the higher frequency band encoding unit 1904 of the encoding device 1900 illustrated in FIG. 19. FIG. 20C is a diagram showing an example of the low frequency coefficients 1706 inputted to the lower frequency band encoding unit 1901 of the encoding device 1900 illustrated in FIG. 19. The AAC system, which supports two transform block lengths, i.e., 1024 samples (long block=basic transform block) and 128 samples (short block=transform sub-block), is configured to reduce the number of encoding parameters as well as the number of bits required to encode an input signal by comparing MDCT coefficients within more than one adjoining short block when a short block is used and by sharing some encoding parameters if similarity among such MDCT coefficients is high.

When the block length information 1310 from the transform block length selecting unit 1301 indicates a short block including 128 samples for both the lower frequency band and the higher frequency band, the time-frequency transforming unit 1701 illustrated in FIG. 19 performs MDCT for each 128 samples of the input signal 207, for example, to output the all frequency bands coefficients 1705 as illustrated in FIG. 20A. The all frequency bands coefficients 1705 outputted in such manner are made up of eight short blocks for each basic transform block (1024 samples), and MDCT coefficients in each short block represent a frequency band ranging from the lower frequency band to the higher frequency band to be determined depending on a sampling frequency. Such all frequency bands coefficients 1705 are divided by the band dividing unit 1702 into the low frequency coefficients 1706 and the high frequency coefficients 1316, which are then outputted to the lower frequency band encoding unit 1901 and the higher frequency band encoding unit 1904 respectively.

The lower frequency band encoding unit 1901 compares MDCT coefficients in adjoining short blocks, and when similarity between such short blocks is high, classifies two or more appropriate short blocks into one group as shown in FIG. 20C. Among short blocks belonging to the same group, such encoding parameters as normalized coefficients to be calculated for each encoding performed in a short block is shared, for example. In such a case, a set of adjoining short blocks which share encoding parameters is called a short block group, and information indicating how eight short blocks included within a frame of 1024 sample length are grouped is generated as grouping information 1911, which is then outputted to the higher frequency band encoding unit 1904. For example, when a short block 1 and a short block 2 are grouped together in the lower frequency band encoding unit 1901 as shown in FIG. 20C, the grouping information 1911 indicating that such short block 1 and short block 2 are grouped together is outputted. Such grouping information 1911 is encoded by the lower frequency band encoding unit 1901 together with the low frequency coefficients 1706. In the higher frequency band encoding unit 1904, the high frequency coefficients 1316 inputted from the band dividing unit 1702 are divided into a larger number of bands than the low frequency coefficients 1706 so as to encode the high frequency coefficients 1316 on a per-band basis. In so doing, when the grouping information 1911 indicates that the short block 1 and the short block 2 in the lower frequency band are grouped together, the higher frequency band encoding unit 1904 performs encoding by having encoding parameters be shared between a transform sub-block 1 and a transform sub-block 2 in the higher frequency band which correspond to such short block 1 and short block 2.

Here, with the configuration of the encoding device 1900, the length of a transform sub-block in the higher frequency band and a short block in the lower frequency band in the AAC system is both 128 samples and high frequency MDCT coefficients transformed with the transform block length of 128 samples and low frequency MDCT coefficients transformed with the short block of 128 samples have high frequency components and low frequency components of the same signal respectively. MDCT coefficients included in the higher frequency band and the lower frequency band are closely related, meaning, for example, that it is highly possible that if adjoining short blocks in the lower frequency band are similar to each other, corresponding sub-blocks in the higher frequency band are also similar to each other. Accordingly, by using the grouping information 1911 outputted from the lower frequency band encoding unit in accordance with the AAC system also in the higher frequency band encoding unit so as to share encoding parameters used among sub-blocks having a higher degree of similarity, it is possible to reduce the number of encoding parameters as well as the number of bits required for encoding.

In the encoding device 1900 shown in FIG. 19, the grouping information 1911 outputted from the lower frequency band encoding unit 1901 is inputted to either the first higher frequency band encoding unit 1902 or the second higher frequency band encoding unit 1903 via the switching unit 1307. Then, according to such grouping information 1911, a higher frequency band encoding unit selected by the switching unit 1307 encodes the shared parameters of the grouped sub-blocks only once per group. Next, an explanation is provided for how parameters are shared on the basis of the grouping information 1911.

Figure 21:
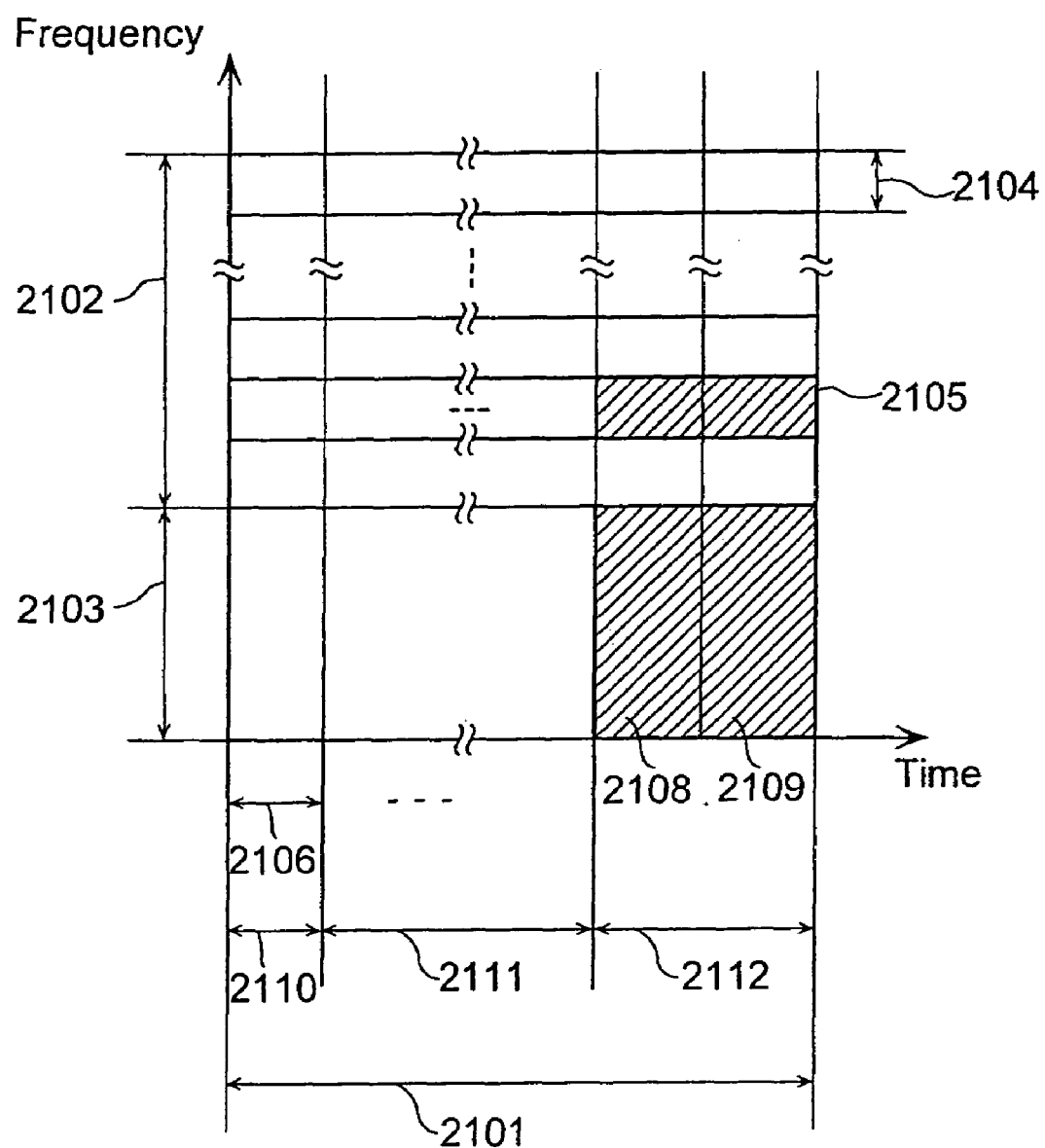
FIG. 21 is a diagram showing a relation between the high frequency coefficients and the low frequency coefficients in the case where grouping is performed in the lower frequency band encoding unit of the encoding device illustrated in FIG. 19.

FIG. 21 is a diagram showing the relation between the high frequency coefficients 1316 and the low frequency coefficients 1706 in the case where grouping is performed in the lower frequency band encoding unit 1901 of the encoding device 1900 illustrated in FIG. 19. As FIG. 21 shows, when a transform sub-block 2106 is selected as a transform block length by the transform block length selecting unit 1301, eight sets of MDCT coefficients (all frequency bands coefficients 1705) which are transformed with a transform block length of 128 sample are acquired for the input signal 207 of a basic transform block 2101 having 1024 samples. Such all frequency bands coefficients 1705 are divided into the low frequency coefficients 1706 in a low frequency encoding band 2103 and the high frequency coefficients 1316 in a high frequency encoding band 2102 by the band dividing unit 1702. The lower frequency band encoding unit 1901 checks similarity between adjoining short blocks in the low frequency coefficients 1706 so as to classify short blocks similar to each other into the same group. When this is done, the grouping information 1911 indicating which short block and which short block are grouped together is generated to be outputted to the higher frequency band encoding unit 1904. Assuming, for example, that the lower frequency band encoding unit 1901 generates the grouping information 1911 indicating that a short block 2108 and a short block 2109 adjoining each other are grouped together, since the grouping information 1911 provided from the lower frequency band encoding unit 1901 indicates a set of adjoining transform sub-blocks 2106 similar to each other, the higher frequency band encoding unit 1904 classifies the eight transform sub-blocks 2106 into a plurality of transform sub-block groups according to such grouping information 1911.

For example, in the high frequency encoding band 2102, the eight transform sub-blocks 2106 are classified into a transform sub-block group 2110, a transform sub-block group 2111, and a transform sub-block group 2112. The transform sub-block group 2110, for instance, is made up of one transform sub-block 2106, while the transform sub-block group 2111 is made up of five transform sub-blocks 2106 which are not depicted in the diagram. Meanwhile the transform sub-block group 2112 is made up of the seventh and the eighth transform sub-blocks 2106 which correspond to the short block 2108 and the short block 2109 in the low frequency encoding band 2103. In order to share encoding parameters within such a transform sub-block group, an encoding cell which is originally set for each transform sub-block 2106 on a high frequency encoding sub-band 2104 basis just needs to be set for each transform sub-block group, as indicated by an encoding cell 2105 shown in FIG. 21.

In the above-mentioned example, two sets of high frequency MDCT coefficients included in the encoding cell 2105 are encoded being typified by a single set of encoding parameters. For example, when the second higher frequency band encoding unit 1903 encodes the high frequency coefficients 1316 included in the encoding cell 2105, MDCT coefficients within these two transform sub-blocks 2106 are represented by the same shift number "k" and gain "a" to be encoded. In contrast, when sub-block grouping is not to be performed, the second higher frequency band encoding unit 1903 needs to encode shift number "k" and gain "a" independently for MDCT coefficients in each of the two transform sub-blocks 2106. As just described, by grouping two transform sub-blocks 2106 into one transform sub-block group 2112, for example, the number of encoding parameters can be reduced to half. Note that there is no limit for the number of transform sub-blocks 2106 to be grouped and therefore that the number of encoding parameters is further reduced by grouping an increased number of transform sub-blocks 2106 together. As a result, it is possible to reduce the number of bits required to encode encoding parameters of all frequency bands by grouping transform sub-blocks 2106 as described above. The code multiplexing unit 1905 multiplexes ① the low frequency code 1910 from the lower frequency band encoding unit 1901, ② the switching information 1319 from the switch determining unit 1306, ③ the block length information 1310 from the transform block length selecting unit 1301 and ④ a high frequency code 1912 from the higher frequency band encoding unit 1904, and then outputs the output code 1913.

Note that it is possible to perform grouping intended for sharing encoding parameters not only for a plurality of transform sub-blocks in the direction of the time domain, but also for a plurality of high frequency encoding sub-bands in the direction of the frequency domain.

Figure 22:
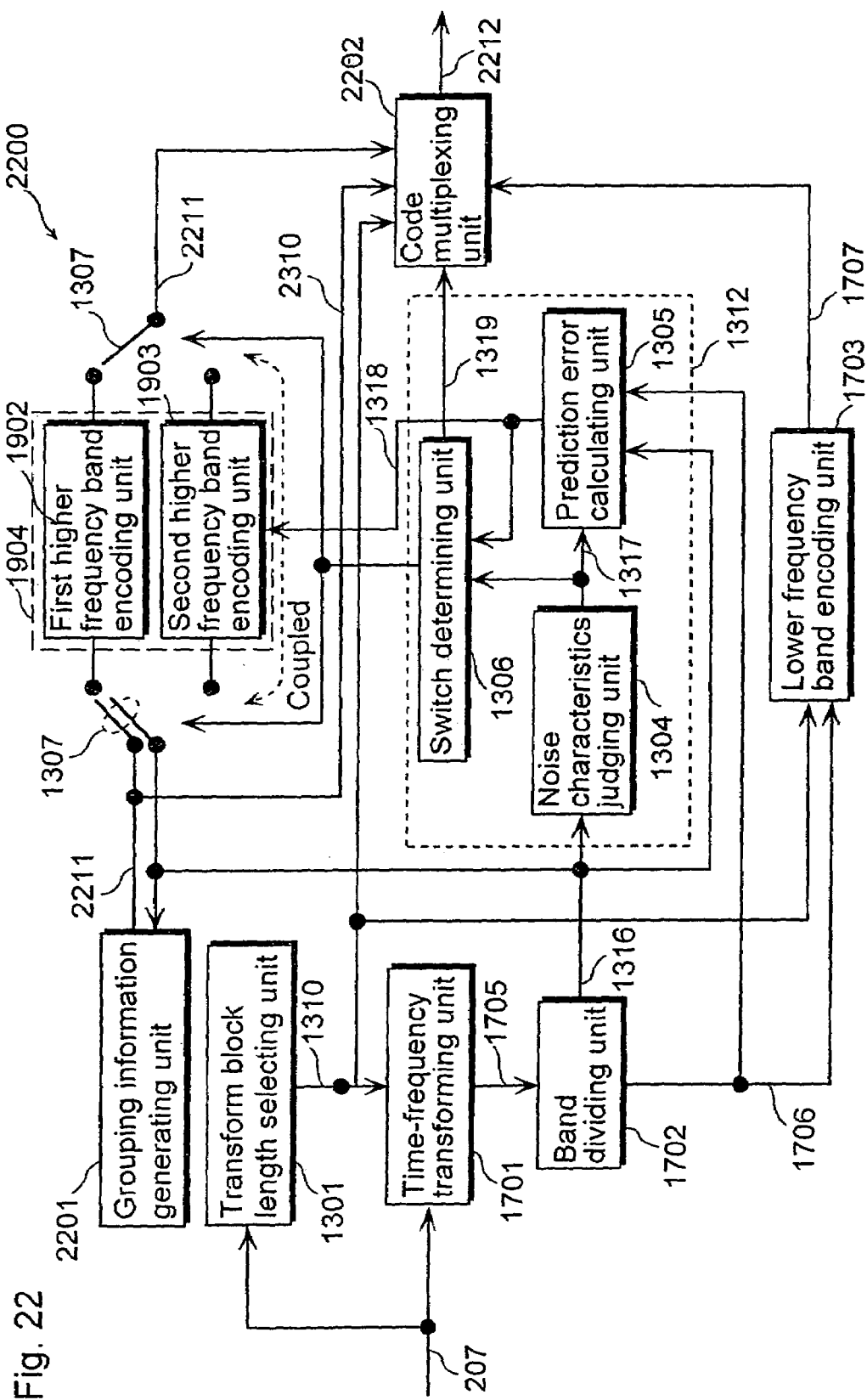
FIG. 22 is a block diagram showing a configuration of another encoding device according to the eighth embodiment.

Also note that, in the above example, although transform sub-blocks 2106 are grouped according to the grouping information 1911 (to be referred to as the first grouping information) from the lower frequency band encoding unit 1901, it is also possible that grouping is performed specifically for the higher frequency band without using the grouping information 1911 of the lower frequency band and that the second grouping information indicating the result of such grouping processing is generated so as to perform grouping of transform sub-blocks 2106 in the higher frequency band encoding unit. FIG. 22 is a block diagram showing the configuration of another encoding device 2200 according to the eighth embodiment. Such encoding device 2200, which is an encoding device for grouping transform sub-blocks 2106 specifically for the higher frequency band, is comprised of the transform block length selecting unit 1301, the similarity judging unit 1312 (the noise characteristics judging unit 1304, the prediction error calculating unit 1305 and the switch determining unit 1306), the time-frequency transforming unit 1701, the band dividing unit 1702, the lower frequency band encoding unit 1703, the higher frequency band encoding unit 1904 (the first higher frequency band encoding unit 1902 and the second higher frequency band encoding unit 1903), a grouping information generating unit 2201, and a code multiplexing unit 2202.

The grouping information generating unit 2201 checks similarity between transform sub-blocks 2106 in the high frequency coefficients 1316 which are band-divided by the band dividing unit 1702, so as to classify transform sub-blocks 2106 having a high degree of similarity with each other into the same group. Furthermore, the grouping information generating unit 2201 generates second grouping information 2210 indicating the result of such grouping and outputs it to the higher frequency band encoding unit 1904 and the code multiplexing unit 2202. Then, a higher frequency band encoding unit selected according to the switching information 1319 determines the encoding cell 2105 based on the inputted second grouping information 2210 and generates a high frequency code 2211, in which encoding parameters are shared by each transform sub-block within the encoding cell 2105. The code multiplexing unit 2202 multiplexes ① the second grouping information 2210 from the grouping information generating unit 2201, ② the high frequency code 2211 from the higher frequency band encoding unit 1904, ③ the low frequency code 1707 from the lower frequency band encoding unit 1703, ④ the switching information 1319 from the switch determining unit 1306 and ⑤ the block length information 1310 from the transform block length selecting unit 1301, and then outputs an output code 2212.

Meanwhile, since the first grouping information 1911 acquired from the lower frequency band encoding unit 1901 illustrated in FIG. 19 is generated on the basis of the low frequency coefficients 1706 used for encoding the lower frequency band, such first grouping information 1911 is not necessarily suited for grouping the high frequency coefficients 1316. Such being the case, by generating the second grouping information 2210 specifically for the higher frequency band on the basis of the high frequency coefficients 1316, it is possible to perform grouping more suitable for the encoding of the high frequency coefficients 1316, leading to the improvement in the quality of encoding processing for the higher frequency band. In such a case, however, the second grouping information 2210 generated specifically for the higher frequency band is also required to be encoded and multiplexed into the output code 2212. Note that although grouping is not performed in the lower frequency band encoding unit 1703 with the configuration of the encoding device 2200, it is possible to configure the encoding device 2200 to include the lower frequency band encoding unit 1901 of the encoding device 1900 illustrated in FIG. 19 instead of the lower frequency band encoding unit 1703 so as to perform grouping for short blocks also in the lower frequency band encoding unit 1901.

Figure 23:
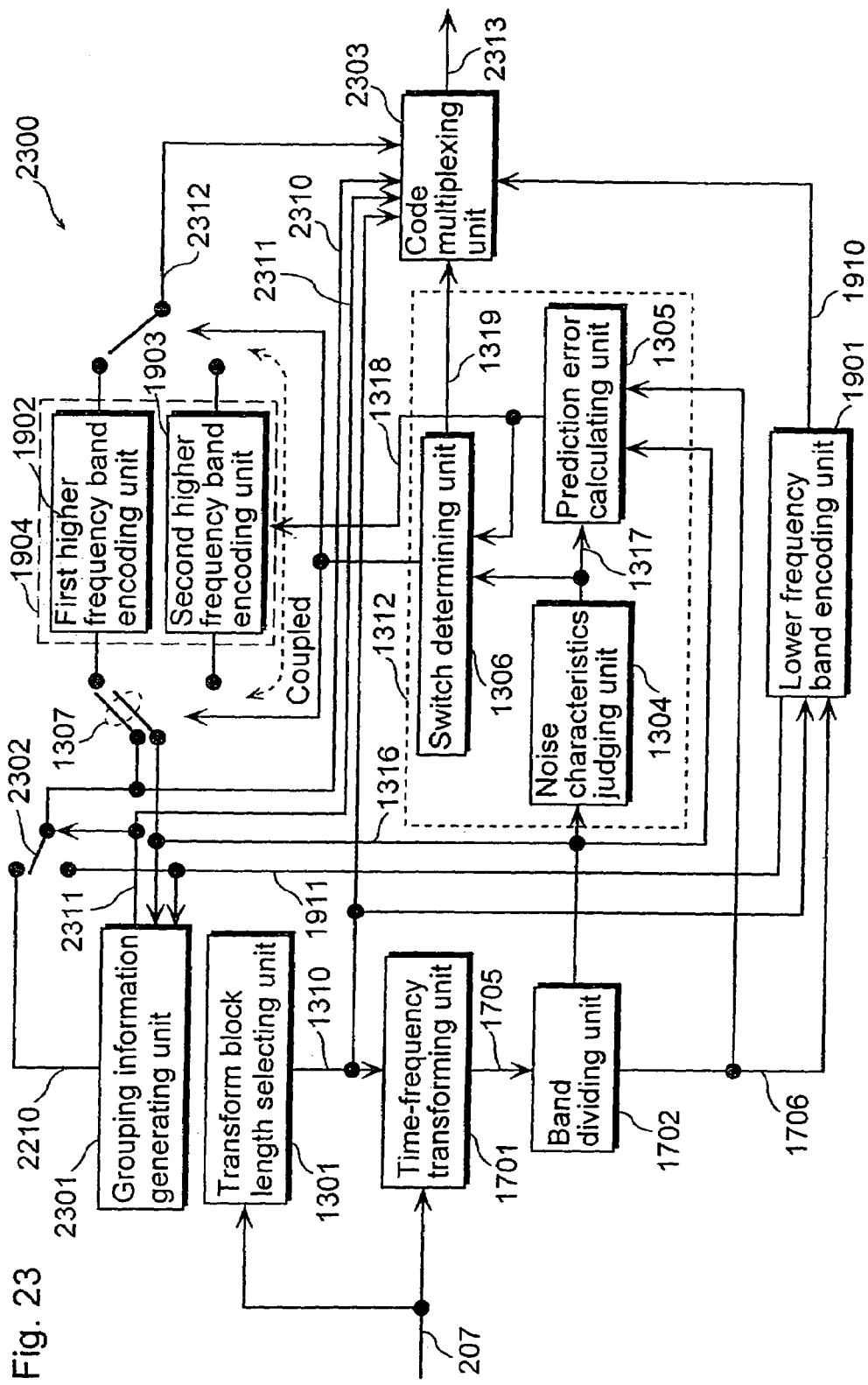
FIG. 23 is a block diagram showing a configuration of another encoding device according to the eighth embodiment.

Furthermore, although grouping is separately performed for the lower frequency band and the higher frequency band in the encoding device 2200 shown in FIG. 22, it is also possible that either the first grouping information acquired from the lower frequency band encoding unit or the second grouping information generated specifically on the part of the higher frequency band encoding unit is selected for use. FIG. 23 is a block diagram showing the configuration of another encoding device 2300 according to the eighth embodiment. The encoding device 2300 is an encoding device that determines an encoding cell in the higher frequency band by selecting to use either the first grouping information indicating how short blocks in the lower frequency band are grouped or the second grouping information indicating how transform sub-blocks in the higher frequency band are grouped. Such encoding device 2300 includes the transform block length selecting unit 1301, the similarity judging unit 1312 (the noise characteristics judging unit 1304, the prediction error calculating unit 1305 and the switch determining unit 1306), the time-frequency transforming unit 1701, the band dividing unit 1702, the lower frequency band encoding unit 1901, the higher frequency band encoding unit 1904 (the first higher frequency band encoding unit 1902 and the second higher frequency band encoding unit 1903), a grouping information generating unit 2301, a grouping information switching unit 2302, and a code multiplexing unit 2303.

The grouping information generating unit 2301 performs grouping for the high frequency coefficients 1316 once according to the first grouping information 1911. In so doing, the grouping information generating unit 2301 calculates, for example, the differential error between transform sub-blocks classified into the same group, cancels grouping to be performed on the basis of the first grouping information 1911 if the calculated differential error exceeds a predetermined threshold, and performs specific groping based on the high frequency coefficients 1316. As a result of such grouping, the grouping information generating unit 2301 generates the second grouping information 2210 indicating a result of grouping (i.e. which transform sub-block and which transform sub-block are grouped together) which is specific to the higher frequency band. Moreover, the grouping information generating unit 2301 outputs grouping information switch information 2311 to the grouping information switching unit 2302 to have it select the second grouping information 2210. According to the grouping information 2310 selected in such manner, the higher frequency band encoding unit 1904 encodes the high frequency coefficients 1316 on the basis of the similarity information 1318 indicating the similarity with the low frequency coefficients 1706 and outputs a high frequency code 2312. The code multiplexing unit 2303 multiplexes ① the high frequency code 2312 from the higher frequency band encoding unit 1904 generated in such manner, ② the low frequency code 1910 from the lower frequency band encoding unit 1901, and if the second grouping information 2210 is selected by the grouping information switching unit 2302 according to the grouping information switch information 2311, ③ such grouping information 2310, ④ the block length information 1310 from the transform block length selecting unit 1301 and ⑤ the switching information 1319 from the switch determining unit 1306, and then outputs an output code 2313.

As just described, since the encoding device 2300 with the above configuration, which usually performs grouping for the high frequency coefficients 1316 by the use of the first grouping information 1911, makes it possible for the second grouping information 2210 generated on the part of the higher frequency band to be used only when the first grouping information 1911 is not suitable for grouping the high frequency coefficients 1316, it is possible to reduce the number of code bits needed to represent the grouping information 2210 and to improve the quality of encoding. With such configuration, the second grouping information 2210 is encoded to be multiplexed into the output code 2313 only when such second grouping information 2210 is selected.

Note that although the code multiplexing unit 2303 encodes the second grouping information 2210 based on the grouping information switch information 2311 from the grouping information generating unit 2301 and multiplexes it to the output code 2313, the present invention is not limited to this configuration. It is also possible, for example, that the grouping information generating unit 2301 adds in advance an identification code to the second grouping information 2210 indicating that such second grouping information 2210 is specific to the higher frequency band, and when such identification code indicating the second grouping information 2210 is added, the selected higher frequency band encoding unit 1904 performs encoding by incorporating the second grouping information 2210 into the high frequency code 2312, while the first grouping information 1911 without an identification code is not incorporated into the high frequency code 2312. In this case, the code multiplexing unit 2303 just needs to multiplex the switching information 1319, the block length information 1310, the low frequency code 1910 and the high frequency code 2312 without encoding nor multiplexing the grouping information 2310 and the grouping information switch information 2311.

Figure 24:
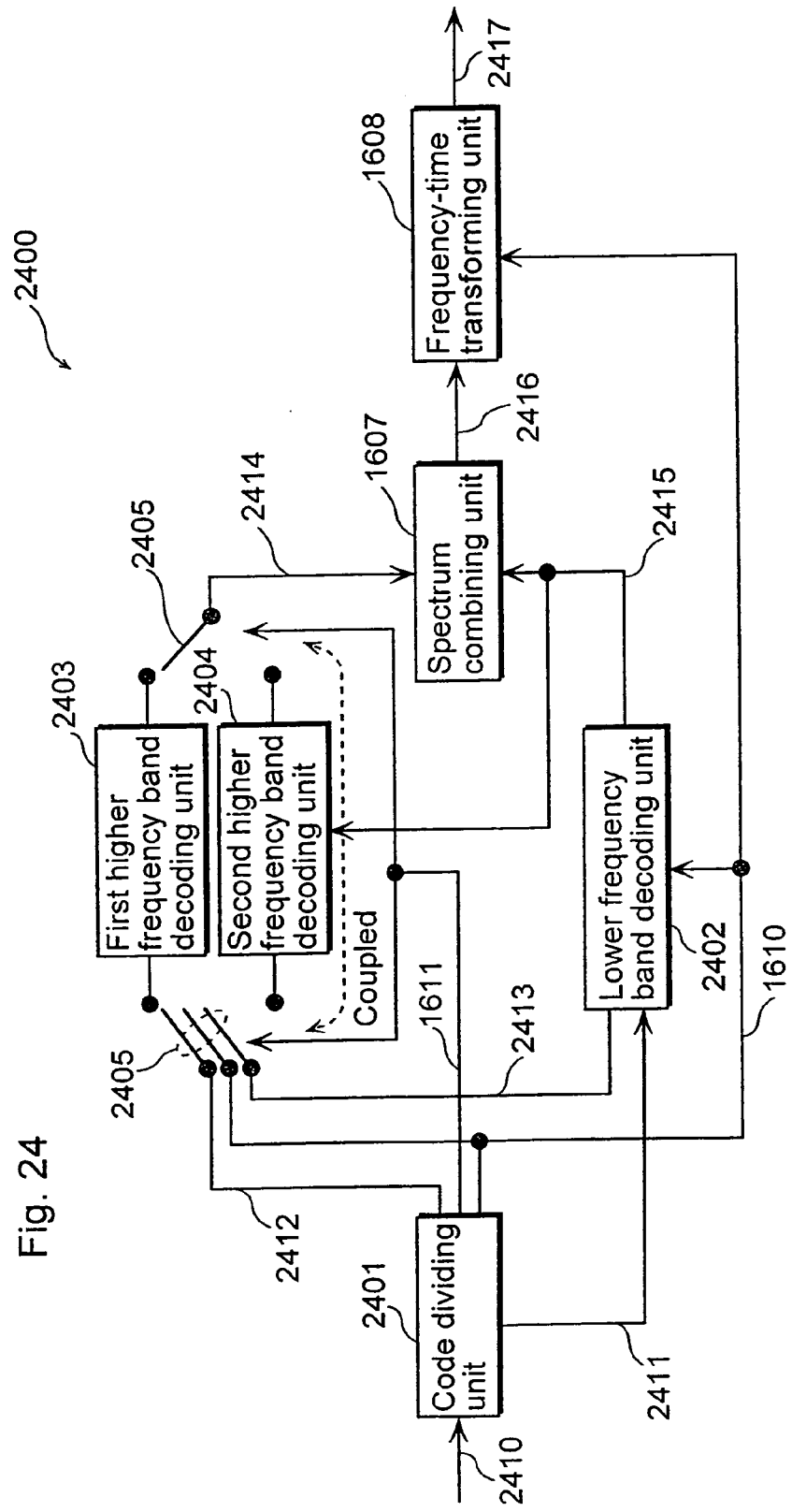
FIG. 24 is a block diagram showing a configuration of a decoding device that decodes the output code generated by the encoding device illustrated in FIG. 19.

Next, an explanation is provided for the configuration of a decoding device according to the eighth embodiment with reference to FIG. 24, which is a block diagram showing the configuration of a decoding device 2400 for decoding the output code 1913 generated in the decoding device 1900 shown in FIG. 19. The decoding device 2400 illustrated in FIG. 24 is a decoding device that employs as a lower frequency band decoding unit a decoding system pursuant to an encoding method known as block grouping in accordance with the MPEG-4 AAC system, for example, in the decoding device 1900 shown in FIG. 19 and that decodes the higher frequency band by the use of grouping information provided from the lower frequency band decoding unit. Such decoding device 2400 is comprised of a code dividing unit 2401, a lower frequency band decoding unit 2402, a first higher frequency band decoding unit 2403, a second higher frequency band decoding unit 2404, a switching unit 2405, the spectrum combining unit 1607, and the frequency-time transforming unit 1608.

In FIG. 24, the code dividing unit 2401 divides an input code 2410 into the block length information 1610, the switching information 1611, a low frequency code 2411 and a high frequency code 2412. The lower frequency band decoding unit 2402 decodes the low frequency code 2411 according to a transform block length indicated by the block length information 1610 and to grouping information 2413 included in the low frequency code 2411, and outputs low frequency coefficients 2415 expressed as MDCT coefficients which are encoding parameters in compliance with the AAC system. At the same time, the lower frequency band decoding unit 2402 outputs the grouping information 2413 acquired from the low frequency code 2411 to the switching unit 2405. Such grouping information 2413 is then inputted to either the first higher frequency band decoding unit 2403 or the second higher frequency band decoding unit 2404 depending on a selection indicated by the switching information 1611. The selected higher frequency band decoding unit generates high frequency coefficients 2414 according to the block length information 1610, the high frequency code 2412, the low frequency coefficients 2415 (only when the second higher frequency band decoding unit 2404 is selected), and the grouping information 2413.

To put it another way, such selected higher frequency band decoding unit performs decoding for each encoding cell on the basis of a basic transform block when the block length information 1610 indicates that a basic transform block is used, and when the block length information 1610 indicates that a transform sub-block is used, the selected higher frequency band decoding unit performs decoding for each encoding cell on the basis of a transform sub-block group indicated by the grouping information 2413.

An encoding cell based on a transform sub-block includes sets of MDCT coefficients corresponding to a plurality of transform sub-blocks, but each set of MDCT coefficients are to be decoded according to the same decoded encoding parameters. Since the operations of the first higher frequency band decoding unit 2403 and the second higher frequency band decoding unit 2404 for determining MDCT coefficients within an encoding cell according to encoding parameters are the same as those of the first higher frequency band decoding unit 1605 and the second higher frequency band decoding unit 1606 in the decoding device 1800 illustrated in FIG. 18, excluding that decoding is performed for each an encoding cell on the basis of a transform sub-block group indicated by the grouping information 2413, explanations thereof are omitted.

As just described, since the decoded low frequency coefficients 2415 and the decoded high frequency coefficients 2414 are MDCT coefficients based on the same transform block length, such coefficients can be combined by means of a simple adding processing. The spectrum combining unit 1607 adds the low frequency coefficients 2415 with the high frequency coefficients 2414 to determine combined spectral coefficients 2416. The frequency-time transforming unit 1608 generates to output an output signal 2417 by performing inverse-MDCT for such combined spectral coefficients 2416.

The above configuration makes it possible for the encoding device 1900 to encode the input signal 207 so as to represent it with a smaller amount of bits by grouping transform sub-blocks. Meanwhile, it is possible for the decoding device 2400 to perform a correct decoding of the input code 2410 which is encoded to be represented by such smaller amount of bits.

Figure 25:
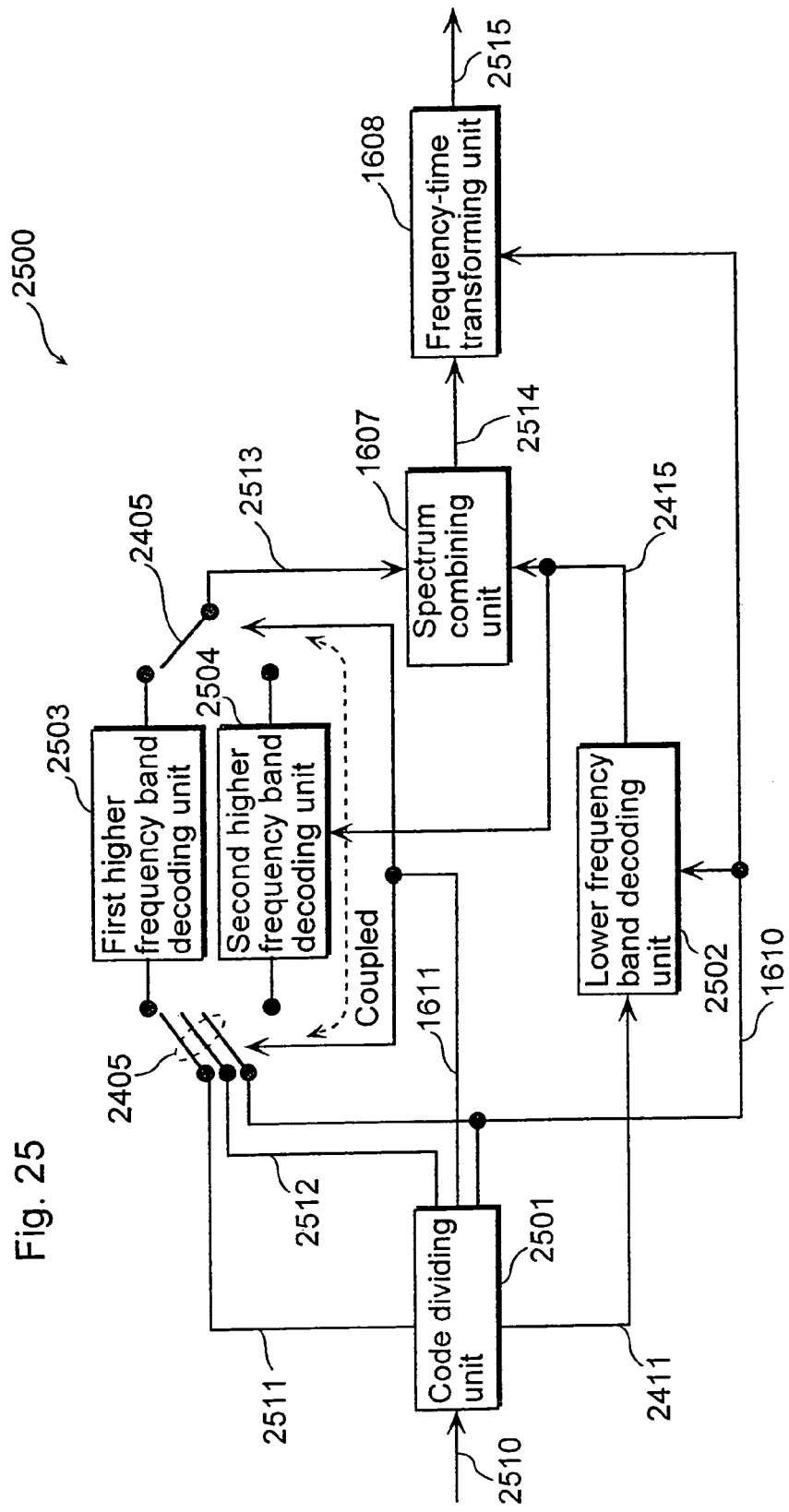
FIG. 25 is a block diagram showing a configuration of a decoding device that decodes the output code generated by the encoding device illustrated in FIG. 22.

Moreover, when the second grouping information generated specifically on the part of a higher frequency band encoding unit is multiplexed into an input code of a decoding device as in the case of the output code 2212 in the encoding device 2200 illustrated in FIG. 22, a decoding device is to be configured to perform decoding on the basis of the second grouping information as illustrated in FIG. 25. FIG. 25 is a block diagram showing the configuration of a decoding device 2500 for decoding the output code 2212 from the encoding device 2200 shown in FIG. 22. The decoding device 2500 is a decoding device for decoding an output code generated as a result of performing block grouping separately for the lower frequency band and the higher frequency band in an encoding device. Such decoding device 2500 is comprised of a code dividing unit 2501, a lower frequency band decoding unit 2502, a first higher frequency band decoding unit 2503, a second higher frequency band decoding unit 2504, the switching unit 2405, the spectrum combining unit 1607, and the frequency-time transforming unit 1608.

The code dividing unit 2501 divides an input code 2510 into the low frequency code 2411, second grouping information 2511, a high frequency code 2512, the block length information 1610, and the switching information 1611. The lower frequency band decoding unit 2502 is different from the lower frequency band decoding unit 2402 illustrated in FIG. 24 in that the first grouping information included in the low frequency code 2411 is not outputted to the switching unit 2405. Apart from that, the lower frequency band decoding unit 2502 decodes the low frequency code 2411 according to the first grouping information included in such low frequency code 2411 when block grouping is performed in units of a short block and then outputs the low frequency coefficients 2415 represented as MDCT coefficients to the spectrum combining unit 1607 and to the second higher frequency band decoding unit 2504 just like the lower frequency band decoding unit 2402 does. The first higher frequency band decoding unit 2503 and the second higher frequency band decoding unit 2504 are different from the first higher frequency band decoding unit 2403 and the second higher frequency band decoding unit 2404 illustrated in FIG. 24 in that the former decode the high frequency code 2512 for which specific grouping for the higher frequency band is performed according to the second grouping information 2511. However, from the standpoint of hardware, both the first higher frequency band decoding unit 2503 and the second higher frequency band decoding unit 2504, and the first higher frequency band decoding unit 2403 and the second higher frequency band decoding unit 2404 are identical considering that the high frequency code 2412 is decoded according to grouping information inputted via the switching unit 2405. In the encoding device 2200, block grouping is performed for the high frequency code 2512 on the basis of similarity between adjoining transform sub-blocks in the higher frequency band, regardless of block grouping of short blocks in the lower frequency band. Since the second grouping information 2511 indicates how transform sub-blocks of the high frequency code 2512 are block-grouped, it is possible for the first higher frequency band decoding unit 2503 and the second higher frequency band decoding unit 2504 to correctly identify an encoding cell of the high frequency code 2512 according to such grouping information 2511.

As just described, since block grouping is performed for the high frequency code 2512 in the encoding device 2200 based on similarity between transform sub-blocks in the higher frequency band, it can be said that such encoding is performed more faithfully to the original sound as compared to when the high frequency coefficients 2414 are acquired in the decoding device 2400 by directly diverting the block grouping of the lower frequency band to the higher frequency band. With the decoding device 2500 with the above configuration, it is possible for the decoding device 2500 to decode an input signal encoded more efficiently by the encoding device 2200 which groups transform sub-blocks in a manner optimal for high frequency coefficients, resulting in an output signal of an increased quality.

Figure 26:
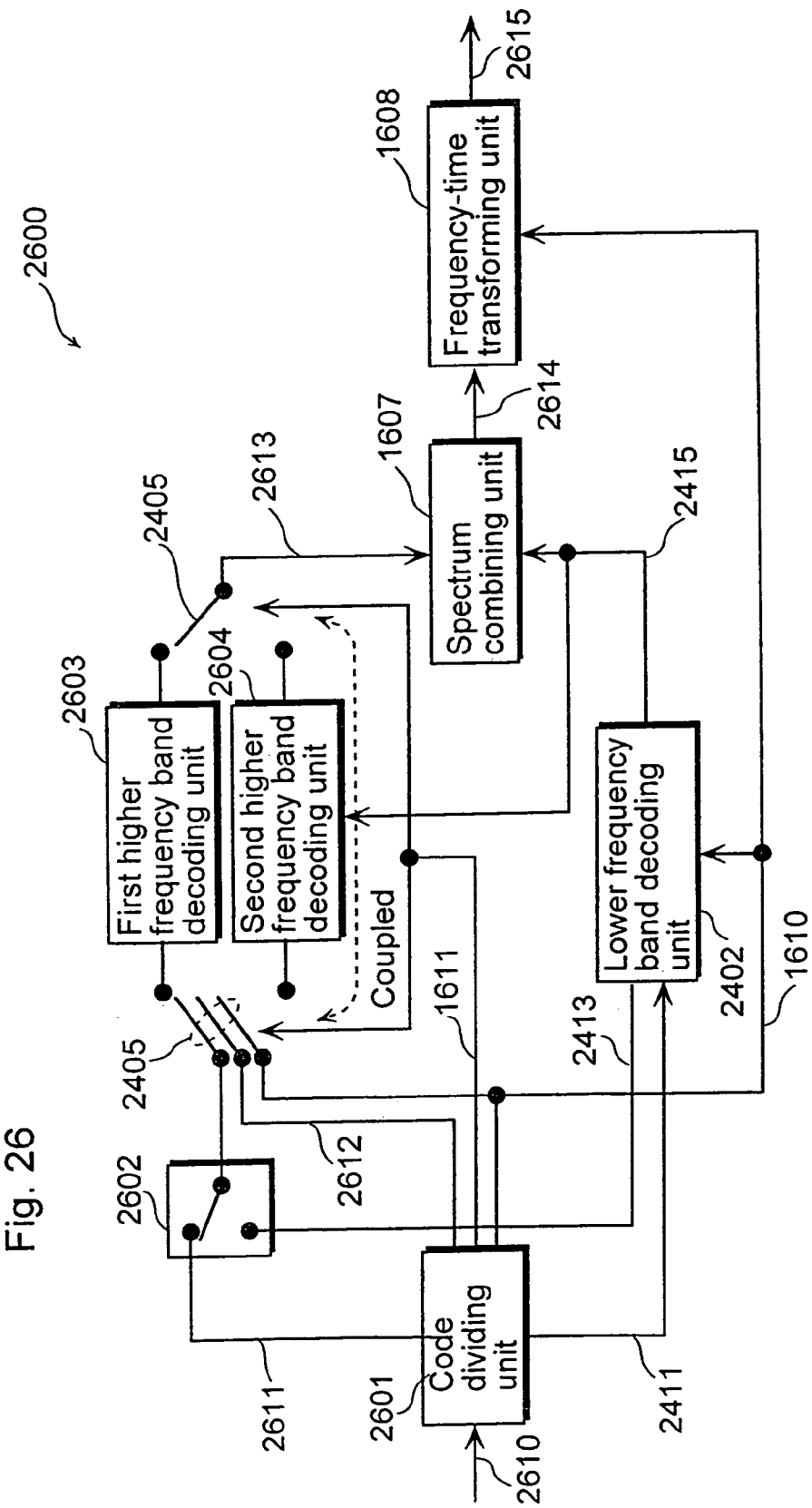
FIG. 26 is a block diagram showing a configuration of a decoding device that decodes the output code generated by the encoding device illustrated in FIG. 23 as an input code.

Furthermore, an explanation is provided for a decoding device that decodes an input signal concerning which grouping information used for block-grouping of high frequency coefficients varies depending on the degree of similarity between high frequency coefficients and low frequency coefficients as in the case of the output code in the encoding device 2300 depicted in FIG. 23. FIG. 26 is a block diagram showing the configuration of a decoding device 2600 for decoding the output code from the encoding device 2300 illustrated in FIG. 23 as an input code. The decoding device 2600 is a decoding device that decodes a high frequency code according to the second grouping information when the second grouping information is multiplexed into an input code and that decodes a high frequency code according to the first grouping information when the second grouping information is not multiplexed into an input code. Such decoding device 2600 is comprised of a code dividing unit 2601, a grouping information switching unit 2602, a first higher frequency band decoding unit 2603, a second higher frequency band decoding unit 2604, the lower frequency band decoding unit 2402, the switching unit 2405, the spectrum combining unit 1607, and the frequency-time transforming unit 1608.

The code dividing unit 2601 divides an input code 2610 into second grouping information 2611, a high frequency code 2612, the switching information 1611, the block length information 1610 and the low frequency code 2411. The second grouping information 2611 is multiplexed into the input code 2610 only when such second grouping information 2611 generated specifically for the higher frequency band is used. The second grouping information 2611 outputted from the code dividing unit 2601 and the first grouping information 2413 outputted from the lower frequency band decoding unit 2402 are inputted to the grouping information switching unit 2602. When the second grouping information 2611 is multiplexed into the input code 2610, the grouping information switching unit 2602 selects the second grouping information 2611 out of the above-mentioned second grouping information 2611 and the first grouping information 2413 so that the second grouping information 2611 outputted from the code dividing unit 2601 is inputted to a higher frequency band decoding unit. On the other hand, when the second grouping information 2611 is not multiplexed into the input code 2610, the grouping information switching unit 2602 selects the first grouping information 2413 so that the first grouping information 2413 is inputted to a higher frequency band decoding unit.

As a result, it is possible for the first higher frequency band decoding unit 2603 or the second higher frequency band decoding unit 2604 selected according to the switching information 1611 to decode the high frequency code 2612 on the basis of selected grouping information which is an output from the grouping information switching unit 2602. In other words, when the second grouping information 2611 is multiplexed into the input code 2610, decoding is performed on the basis of the second grouping information 2611, and when the second grouping information 2611 is not multiplexed into the input code 2610, decoding is performed on the basis of the first grouping information 2413 from the lower frequency band decoding unit 2402. Note that, in the present example, although the grouping information switching unit 2602 has a function to detect the presence/absence of data of the second grouping information 2611 so as to select the second grouping information 2611 if there is such data of the second grouping information 2611, and to select the first grouping information 2413 if there is no data of second grouping information 2611, it is also possible that a switch is made between the first grouping information 2413 and the second grouping information 2611 through another method.

An example is that a control line is provided between the code dividing unit 2601 and the grouping information switching unit 2602 so that the code dividing unit 2601 makes a judgment on whether the second grouping information 2611 is multiplexed into the input code 2610. Then, according to the result of such judgment, a control signal used to switch the grouping information switching unit 2602 is outputted to the grouping information switching unit 2602. Another example is that grouping information switch information indicating the result of a switch made in the grouping information switching unit 2302 is generated by the grouping information generating unit 2301, for example, on the part of the encoding device 2300 illustrated in FIG. 23, which is then multiplexed into the high frequency code 2312 in the higher frequency band encoding unit 1904. In such a case too, it is possible that a control line is provided between the code dividing unit 2601 and the grouping information switching unit 2602 so that the code dividing unit 2601 separates grouping information switch information from the high frequency code 2612 and outputs such grouping information switch information to the control line so as to make a switch of the grouping information switching unit 2602. Furthermore, without providing the grouping information switching unit 2602, both the first grouping information 2413 and the second grouping information 2611 are configured to be inputted to a selected higher frequency band decoding unit via the switching unit 2405 so that such selected higher frequency band decoding unit uses the second grouping information 2611 ahead of the first grouping information 2413 if there exists data of the second grouping information 2511.

The above-described configuration makes it possible for the decoding device 2600 to decode an input signal encoded to be represented by a smaller amount of bits by the encoding device 2300 which groups transform sub-blocks in a manner optimal for high frequency coefficients. This consequently leads to the improvement in the quality of an output signal. Meanwhile, it becomes possible for the decoding device 2600 to acquire an output signal which is larger in the bit amount of an input code but which is of higher quality being closer to the original sound as compared with the decoding device 2400. Furthermore, it is also possible for the decoding device 2600 to acquire an output signal which is smaller in the bit amount of an input code but which is less subject to quality deterioration as compared with the decoding device 2500.

Note that although signals/coefficients based on the same sampling frequency are used both in a higher frequency band encoding unit and a lower frequency band encoding unit in the explanations for encoding devices and decoding devices according to the foregoing seventh and the eighth embodiments, a different sampling frequency may be employed for each encoding unit. As an example, an explanation is provided for the case where transform is performed in units of a basic transform block first, and a sampling frequency of 24 kHz is used for the encoding of the lower frequency band and a sampling frequency of 48 kHz is used for the encoding of the higher frequency band.

First, assuming that 2048 samples is used as a basic transform block length and that MDCT coefficients 2048 samples are acquired as a result of transforming an input signal at a sampling frequency of 48 kHz by 2048 samples, such MDCT coefficients represent a signal at 0~24 kHz. If 1024 samples in the lower frequency band side are extracted from MDCT coefficients 2048 samples as lower frequency coefficients, such lower frequency coefficients represent a signal at 0~12 kHz. And if inverse-MDCT is performed for such low frequency coefficients 1024 samples, a time signal having 1024 samples is obtained, meaning that the number of samples of the time signal is reduced to half, that is, down-sampled to half the value of the sampling frequency.

If MDCT coefficients 2048 samples acquired by directly performing MDCT for an input signal are coefficients based on a sampling frequency of 48 kHz, it can be said that low frequency MDCT coefficients acquired as a result of extracting 1024 samples in the lower frequency band side are coefficients based on a sampling frequency of 24 kHz. By having such low frequency MDCT coefficients 1024 samples and all frequency bands MDCT coefficients 2048 samples be inputted to a lower frequency band encoding unit and a higher frequency band encoding unit respectively, a configuration is realized with which different sampling frequencies are used in the lower frequency band encoding unit and the higher frequency band encoding unit.

With the above configuration, the transform block length in the higher frequency band encoding unit is 2048 samples, while the transform block length in the lower frequency band encoding unit is 1024 samples. Although their transform block lengths differ, since their sampling frequencies are 48 kHz and 24 kHz respectively, their transform block lengths as time are the same (2048/48000=1024/24000). To put it another way, that the transform block length of the lower frequency band encoding unit and the transform block length of the higher frequency band encoding unit are the same in terms of time is a necessary condition to realize the present configuration.

As is true of decoding, a decoding device may have a configuration in which transform block lengths in the lower frequency band decoding unit and the higher frequency band decoding unit are set to be the same in terms of time. In such configuration, low frequency MDCT coefficients 1024 samples based on a sampling frequency of 24 kHz which are decoded in the lower frequency band decoding unit are regarded as 1024 samples in the lower frequency band side out of MDCT coefficients 2048 samples based on a sampling frequency of 48 kHz after up-sampling is performed, and such low frequency MDCT coefficients are combined with high frequency MDCT coefficients decoded as MDCT coefficients based on a sampling frequency of 48 kHz.

Moreover, in the encoding devices and decoding devices according to the sixths to the eighths embodiments explained above, although the configuration is presented in which a switch is made between the first and the second higher frequency band encoding units or the first and the second higher frequency band decoding units on a per-encoding cell basis, it is also possible that a switch is made for each transform sub-block or transform sub-block group when a transform sub-block is used. In the case where a transform sub-block is used for encoding, it is usual that an input signal varies greatly in the direction of the time domain but does not vary much in the direction of the frequency domain. Therefore, it is possible to select the same higher frequency band encoding unit for a plurality of high frequency encoding sub-bands in the direction of the frequency domain included in the same transform sub-block or the same transform sub-block group. According to this configuration, since switching information used in the encoding unit is encoded not for each encoding cell but for each transform sub-block or a transform sub-block group, it is possible to reduce the amount of bits required to encode the switching information.

Note that the encoding devices and the decoding devices according to the first to the eighths embodiments of the present invention may be realized as encoding methods and decoding methods by allowing connections among processing procedures which realize functions of each unit. It is possible to realize each processing procedure by describing it in a programming language as software and by executing such software on a processor. By storing software described in a programming language in such storage medium as a ROM (Read-Only Memory) and a hard disk drive, and by executing it on a processor connected to such storage medium directly or via a network including the Internet, the functionality of the encoding devices and the decoding devices according to the first to the eighth embodiments of the present invention is realized.

INDUSTRIAL APPLICABILITY

The encoding device according to the present invention is suited for use as an audio encoding device equipped in broadcasting stations for satellite broadcasting including BS and CS, as an audio encoding device of a content distribution server to distribute contents via a communications network such as the Internet, as an audio signal encoding program to be executed on a general-purpose computer and as a storage medium in which such program is stored.

Moreover, the decoding device according to the present invention is suited for use not only as an audio decoding device equipped in a home-use STB, but also as an audio signal decoding program to be executed on a general-purpose computer, as a storage medium in which such program is stored, as a circuit base, an LSI and others specialized for audio signal decoding equipped in a STB or in a general-purpose computer, and as an IC card to be inserted into a STB or a general-purpose computer.

The invention claimed is:
1. An encoding device comprising:
  a first band dividing unit operable to divide an input signal into a low frequency signal representing a signal in a lower frequency band, and a high frequency signal representing a signal in a higher frequency band;
  a time-frequency transforming unit operable to transform the band-divided high frequency signal and the band-divided low frequency signal into spectral coefficients representing respective frequency components;
  a second band dividing unit operable to divide the spectral coefficients in the higher frequency band into a plurality of sub-bands;
  a lower frequency band encoding unit operable to encode the spectral coefficients representing the frequency components of the lower frequency band, and generate a low frequency code;
  a similarity judging unit operable to judge a similarity between the coefficients in the divided sub-bands and the coefficients in the low frequency band, and output the similarity, said similarity judging unit including a noise characteristics judging unit operable to judge noise characteristics of the spectral coefficients in each of the divided sub-bands, and a prediction error calculating unit operable to calculate a prediction error between the spectral coefficients in each of the sub-bands and the spectral coefficients selected from the lower frequency band so as to determine a similarity between the spectral coefficients in each of the sub-bands and the spectral coefficients selected from the lower frequency band;

a plurality of higher frequency band encoding units operable to encode the coefficients in the higher frequency band through respective encoding methods, generate a high frequency code, and generate amplitude parameters indicating an amplitude of the spectral coefficients in each of the sub-bands, wherein a plurality of said higher frequency band encoding units include a first higher frequency band encoding unit operable to encode only the generated amplitude parameters, and a second higher frequency band encoding unit operable to encode positional parameters of the low frequency spectral coefficients similar to the spectral coefficients in each of the sub-bands, the amplitude parameters of each of the sub-bands and differential parameters between the spectral coefficients in each of the sub-bands and the low frequency spectral coefficients similar to the spectral coefficients in each of the sub-bands, based on the similarity outputted from said similarity judging unit;

an encoding selecting unit is operable to select one of a plurality of said higher frequency band encoding units based on a comprehensive judgment about the judged noise characteristics and the similarity outputted by said similarity judging unit, cause the selected higher frequency band encoding unit to perform encoding, and generate selection information specifying an encoding method employed by the selected higher frequency band encoding unit; and a code multiplexing unit operable to multiplex the low frequency code generated by said lower frequency band encoding unit, the high frequency code generated by the selected higher frequency band encoding unit and the selection information generated by said encoding selecting unit, and generate an output code.

2. The encoding device according to claim 1, further including a transform block length selecting unit operable to analyze characteristics of the input signal, determine a transform block length used for time-frequency transform performed for the input signal, and generate block length information indicating the determined transform block length, wherein:

said time-frequency transforming unit is operable to transform the high frequency signal and the low frequency signal into high frequency coefficients and low frequency coefficients, respectively, with the transform block length selected said transform block length selecting unit; and said code multiplexing unit is further operable to multiplex the block length information in addition to the low frequency code, the high frequency code and the selection information.

3. An encoding device comprising:

a first band dividing unit operable to divide an input signal into a low frequency signal representing a signal in a lower frequency band, and high frequency signal representing a signal in a higher frequency band;

a time-frequency transforming unit operable to transform the band-divided high frequency signal and the band-divided low frequency signal into spectral coefficients representing respective frequency components;

a second band dividing unit operable to divide the spectral coefficients in the higher frequency band into a plurality of sub-bands;

a lower frequency band encoding unit operable to encode the spectral coefficients representing the frequency components of the lower frequency band, and generate a low frequency code;

a similarity judging unit operable to judge a similarity between the coefficients in the divided sub-bands and the coefficients in the low frequency band, and output the similarity, said similarity judging unit including a noise characteristics judging unit operable to judge noise characteristics of the spectral coefficients in each of the divided sub-bands, and a prediction error calculating unit operable to calculate a prediction error between the spectral coefficients in each of the sub-bands and the spectral coefficients selected from the lower frequency band so as to determine a similarity between the spectral coefficients in each of the sub-bands and the spectral coefficients selected from the lower frequency band;

a plurality of higher frequency band encoding units operable to encode the coefficients in the higher frequency band through respective encoding methods, generate a high frequency code, and generate amplitude parameters indicating an amplitude of the spectral coefficients in each of the sub-bands, wherein a plurality of said higher frequency band encoding units include a first higher frequency band encoding unit operable to encode only the generated amplitude parameters, and a second higher frequency band encoding unit operable to encode only two pieces of information which are positional parameters of the low frequency spectral coefficients similar to the spectral coefficients in each of the sub-bands and the amplitude parameters of each of the sub-bands, based on the similarity outputted from said similarity judging units;

an encoding selecting unit operable to select one of a plurality of said higher frequency band encoding units based on a comprehensive judgment about the judged noise characteristics and the similarity outputted from said similarity judging unit, cause the selected higher frequency band encoding unit to perform encoding, and generate selection information specifying an encoding method employed by the selected higher frequency band encoding unit; and a code multiplexing unit operable to multiplex the low frequency code generated by said lower frequency band encoding unit, the high frequency code generated by the selected higher frequency band encoding unit and the selection information generated by said encoding selecting, unit, and generate an output code.

4. An encoding device comprising:

a first band dividing unit operable to divide an input signal into a low frequency signal representing a signal in a lower frequency band, and a high frequency signal representing a signal in a higher frequency band;

a second band dividing unit operable to divide the divided high frequency signal into a plurality of sub-bands;

a time-frequency transforming unit operable to transform the divided low frequency signal and the high frequency signal which is divided into the plurality of the sub-bands second band dividing unit into spectral coefficients representing respective frequency components;

a lower frequency band encoding unit operable to encode the spectral coefficients representing the frequency components of the lower frequency band, and generate a low frequency code;

a similarity judging unit operable to judge a similarity between the coefficients in the divided sub-bands and the coefficients in the low frequency band, and output the similarity, said similarity judging unit including a noise characteristics judging unit operable to judge noise characteristics of the spectral coefficients in each of the divided sub-bands, and a prediction error calculating unit operable to calculate a prediction error between the spectral coefficients in each of the sub-bands and spectral coefficients selected from the lower frequency band so as to determine a similarity between the spectral coefficients in each of the sub-bands and the spectral coefficients selected from the lower frequency band;

a plurality of higher frequency band encoding units operable to encode the coefficients in the higher frequency band through respective encoding methods, generate a high frequency code, and generate amplitude parameters indicating an amplitude of the spectral coefficients in each of the sub-bands, wherein a plurality of said higher frequency band encoding units include a first higher frequency band encoding unit operable to encode only the generated amplitude parameters, and a second higher frequency band encoding unit operable to encode positional parameters of the low frequency spectral coefficients similar to the spectral coefficients in each of the sub-bands, the amplitude parameters in each of the sub-bands, and differential parameters between the spectral coefficients in each of the sub-bands and the low frequency spectral coefficients similar to the spectral coefficients in each of the sub-bands, based on the similarity outputted from said similarity judging unit;

an encoding selecting unit is operable to select one of a plurality of said higher frequency band encoding units based on a comprehensive judgment about the judged noise characteristics and the similarity outputted from said similarity judging unit, cause the selected higher frequency band encoding unit to perform encoding, and generate selection information specifying encoding method employed by the selected higher frequency band encoding unit;

a code multiplexing unit operable to multiplex the low frequency code generated by said lower frequency band encoding unit, the high frequency code generated by the selected higher frequency band encoding unit and the selection information generated by said encoding selecting unit, and generate an output code.

5. An encoding device comprising:

a time-frequency transforming unit operable to transform an input signal into spectral coefficients representing frequency components of all frequency bands of the input signal;

a first band dividing unit operable to divide the spectral coefficients into coefficients in a lower frequency band, and coefficients in a higher frequency band, and to further divide the spectral coefficients in the higher frequency band into a plurality of sub-bands;

a lower frequency band encoding unit operable to encode the divided coefficients in the lower frequency band and generate a low frequency code;

a similarity judging unit operable to judge a similarity between the coefficients in the divided sub-bands and the coefficients in the low frequency band, and output the similarity, said similarity judging unit including a noise characteristics judging unit operable to judge noise characteristics of the spectral coefficients in each of the divided sub-bands, and a prediction error calculating unit operable to calculate a prediction error between the spectral coefficients in each of the sub-bands and the spectral coefficients selected from the lower frequency band so as to determine a similarity between the spectral coefficients in each of the divided sub-bands and the spectral coefficients selected from the lower frequency band;

a plurality of higher frequency band encoding units operable to encode the coefficients in the higher frequency band through respective encoding methods, generate a high frequency code, and generate amplitude parameters indicating an amplitude of the spectral coefficients in each of the sub-bands, wherein a plurality of said higher frequency band encoding units have a first higher frequency band encoding unit operable to encode only the generated amplitude parameters, and a second higher frequency band encoding unit operable to encode positional parameters of the low frequency spectral coefficients similar to the spectral coefficients in each of the sub-bands, the amplitude parameters of each of the sub-bands, and differential parameters between the spectral coefficients in each of the sub-bands and the low frequency spectral coefficients similar to the spectral coefficients in each of the sub-bands, based on the similarity outputted from said similarity judging unit, an encoding selecting unit operable to select one of a plurality of said higher frequency band encoding units based on a comprehensive judgment about the judged noise characteristics and the similarity outputted from said similarity judging unit, cause the selected higher frequency band encoding unit to perform encoding, and generate selection information specifying an encoding method employed by the selected higher frequency band encoding unit; and a code multiplexing unit operable to multiplex the low frequency code generated by said lower frequency band encoding unit, the high frequency code generated by the selected higher frequency band encoding unit and the selection information generated by said encoding selecting unit, and generate an output code.

6. The encoding device according to claim 5, further including a transform block length selecting unit operable to analyze characteristics of the input signal, determine a transform block length used for time-frequency transform performed for the input signal, and generate block length information indicating the determined transform block length, wherein:

said time-frequency transforming unit is operable to transform the input signal into spectral coefficients representing frequency components of all frequency bands of the input signal with the transform block length selected by said transform block length selecting unit; and said code multiplexing unit is further operable to multiplex the block length information in addition to the low frequency code, the high frequency code and the selection information.

7. An encoding device comprising:

a transform block length selecting unit operable to analyze characteristics of an input signal, determine a transform block length used for time-frequency transform performed for the input signal, and generate block information indicating the determined transform block length;

a time-frequency transforming unit operable to transform the input signal into spectral coefficients representing frequency components of all frequency bands of the input signal with the transform block length determined by said transform block length selecting unit;

a first band dividing unit operable to divide the spectral coefficients into coefficients in a lower frequency band, and coefficients in a higher frequency band, and to further divide the spectral coefficients in the higher frequency band into a plurality of sub-bands;

a lower frequency band encoding unit operable to encode the divided coefficients in the lower frequency band and generate a low frequency code;

a similarity judging unit operable to judge a similarity between the coefficients in the divided sub-bands and the coefficients in the low frequency band, and output the similarity, said similarity judging unit including a noise characteristics judging unit operable to judge noise characteristics of the spectral coefficients in each of the divided sub-bands, and a prediction error calculating unit operable to calculate a prediction error between the spectral coefficients in each of the sub-bands and the spectral coefficients selected from the lower frequency band so as to determine a similarity between the spectral coefficients in each of the divided sub-bands and the spectral coefficients selected from the lower frequency band;

a plurality of higher frequency band encoding units operable to encode the coefficients in the higher frequency band through respective encoding methods, generate a high frequency code, and generate amplitude parameters indicating an amplitude of the spectral coefficients in each of the sub-bands, wherein a plurality of said higher frequency band encoding units have a first higher frequency band encoding unit operable to encode only the generated amplitude parameters, and a second higher frequency band encoding unit operable to encode positional parameters of the low frequency spectral coefficients similar to the spectral coefficients in each of the sub-bands, the amplitude parameters of each of the sub-bands, and differential parameters between the spectral coefficients in each of the sub-bands and the low frequency spectral coefficients similar to the spectral coefficients in each of the sub-bands, based on the similarity outputted by said similarity judging unit;

an encoding selecting, unit operable to select one of a plurality of said higher frequency band encoding units based on a comprehensive judgment about the judged noise characteristics and the similarity outputted by said similarity judging unit, cause the selected higher frequency band encoding unit to perform encoding, and generate selection information specifying an encoding method employed by the selected higher frequency band encoding unit; and a code multiplexing unit operable to multiplex the low frequency code generated by said lower frequency band encoding unit, the high frequency code generated by the selected higher frequency band encoding unit, the selection information generated by said encoding selecting unit and the block length information generated by said transform block length selecting unit, and generate an output code;

wherein said encoding device further includes:
a classifying unit operable to judge a similarity between high frequency coefficients included in one of transform blocks to be transformed with the transform block length and high frequency coefficients included in another transform block, when a short transform block length is determined by said transform block length selecting unit, and classify high frequency coefficients in each of the transform blocks judged to have a high degree of similarity with one another into a group; and a classification information generating unit operable to generate classification information indicating a result provided from said classifying unit;

wherein a plurality of said higher frequency band encoding units are operable to collectively encode high frequency coefficients in more than one transform block included in one group; and wherein said code multiplexing unit further operable to multiplex the classification information in addition to the low frequency code, the high frequency code, the selection information, and the block length information.

8. The encoding device according to claim 7,
wherein said classifying unit is operable to compare low frequency coefficients included in one of the transform blocks with low frequency coefficients included in another transform block for every transform block, and when the low frequency coefficients in each of the transform blocks are similar to one another to judge that high frequency coefficients included in each of the transform blocks also have a high degree of similarity with one another, and classify the low frequency coefficients and the high frequency coefficients into a same group.

9. The encoding device according to claim 7,
wherein said classifying unit includes:
a first judging unit operable to compare low frequency coefficients included in one of the transform blocks with low frequency coefficients included in another transform block For every transform block, and when the low frequency coefficients in each of the transform blocks are similar to one another, judges that high frequency coefficients included in each of the transform blocks also have a high degree of similarity with one another; and a second judging unit operable to compare high frequency coefficients included in one of the transform blocks with high frequency coefficients included in another transform block for every transform block, and judge similarity between the high frequency coefficients in each of the transform blocks, and wherein said classifying unit is operable to select one of the judgment made by said first judging unit and the judgment made by said second judging unit, and classify the high frequency coefficients in each of the transform block into a group according to the selected judgment.

10. An encoding device comprising:
a time-frequency transforming unit operable to transform an input signal into spectral coefficients representing frequency components of all frequency bands of the input signal;

a first band dividing unit operable to divide the spectral coefficients into coefficients in a lower frequency band, and coefficients in a higher frequency band, and to further divide the spectral coefficients in the higher frequency band into a plurality of sub-bands;

a lower frequency band encoding unit operable to encode the divided coefficients in the lower frequency band and generate a low frequency code;

a similarity judging unit operable to judge a similarity between the coefficients in the divided sub-bands and the coefficients in the low frequency band, and output the similarity, said similarity judging unit including a noise characteristics judging unit operable to judge noise characteristics of the spectral coefficients in each of the divided sub-bands, and a prediction error calculating unit operable to calculate a prediction error between the spectral coefficients in each of the sub-bands and the spectral coefficients selected from the lower frequency band so as to determine a similarity between the spectral coefficients in each of the divided sub-bands and the spectral coefficients selected from the lower frequency band;

a plurality of higher frequency band encoding units operable to encode the coefficients in the higher frequency band, through respective encoding methods, generate a high frequency code, and generate amplitude parameters indicating an amplitude of the spectral coefficients in each of the sub-bands, wherein a plurality of said higher frequency band encoding unit include a first higher frequency band encoding unit operable to encode only the generated amplitude parameters, and a second higher frequency band encoding unit operable to encode only two pieces of information which are positional parameters of the low frequency spectral coefficients similar to the spectral coefficients in each of the sub-bands and the amplitude parameters of each of the sub-bands, on the similarity outputted from said similarity judging unit;

an encoding selecting unit operable to select one of a plurality of said higher frequency band encoding units based on a comprehensive judgment about the judged noise characteristics and the similarity outputted from said similarity judging unit, cause the selected higher frequency band encoding unit to perform encoding, and generate selection information specifying an encoding method employed by the selected higher frequency band encoding unit; and a code multiplexing unit operable to multiplex the low frequency code generated by said lower frequency band encoding unit, the high frequency code generated by the selected higher frequency band encoding unit and the selection information generated by said encoding selecting unit, and generate an output code.

11. A decoding device comprising:

a lower frequency band decoding unit operable to decode a low frequency signal representing a signal in a lower frequency band out of an input code;

a time-frequency transforming unit operable to transform the low frequency signal decoded by said lower frequency band decoding unit into low frequency coefficients which are spectral coefficients with a transform block length indicated by block length information included in the input code;

a plurality of higher frequency band decoding units operable to decode a high frequency signal representing a signal in a higher frequency band out of the input code through respective decoding methods, wherein a plurality of said higher frequency band decoding units include a first higher frequency band decoding unit operable to decode high frequency coefficients transformed with the transform block length using a specified noise signal and amplitude parameters included in the input code, and a second higher frequency band decoding unit operable to decode the high frequency coefficients using the low frequency coefficients acquired as a result of the transform performed by said time-frequency transform unit, positional parameters indicating a position of a part in the low frequency coefficients similar to corresponding high frequency coefficients, amplitude parameters of the high frequency coefficients and differential parameters between the low frequency coefficients and the high frequency coefficients;

a decoding selecting unit operable to select one of said plurality of higher frequency band decoding unit according to selection information included in the input code, and cause the selected higher frequency band decoding, unit to perform decoding; and a signal combining unit operable to combine the low frequency signal decoded by said lower frequency band decoding unit with the high frequency signal decoded by the selected higher frequency band decoding unit, and generate an output decoded signal, said signal combining unit including spectral coefficients combining unit operable to combine the high frequency coefficients decoded by the selected higher frequency band decoding unit with the low frequency coefficients decoded by said lower frequency band decoding unit, and a frequency-time transforming unit operable to transform the decoded spectral coefficients into a time signal with the transform block length indicated by the block length information.

12. A decoding device comprising:

a lower frequency band decoding, unit operable to decode low frequency coefficients representing spectral coefficients in a lower frequency band out of an input code;

a plurality of higher frequency band decoding units operable to decode high frequency coefficients representing spectral coefficients, which are divided into a plurality of sub-bands, in a higher frequency band out of the input code through respective decoding methods, wherein a plurality of said higher frequency band decoding units include a first higher frequency band decoding unit operable to decode the high frequency coefficients using only amplitude parameters included in the input code, and a second higher frequency band decoding unit operable to decode the high frequency coefficients using ① positional parameters indicating a relation of frequency positions between the high frequency coefficients and a part in the low frequency coefficients having a similarity, ② the amplitude parameters, and ③ differential parameters indicating a level differential between the low frequency coefficients and the high frequency coefficients included in the input code;

a decoding selecting unit operable to select one of said plurality of higher frequency band decoding units for every sub-band according to selection information included in the input code, and cause the selected higher frequency band decoding unit to perform decoding; and a signal combining including a spectrum combining unit operable to combine the decoded low frequency coefficients with the high frequency coefficients decoded by the selected higher frequency band decoding unit, and a frequency-time transforming unit operable to transform the combined and decoded spectral coefficients into a time signal with the transform block length indicated by the block length information included in the input code and generate an output decoded signal, wherein the low frequency coefficients and the high frequency coefficients are generated by a time-frequency transform performed with a transform block length indicated by block length information included in the input code, and wherein the selected higher frequency band decoding unit is operable to perform decoding for all transform blocks in a same group by using sets of encoding parameters commonly used in a plurality of the transform blocks included in the group according to classification information included in the input code, when the transform block length indicated by the block length information is a short transform block length.

13. The decoding device according to claim 12, wherein the selected higher frequency band decoding unit is operable to perform decoding for the transform blocks in the same group according to the classification information decoded together with the low frequency coefficients, when the transform block length indicated by the block length information is the short transform block length.

14. The decoding device according to claim 12, wherein:
said lower frequency band decoding unit is operable to perform decoding for the all transform blocks belonging to the same group by using the sets of the encoding parameters commonly used in a plurality of the transform blocks included in the group according to first classification information included in the input code; and the selected higher frequency band decoding unit operable to select one of the first classification information acquired from said lower frequency band decoding unit and second classification information included in the input code, and decode the high frequency coefficients according to the selected classification information.

* * * * *

UNITED STATES PATENT AND TRADEMARK OFFICE
CERTIFICATE OF CORRECTION

PATENT NO. : 7,246,065 B2  Page 1 of 1
APPLICATION NO. : 10/353019
DATED : July 17, 2007
INVENTOR(S) : Naoya Tanaka et al.

It is certified that error appears in the above-identified patent and that said Letters Patent is hereby corrected as shown below:

In claim 3 at column 46, line 49, "selecting, unit" should be --selecting unit--.

In claim 7 at column 49, line 44, "an encoding selecting, unit ," should be --an encoding selecting unit--.

In claim 7 at column 50, line 12, "unit further" should be --unit is further--.

In claim 8 at column 50, line 23, "to one another to judge" should be --to one another, to judge--.

In claim 9 at column 50, line 36, "judges" should be --judge--.

In claim 10 at column 51, line 14, "band, through" should be --band through--.

In claim 10 at column 51, line 26, "sub-bands, on the" should be --sub-bands, based on--.

Signed and Sealed this

Twenty-seventh Day of May, 2008

JON W. DUDAS
*Director of the United States Patent and Trademark Office*